(12) United States Patent
Tonyan et al.

(10) Patent No.: US 7,849,649 B2
(45) Date of Patent: *Dec. 14, 2010

(54) NON-COMBUSTIBLE REINFORCED CEMENTITIOUS LIGHTWEIGHT PANELS AND METAL FRAME SYSTEM FOR SHEAR WALLS

(75) Inventors: Timothy D. Tonyan, Wheaton, IL (US); James M. Ullett, McHenry, IL (US); James E. Reicherts, Cary, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/321,069

(22) Filed: Dec. 30, 2005

(65) Prior Publication Data
US 2006/0174572 A1 Aug. 10, 2006

Related U.S. Application Data

(60) Provisional application No. 60/647,016, filed on Jan. 27, 2005.

(51) Int. Cl.
*E04B 2/30* (2006.01)
(52) U.S. Cl. .................. 52/483.1; 52/309.13; 52/653.1; 428/192; 106/735
(58) Field of Classification Search ................ 52/653.1, 52/232, 309.12, 309.13, 343, 344, 293, 309, 52/414, 474, 483.1, 633; 428/60, 70, 192, 428/325; 106/735; 260/29.6
See application file for complete search history.

(56) References Cited

U.S. PATENT DOCUMENTS 1,684,624 A 9/1928 Hayden
2,230,823 A 2/1941 Clements (Continued)

FOREIGN PATENT DOCUMENTS

CL 33183 9/1982

(Continued)

OTHER PUBLICATIONS

Grabber.gom as dated Oct. 23, 2003: web addresses http://web.archive.org/web/20040111002211/www.grabberman.com/metalscrews.htm see attached p. 3.*

(Continued)

*Primary Examiner*—Richard E Chilcot, Jr.
*Assistant Examiner*—William V Gilbert
(74) *Attorney, Agent, or Firm*—Novak Druce + Quigg LLP; David F. Janci

(57) ABSTRACT

A vertical shear wall system including vertical metal framing members, for example, C-joists, U-joists, open web joists, or other metal frame systems that support a reinforced, lightweight, dimensionally stable SCP panel. The shear wall system is non-combustible, water durable, mold and rot resistant, termite resistant and is capable of resisting shear loads equal to or exceeding shear loads provided by plywood or oriented strand board panels. The panels employ one or more layers of a continuous phase resulting from the curing of an aqueous mixture of inorganic binder, for example, calcium sulfate alpha hemihydrate, hydraulic cement, an active pozzolan and lime. The continuous phase is reinforced with glass fibers and contains lightweight filler particles, for example, ceramic microspheres.

40 Claims, 19 Drawing Sheets

U.S. PATENT DOCUMENTS

| | | | |
|---|---|---|---|
| 2,276,237 A | | 3/1942 | Lowrey |
| 2,410,922 A | | 11/1946 | Balduf |
| 2,541,784 A | | 2/1951 | Shannon |
| 2,590,687 A | | 3/1952 | Crafton |
| 2,856,766 A | * | 10/1958 | Huntley ........................ 52/318 |
| 2,883,852 A | | 4/1959 | Midby |
| 3,216,163 A | | 11/1965 | Carew |
| 3,397,497 A | | 8/1968 | Shea |
| 3,780,482 A | | 12/1973 | De Lange |
| 3,797,179 A | | 3/1974 | Jackson |
| 3,826,051 A | | 7/1974 | Miller et al. |
| 3,956,861 A | * | 5/1976 | Rasmussen ................ 52/288.1 |
| 3,974,607 A | | 8/1976 | Balinski |
| 4,016,697 A | | 4/1977 | Ericson |
| 4,052,829 A | | 10/1977 | Chapman |
| 4,142,340 A | | 3/1979 | Howard |
| 4,239,396 A | | 12/1980 | Arribau et al. |
| 4,241,555 A | | 12/1980 | Dickens et al. |
| 4,276,730 A | | 7/1981 | Lewis |
| 4,379,729 A | | 4/1983 | Cross |
| 4,435,940 A | | 3/1984 | Davenport |
| 4,601,151 A | | 7/1986 | Nunley et al. |
| 4,647,496 A | | 3/1987 | Lehnert et al. |
| 4,707,961 A | | 11/1987 | Nunley et al. |
| 4,736,561 A | | 4/1988 | Lehr et al. |
| 4,783,942 A | | 11/1988 | Nunley et al. |
| 4,852,316 A | | 8/1989 | Webb |
| 4,982,545 A | | 1/1991 | Stromback |
| 4,986,051 A | | 1/1991 | Meyer et al. |
| 5,100,258 A | | 3/1992 | VanWagoner |
| 5,353,560 A | | 10/1994 | Heydon |
| 5,463,873 A | | 11/1995 | Early et al. |
| 5,507,427 A | | 4/1996 | Burgett |
| 5,584,153 A | | 12/1996 | Nunley et al. |
| 5,596,860 A | | 1/1997 | Hacker |
| 5,609,416 A | | 3/1997 | Duckworth |
| 5,657,597 A | | 8/1997 | Loftus |
| 5,687,538 A | | 11/1997 | Frobosilo et al. |
| 5,743,056 A | | 4/1998 | Balla-Goddard et al. |
| 5,768,841 A | | 6/1998 | Swartz et al. |
| 5,842,314 A | | 12/1998 | Porter |
| 5,913,788 A | | 6/1999 | Herren |
| 6,000,194 A | | 12/1999 | Nakamura |
| 6,073,410 A | | 6/2000 | Schimpf et al. |
| 6,151,855 A | | 11/2000 | Campbell |
| 6,187,409 B1 | | 2/2001 | Mathieu |
| 6,192,639 B1 | | 2/2001 | Germain |
| 6,226,946 B1 | | 5/2001 | Stough et al. |
| 6,241,815 B1 | | 6/2001 | Bonen |
| 6,260,322 B1 | | 7/2001 | Lindsay |
| 6,260,329 B1 | | 7/2001 | Mills |
| 6,301,854 B1 | | 10/2001 | Daudet et al. |
| 6,412,247 B1 | | 7/2002 | Menchetti |
| 6,418,694 B1 | | 7/2002 | Daudet et al. |
| 6,421,968 B2 | | 7/2002 | Degelsegger |
| 6,488,792 B2 | | 12/2002 | Mathieu |
| 6,510,667 B1 | | 1/2003 | Cottier et al. |
| 6,536,168 B1 | | 3/2003 | Cugini et al. |
| 6,620,487 B1 | * | 9/2003 | Tonyan et al. ................ 428/192 |
| 6,691,478 B2 | | 2/2004 | Daudet et al. |
| 6,694,695 B2 | | 2/2004 | Collins et al. |
| 6,761,001 B2 | | 7/2004 | Mueller |
| 6,761,005 B1 | | 7/2004 | Daudet et al. |
| 6,799,407 B2 | | 10/2004 | Saldana |
| 2002/0088199 A1 | | 7/2002 | Linn |
| 2003/0084637 A1 | | 5/2003 | Daudet et al. |
| 2003/0200721 A1 | * | 10/2003 | Gleeson et al. ............ 52/746.1 |
| 2004/0050006 A1 | | 3/2004 | Park |
| 2004/0074178 A1 | | 4/2004 | Daudet et al. |
| 2005/0064055 A1 | | 3/2005 | Porter |
| 2005/0064164 A1 | | 3/2005 | Dubey et al. |
| 2005/0086905 A1 | | 4/2005 | Ralph et al. |

FOREIGN PATENT DOCUMENTS

| | | |
|---|---|---|
| CL | 44335 | 11/1999 |
| CN | 1425836 A | 6/2003 |
| GB | 2334045 | 8/1999 |
| JP | 359000430 | 1/1984 |
| JP | 07259243 | 10/1995 |
| JP | 2001 107488 | 4/2001 |
| JP | 2001 262773 | 9/2001 |
| JP | 2002 180580 | 6/2002 |
| WO | 9708111 | 3/1997 |

OTHER PUBLICATIONS

Russian Office Action of Dec. 25, 2009, for RU 2007132186/03 (corresponding to U.S. Appl. No. 11/321,069) with concise statement of relevance.

"Differences in Drywall", Construction Dimensions p. 27-29 (Sep. 1983).

Submittal Sheet 09210, Imperial Brand Gypsum Base (Firecode and Firecode C Core), USG (1999).

Proprietary Gypsum Panel Products for Use in UL Classified Systems, Gypsum Association, GA-605 (Rev. Aug. 1, 2008).

Greenwell et al., Moisture Movement (Wicking) within Gypsum Wallboard, AWMA Control# 05-A-580-AWMA Abstract Submitted Sep. 17, 2004; URL:< oaspub.epa.gov/eims/eimscomm. getfile?p_download_id=446305>, retrieved from the internet Apr. 11, 2010.

ConcreteNetwork.com, Sheet Membranes, [online], [retrieved on May 15, 2007]. Retrieved from the Internet: < URL: http://www.concretenetwork.com/concrete/waterproofing_concrete_foundations/sheet_membranes.htm >.

ConcreteNetwork.com, Liquid Membranes, [online], [retrieved on May 15, 2007]. Retrieved from the Internet: < URL: http://www.concretenetwork.com/concrete/waterproofing_concrete_foundations/liquid_membranes.htm >.

Tremco Global Sealants Division, [online], May 23, 2007 [retrieved on May 23, 2007]. Retrieved from the Internet: < http://www.tremcosealants.com/pressroom/kits.asp?id=4 >.

Applied Technologies, "Why Use a Polymer-modified Foundation Waterproofing Membrane?", [online], May 15, 2007 [retrieved on May 15, 2007]. Retrieved from the Internet: < http://www.appliedtechnologies.com/pages_blocks_v3_exp/index.cgi?Key=570& Field=ke... >.

Hydra-Guard Waterproofing System, published on or before May 19, 2007.

Hydra-Guard Waterproofing Membrane, published on or before May 19, 2007.

Protective Coatings, Poly Wall Crack Guard Systems, Dec. 9, 2005.

Tremco Global Sealants Division, Fight Basement Moisture three ways, published on or before May 19, 2007.

Gyptek, "Glass Microspheres", pp. 1-3, [online], [retrieved on Dec. 14, 2004]. Retrieved from the Internet <URL: http://www.gyptek.com/new_page_5.htm>.

Wood Floors OnLine.com, "Wood Floor Installation and Finishing Procedures", pp. 1-3, [online], [retrieved on Dec. 15, 2004]. Retrieved from the Internet <URL: http://www.woodfloorsonline.com/techtalk/installfin.html>.

NOFMA The Wood Flooring Manufacturers Association, Est. 1909, "Laying and Fastening the Flooring" pp. 1-3, [online], [retrieved on Dec. 15, 2004]. Retrieved from the Internet <URL: http://www.nofma.org/installation2.htm>.

CEM-STEEL, pp. 1-2, [online], [retrieved on Dec. 15, 2004]. Retrieved from the Internet <URL: http://www.architecturalproducts.com/cemsteel.htm>.

USG, "Fiberock Brand Underlayment—Aqua—Tough", pp. 1-2, [online], [retrieved on Dec. 15, 2004]. Retrieved from the Internet.

Underwriters Laboratories Inc. (UL), "Fire Tests of Building Construction and Materials", UL Standard for Safety, Dated Jun. 2, 1998, pp. tr1-tr4, 1-26 and A1-C2, Twelfth Edition, Northbrook, IL, United States.

Underwriters Laboratories Inc. (UL), Fire Resistance Ratings—ANSI/UL 263, Dec. 17, 2005, pp. 1-7, [online], [retrieved on Jan. 14, 2005]. Retrieved from the Internet <URL: http://database.ul.com/cgi-bin/XYV/template/LISEXT/1FRAME/showpage2.html?...>.

USG, "Important Fire Safety Information", pp. 1-5, [online], [retrieved on Jan. 14, 2005]. Retrieved from the Internet <URL: http://www.usg.com/Design_Solutions/2_2_13_typeXstdstestcerts.asp>.

USG, "How to Select the Best Residential Fire Separation Walls", 1990, pp. 1-6, [online], [retrieved on Jan. 14, 2005]. Retrieved from the Internet <URL: http://www.usg.com/Design_Solutions/2_2_8_separationwall.asp>.

USG, "Specifying the Most Important Walls in Your Building", 1991, pp. 1-8, [online], [retrieved on Jan. 14, 2005]. Retrieved from the Internet <URL: http://www.usg.com/Design_Solutions/2_2_7_importantwall.asp>.

USG, "Fire Wall Stands Up to Ultimate Test", 1995, pp. 1-3, [online], [retrieved on Jan. 14, 2005]. Retrieved from the Internet <URL: http://www.usg.com/Design_Solutions/2_2_4_ultimatetest.asp>.

USG, "Fire Resistance", pp. 1-5, [online], [retrieved on Jan. 14, 2005]. Retrieved from the Internet <URL: http://www.usg.com/Design_Solutions/2_2_10_fire_endure.asp>.

Brick Industry Association, Technical Notes 16 "Fire Resistance", Technical Notes on Brick Construction, Apr. 2002, pp. 1-12, [online], [retrieved on Jan. 11, 2005]. Retrieved from the Internet <URL: http://www..bia.org/BIA/technotes/t16.htm>.

Brick Industry Association, Technical Notes 16B "Calculated Fire Resistance", Technical Notes on Brick Construction, [Jun. 1991](Reissued Aug. 1991), pp. 1-13, [online], [retrieved on Jan. 11, 2005]. Retrieved from the Internet <URL: http://www.bia.org/BIA/technotes/t16.htm>.

Brick Industry Association, Technical Notes 21 "Brick Masonry Cavity Walls", Technical Notes on Brick Construction, Aug. 1998, pp. 1-16, [online], [retrieved on Jan. 11, 2005]. Retrieved from the Internet < URL: http://www.bia.org/BIA/technotes/t21.htm>.

Gypsum Association, "Fire Resistance Design Manual", Apr. 2003, 17th Edition GA-600-2003, pp. 1-19 and 71-84, Washington D.C., United States.

ICC Evaluation Service, Inc., Legacy Report ER-5762, entitled Legacy report on the 1997 Uniform Building Code TM, the 2000 International Building Code, and the 2000 International Residential Code, pp. 1-2 Reissued Jul. 1, 2003.

Saruh Mazure editor/publisher, Walls & Ceilings, Higher Value, Posted on Sep. 27, 2001 on http://www.wconline.com/CDA/ArticleInformation/features/BNP by BNP Media, pp. 1-4, copyright 2004, BNP Media.

How Do I Design the Best Shear Wall, http://www.sureboard.com pp. 1-2 printed on Sep. 16, 2005, last modified Nov. 6, 2004 at 6:52 PM.

Saruh Mazure editor/publisher, Walls & Ceilings,Higher Value, Posted on Sep. 27, 2001 on http://www.wconline.com/CDA/ArticleInformation/features/BNP by BNP Media, pp. 1-5, copyright 2005, BNP Media.

* cited by examiner

FIG. 19 TEST AT DESIGN LOAD
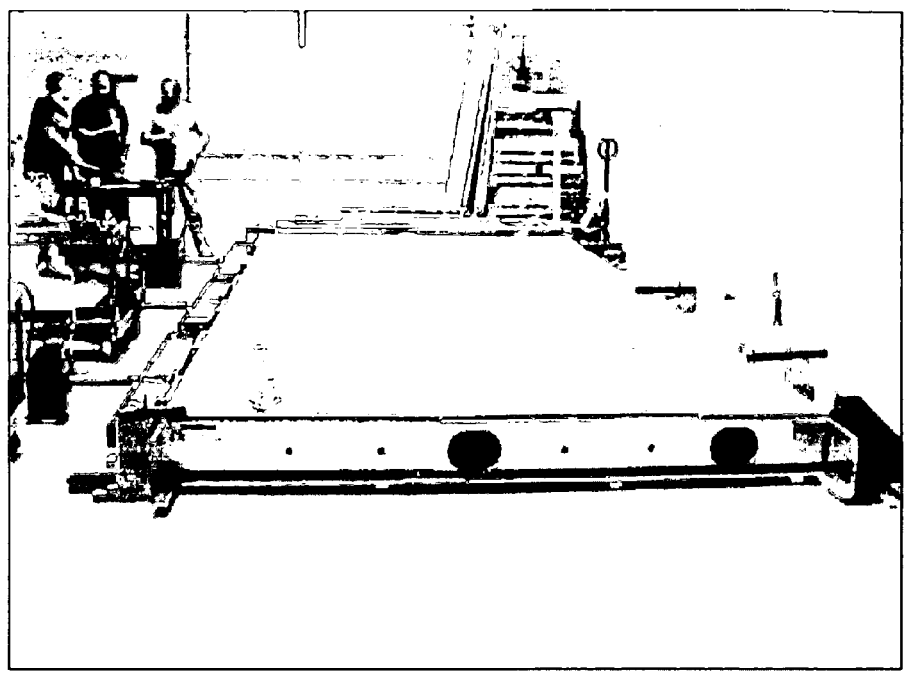
FIG. 20 FLOOR AT FAILURE
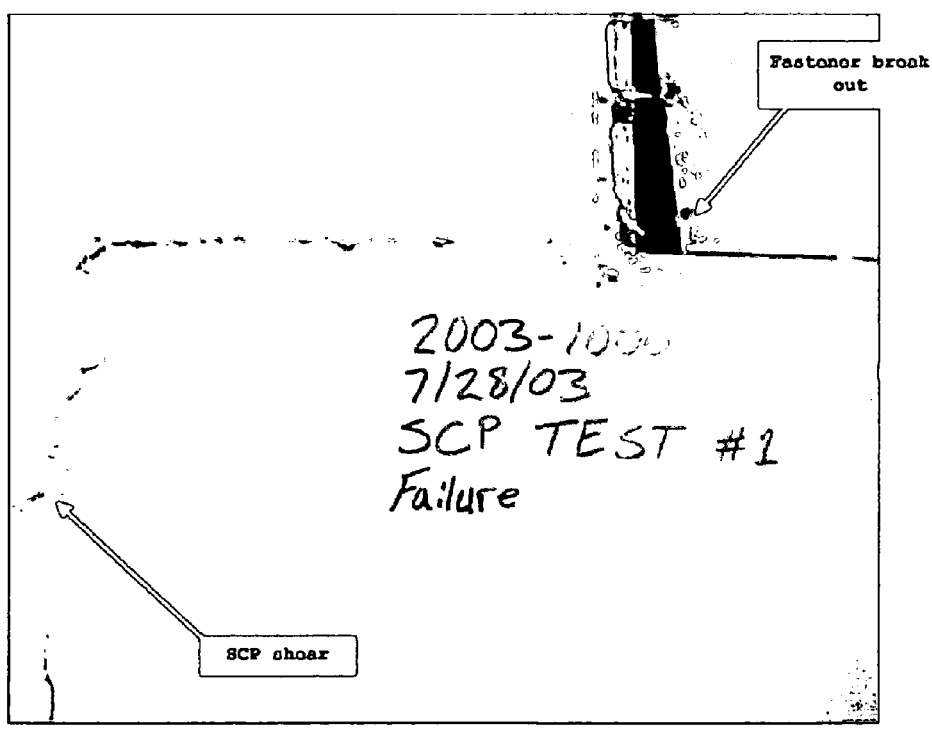

FIG. 22
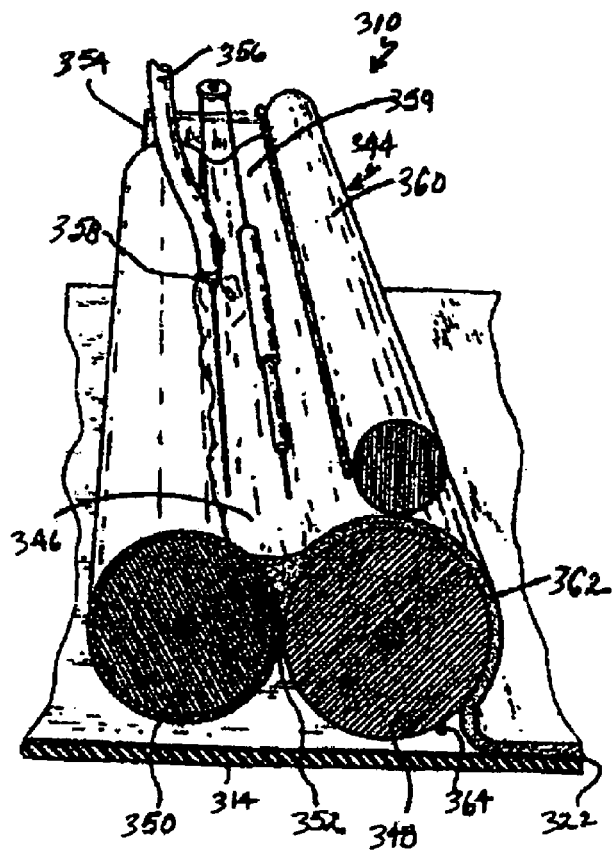
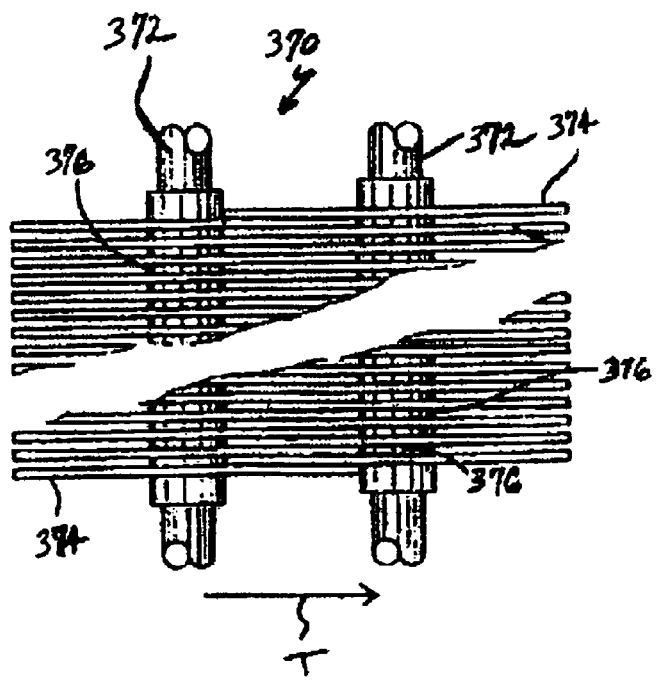
FIG. 23

NON-COMBUSTIBLE REINFORCED CEMENTITIOUS LIGHTWEIGHT PANELS AND METAL FRAME SYSTEM FOR SHEAR WALLS

CROSS-REFERENCE TO RELATED APPLICATION

This claims the benefit of U.S. provisional patent application Ser. No. 60/647,016 filed Jan. 27, 2005, incorporated herein by reference in its entirety.

FIELD OF THE INVENTION

This invention relates generally to a shear wall system comprising metal framing and lightweight structural cementitious panels, termed here as SCP panels, in residential and commercial construction. More particularly, the invention relates to a non-combustible shear wall system, having panels mechanically or adhesively fastened to steel frame shear wall systems. The panels provide a shear resistant diaphragm and axial load carrying shear wall element. The system provides the following advantageous performance attributes when used with steel wall framing: non-combustibility, water durability, mold resistance, high specific strength and stiffness, economy of building design that results in speed of assembly, and reduced foundation size due to reduced building weight.

BACKGROUND OF THE INVENTION

Shear walls play an important role in residential and commercial construction. If one considers a simple box structure having panels fastened to framing, it can be seen that a strong lateral force acting against one side of the box (e.g., wind pressure) will tend to force the side walls resisting that force from a rectangular shape into a parallelogram. Not all sheathing panels are capable of resisting such forces, nor are they very resilient, and some will fail, particularly at points where the panel is fastened to the framing. Where it is necessary to demonstrate shear resistance, the sheathing panels are measured to determine the load that the panel can resist within the allowed deflection without failure.

The shear rating is generally based on testing of three identical 8×8 ft (2.44×2.44 m) assemblies, i.e., panels fastened to framing. One edge is fixed in place while a lateral force is applied to a free end of the assembly until the load is no longer carried and the assembly fails. The measured shear strength will vary, depending upon the thickness of the panel and the size and spacing of the fasteners used in the assembly. For example, a typical assembly, e.g., a nominal ½ inch (12.7 mm) thick plywood fastened with 8 d nails (see the nail description below) to nominal 2×4 inch (50.8×101.6 mm) wood studs spaced 16 inches (406.4 mm) apart (on centers), the nails being spaced 6 inches (152.4 mm) apart on the perimeter and 12 inches (304.8 mm) apart within the perimeter, would be expected to show a shear strength of 720 lbs/ft (1072 kg/m) before failure occurs. (Note that the measured strength will vary as the fastener size and spacing is changed, as the ASTM E72 test provides.) This ultimate strength will be reduced by a safety factor, e.g., typically a factor of three, to set the design shear strength for the panel.

Sheathing panels used where a shear rating must be met usually are plywood or oriented strand board (OSB), which consists of pieces of wood that are glued together. These panels can provide the needed shear strength, but each is combustible and neither is durable when exposed to water. A panel made of hydraulic cement will resist water, but is much heavier than the wood panels and has insufficient shear strength. To solve some of these problems, structural cement panels (SCP's or SCP panels) were developed.

U.S. Pat. No. 6,620,487 to Tonyan et al., incorporated herein by reference in its entirety, discloses a reinforced, lightweight, dimensionally stable structural cement panel (SCP's or SCP panels) capable of resisting shear loads when fastened to framing equal to or exceeding shear loads provided by plywood or oriented strand board panels. The panels employ a core of a continuous phase resulting from the curing of an aqueous mixture of calcium sulfate alpha hemihydrate, hydraulic cement, an active pozzolan and lime, the continuous phase being reinforced with alkali-resistant glass fibers and containing ceramic microspheres, or a blend of ceramic and polymer microspheres, or being formed from an aqueous mixture having a weight ratio of water-to-reactive powder of 0.6/1 to 0.7/1 or a combination thereof. At least one outer surface of the panels may include a cured continuous phase reinforced with glass fibers and containing sufficient polymer spheres to improve nail ability or made with a water-to-reactive powders ratio to provide an effect similar to polymer spheres, or a combination thereof.

U.S. Pat. No. 6,241,815 to Bonen, incorporated herein by reference in its entirety, also discloses formulations useful for SCP panels.

U.S. patent application Ser. No. 10/666,294, incorporated herein by reference, discloses a multi-layer process for producing structural cementitious panels (SCP's or SCP panels), and SCP's produced by such a process. After one of an initial deposition of loosely distributed, chopped fibers or a layer of slurry upon a moving web, fibers are deposited upon the slurry layer. An embedment device mixes the recently deposited fibers into the slurry, after which additional layers of slurry, then chopped fibers are added, followed by more embedment. The process is repeated for each layer of the board, as desired.

However, while using the SCP panel on a wooden frame is an improvement over using plywood it would be desirable to have a further noncombustible system.

For use in construction, SCP panels should meet building code standards for shear resistance, load capacity, water-induced expansion and resistance to combustion, as measured by recognized tests, such as ASTM E72, ASTM E661, and ASTM C 1185 or equivalent, as applied to structural plywood sheets. SCP panels are also tested under ASTM E-136 for non-combustibility—plywood does not meet this test.

The SCP panel should be capable of being cut with the circular saws used to cut wood.

The SCP panel should be dimensionally stable when exposed to water, i.e., it should expand as little as possible, preferably less than 0.1% as measured by ASTM C 1185.

The SCP panel should provide a bondable substrate for exterior finish systems.

The SCP panel should be non-combustible as determined by ASTM E136.

After curing for 28 days, the flexural strength of a 0.75 inch (19. mm) thick SCP panel having a dry density of 65 lb/ft$^3$ (1041 kg/m$^3$) to 90 lb/ft$^3$ (1442 kg/m$^3$) or 65 lb/ft$^3$ (1041 kg/m$^3$) to 95 lb/ft$^3$ (1522 kg/m$^3$) after being soaked in water for 48 hours should be at least 1000 psi (7 MPa), e.g. at least 1300 psi (9 MPa) preferably at least 1650 psi (11.4 MPa), more preferably at least 1700 psi (11.7 MPa), as measured by ASTM C 947. The panel should retain at least 75% of its dry strength.

As the thickness of the board affects its physical and mechanical properties, e.g., weight, load carrying capacity, racking strength and the like, the desired properties vary according to the thickness of the board. Thus, the desired properties which a shear rated panel with a nominal thickness of 0.5 inches (12.7 mm) should meet include the following.

The panel when tested according to ASTM E661 and American Plywood Association (APA) Test Method S-1 over a span of 16 inches (406.4 mm) on centers, should have an ultimate load capacity greater than 550 lbs (250 kg) under static loading, an ultimate load capacity greater than 400 lbs (182 kg) under impact loading and a deflection of less than 0.078 inches (1.98 mm) under both static and impact loading with a 200 lb (90.9 kg) load.

- The nominal racking shear strength of a 0.5 inch (12.7 mm) thick panel measured by the ASTM E72 test using the nail size and spacing described above should be at least 200 lbs/ft (about 300 kg/m), typically at least 720 lbs/ft (1072 kg/m).
- A 4×8 ft, ½ inch thick panel (1.22×2.44 m, 12.7 mm thick) should weigh no more than 99 lbs (44.9 kg) or 104 lbs (47 kg) and preferably no more than about 96 or 85 lbs (about 44 or 39 kg).
- The panel should be capable of being cut with the circular saws used to cut wood.
- The panel should be capable of being fastened to framing with nails or screws.
- The panel should be machinable so that tongue and groove edges can be produced in the panel.
- The panel should be dimensionally stable when exposed to water, i.e., it should expand as little as possible, preferably less than 0.1% as measured by ASTM C 1185.
- The panel should not be biodegradable or subject to attack by insects or rot.
- The panel should provide a bondable substrate for exterior finish systems.
- The panel should be non-combustible as determined by ASTM E136.
- After curing for 28 days, the flexural strength of a 0.5 inch (12.7 mm) thick panel having a dry density of no more than 65 to 95 lb/ft$^3$ (1041 to 1520 kg/m$^3$) after being soaked in water for 48 hours should be at least 1700 psi (11.7 MPa), preferably at least 2500 psi (17.2 MPa), as measured by ASTM C 947. The panel should retain at least 75% of its dry strength.

It should be evident that plywood and OSB panels meet some, but not all, of the above performance characteristics.

There is a need for an economical, easy to assemble, durable and non-combustible total framing and shear wall system.

SUMMARY OF THE INVENTION

The present invention relates to a system for residential and light commercial construction including a metal frame and lightweight SCP panel shear wall. This shear wall is made from a mixture of inorganic binder and lightweight fillers. Selecting a combination of a metal frame with SCP panels achieves a synergy of a completely non-combustible shear wall system. By a fully non-combustible horizontal shear diaphragm on light gauge cold rolled metal frame is meant a system in which all elements pass ASTM E-136. For example, the shear wall system may include SCP panels employed with a metal shear wall framing system employing any standard light-gauge steel C-channels, U-channels, I-beams, square tubing, and light-gauge prefabricated building sections.

When used for walls, the nominal racking shear strength of a 0.5 inch (12.7 mm) thick panel measured by the ASTM E72 test using the appropriate metal studs, fasteners, stud spacing and fastener spacing typically is at least 720 lbs per lineal foot (1072 kg per lineal meter).

The present SCP vertical shear wall diaphragm system may have a higher specific racking shear strength and stiffness than a shear wall system of load bearing masonry. Specific racking shear strength is defined as the unit weight of a shear wall system in lbs/sq. ft. to satisfy a particular racking shear requirement (in lbs/linear foot).

For a given nominal wall racking shear strength specification, in the range between 200-1200 plf for a given wall thickness, the specific nominal wall racking shear strength of an SCP sheathed shear wall will be greater than a masonry shear wall of the same nominal thickness that meets the same racking shear requirement. For example, for a shear wall with a nominal thickness of 4", an SCP/steel frame shear wall will weigh approximately 4 psf. A 4" nominal thickness masonry wall (using lightweight CMU) will weigh approximately 30 psf. As a result, for a 4" wall with a nominal racking shear strength requirement of 700 plf, the specific wall racking strength of the SCP is 175 plf/psf, the specific wall racking strength of the CMU wall is 23.3 plf/psf. The specific wall racking strength advantage of the SCP wall versus CMU is true over the full range of racking strengths considered (200-1200 plf nominal) and for wall thicknesses of 4" to 12".

The present system having a vertical shear diaphragm on light gauge cold rolled metal frame also is typically water durable. Preferably the vertical shear diaphragm load carrying capacity of a system of the present invention will not be lessened by more than 25% (more preferably will not be lessened by more than 20%) when exposed to water in a test wherein a 2 inch head of water is maintained over a horizontally oriented diaphragm of ¾ inch thick SCP panels fastened on a 10 foot by 20 foot metal frame for a period of 24 hours. In this test, the 2 inch head is maintained by checking, and replenishing water, at 15 minute intervals. Then the system is reoriented vertically and the vertical shear diaphragm load carrying capacity of the system is measured.

Preferably the system of the present invention will not absorb more than 0.7 pounds per square foot of water when exposed to water in a test wherein a 2 inch head of water is maintained over ¾ inch thick SCP panels fastened on a 10 foot by 20 foot metal frame for a period of 24 hours. In this test, the 2 inch head is maintained by checking, and replenishing water, at 15 minute intervals.

Also, combining non-combustible SCP panels with metal framing results in an entire system which resists swelling due to moisture. Preferably in the system of the present invention a 10 foot wide by 20 foot long by ¾ inch thick diaphragm of the SCP panels attached to a 10 foot by 20 foot metal frame will not swell more than 5% when exposed to a 2 inch head of water maintained over the SCP panels fastened on the metal frame for a period of 24 hours. In this test, the 2 inch head is maintained by checking, and replenishing water, at 15 minute intervals.

Also, the present shear wall system of a vertical diaphragm of SCP panel on metal frame leads to a mold and mildew resistant shear wall system. Preferably every component of the system of the present invention meets ASTM G-21 in which the system achieves approximately a rating of 1 and meets ASTM D-3273 in which the system achieves approximately a rating of 10. Preferably the system of the present invention supports substantially zero bacteria growth when clean.

Another preferred attribute of the present shear wall system of a horizontal diaphragm of SCP panel on metal frame is that preferably it is inedible to termites.

A potential advantage of the present system is that, due to its being lightweight and strong, the combination of the present shear wall system of a vertical diaphragm of ¾ or ½ inch thick SCP panel on metal frame permits efficient use of building volume for a given building footprint to permit maximization of building volume for the given building footprint. Thus, the present system may allow for more efficient building volume to allow more shear wall to ceiling height or even a greater number of shear walls in zoning areas with building height restrictions.

Building codes and design standards contain minimum thickness requirements for masonry shear walls. The minimum nominal thickness for masonry (CMU) shear walls in a one story building is 6 inches. The minimum thickness of masonry shear walls (CMU) for buildings more than 1 story is 8 inches. SCP with steel framing shear walls do not have a similar minimum requirement, and can be designed per established engineering principles at thicknesses of less than 8 inches for multi-story buildings, and at thicknesses of less than 6 inches for single story buildings. Using a 6 inch thick SCP/steel frame shear wall to replace an 8 inch thick masonry shear wall can result in a significant increase in useable building volume.

As an example, we will consider a 3 story, 30,000 square foot building with 10,000 square feet per floor, with a floor to ceiling height of 10 feet. The building is assumed to be 100 feet square, resulting in a perimeter of 400 linear feet. We will further assume that there are 100 linear feet of shear walls required in the core of the building to satisfy shear requirements for the building design. Using 6 inch thick SCP/steel frame shear walls (including the perimeter walls) instead of 8 inch thick masonry shear walls (including the perimeter walls) results in an increase of 2500 cubic feet of useable building volume in the 3 story, 30,000 square foot example.

As in the example described above, a building using SCP combined with steel framing for shear walls will have a reduced dead load compared to a building that uses CMU walls of the same thickness and height for shear walls. As an example we will consider a building requiring 200 linear feet of shear wall with a nominal racking shear strength requirement of 500 plf for the shear walls, using 4" wide shears walls, with a wall height of 8 feet. In this case, the use of SCP combined with metal framing reduces the dead load of the shear walls in the building by 41,600 pounds compared to the use of CMU shear walls. This reduction in dead load may result in a reduction in the size of structural members in the lower floors of the building or reduce the size of the building foundation.

The lightweight nature of this system typically avoids the dead load associated with masonry or concrete wall systems. Less dead load also allows building comparable size structures on less stable soil possessing relatively low bearing capacities.

In contrast to plywood, the present system potentially has the advantage of potentially being non-directional. In other words, the panels of the present system may be placed with their long dimension parallel or perpendicular to the metal joists of the frame without losing strength or load carrying characteristics. Thus, the ability of the system to support dead and live loads without breaking is the same regardless of the orientation of the SCP panel on the metal framing.

Typical compositions for embodiments of panels of the present invention which achieve the combination of low density, improved flexural strength, and nailability/cuttability comprise inorganic binder (examples—gypsum-cement, Portland cement or other hydraulic cements) having, distributed throughout the full thickness of the panel, selected glass fibers, lightweight fillers (examples—hollow glass microspheres, hollow ceramic microspheres and/or perlite uniformly), and superplasticizer/high-range water reducing admixtures (examples—polynapthalene sulfonates, poly acrylates, etc.).

The system of the present invention may employ single layer or multi-layer SCP panels. In the multi-layer SCP panel the layers may be the same or different. For example, the SCP panel may have an inner layer of a continuous phase and at least one outer layer of a continuous phase on each opposed side of the inner layer, wherein at least one outer layer on each opposed side of the inner layer has a higher percentage of glass fibers than the inner layer. This has the ability to stiffen, strengthen and toughen the panel.

A typical panel is made from a mixture of water and inorganic binder with the selected glass fibers, lightweight ceramic microspheres and superplasticizer throughout the mixture.

Other additives such as accelerating and retarding admixtures, viscosity control additives may optionally be added to the mixture to meet the demands of the manufacturing process involved.

A single or multi layer panel may also be provided with a sheet of mesh, e.g., fiber glass mesh if desired.

In embodiments having multiple (two or more) layers, the composition of the layers may be the same or different. For example, a multi-layer panel structure may be created to contain at least one outer layer having improved nailability and cutability. This is provided by using a higher water-to-reactive powder (defined below) ratio in making the outer layer(s) relative to the core of the panel. A small thickness of the skin coupled with a small dosage of polymer content may improve the nailability without necessarily failing the non-combustibility test. Of course, high dosages of polymer content would lead to failure of the product in the non-combustibility test.

The glass fibers can be used alone or in combination with other types of non-combustible fibers such as steel fibers.

As previously discussed, there is a need for a light, non-combustible shear wall system to replace wood frames sheathed with plywood or OSB shear wall panels. There is also a need for a light economical replacement for shear wall systems constructed with poured concrete or unit masonry.

The SCP panels may be connected to the studs mechanically or by adhesive. Connecting the SCP panels to the studs may achieve a composite action such that the studs and panels work together to carry greater loads than the framing alone.

BRIEF DESCRIPTION OF THE DRAWINGS

FIG. 19 shows a photograph of the SCP panel and metal frame shear wall mounted on the test apparatus of FIG. 16 at design load.

FIG. 20 shows a photograph of the SCP panel and metal frame shear wall mounted on the test apparatus of FIG. 16 at failure.

FIG. 22 is a perspective view of a slurry feed station of the type used in a process for making SCP panels.

FIG. 23 is a fragmentary overhead plan view of an embedment device suitable for use with a process for making SCP panels.

DETAILED DESCRIPTION OF THE INVENTION

Figure 1:
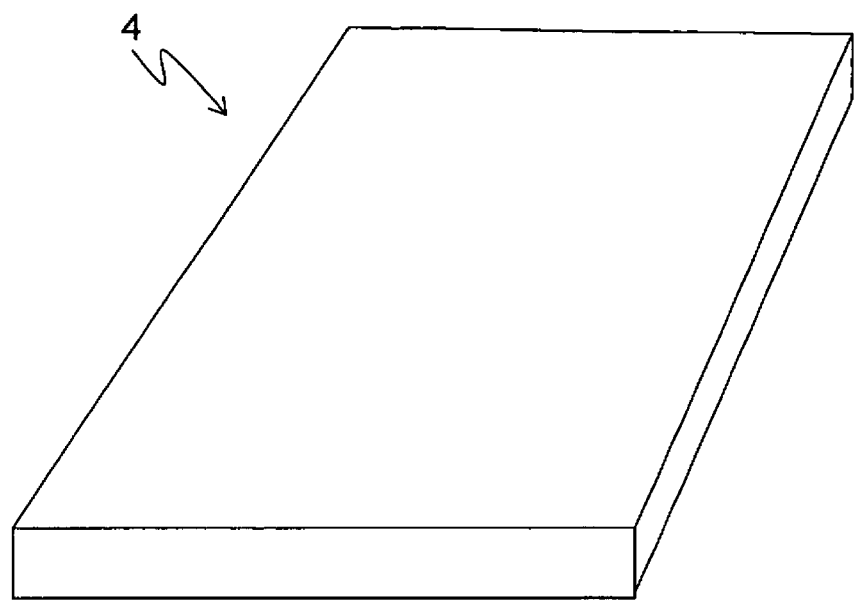
FIG. 1 is a perspective view of a single layer SCP panel for employing with metal framing in the non-combustible shear wall system of the present invention.

FIG. 1 is a schematic side view of a single layer SCP panel 4 for employing with metal framing in the system of the present invention. The principal starting materials used to make such SCP panels are inorganic binder, e.g., calcium sulfate alpha hemihydrate, hydraulic cement, and pozzolanic materials, lightweight filler, e.g., one or more of perlite, ceramic microspheres, or glass microspheres, as well as superplasticizer, e.g., polynapthalene sulphonates and/or poly acrylates, water, and optional additives.

Metal Frames

The frames may be any metal, e.g., steel or galvanized steel, framing systems suitable for supporting shear walls. Typical frames include C-Studs having openings therein for passing plumbing and electrical lines through the shear wall.

Figure 2:
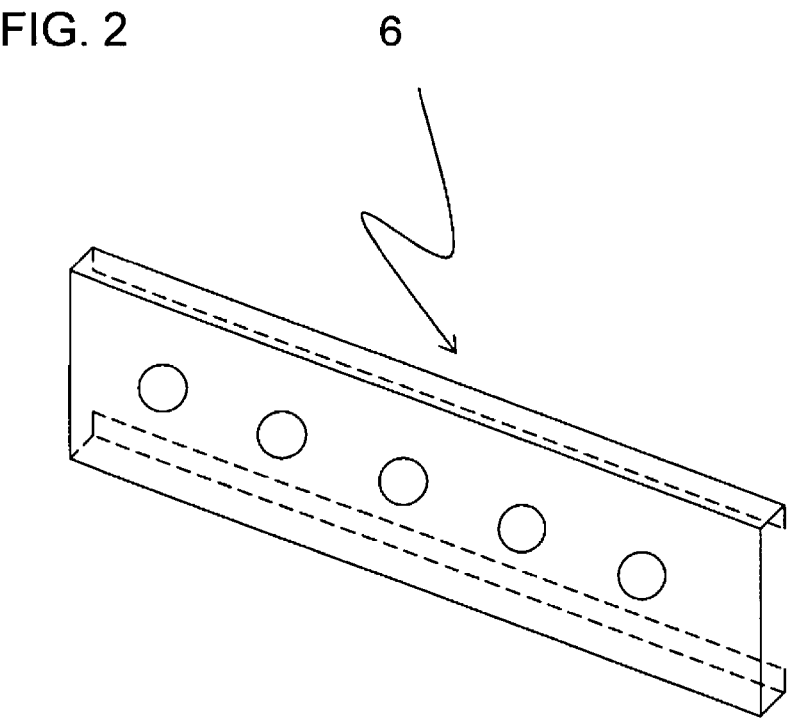
FIG. 2 is a schematic side view of a metal C-stud for employing with a structural cementitious panel (SCP) panel in the non-combustible shear wall system of the present invention.

A typical C-Stud 6 is shown in FIG. 2. The C-shaped stud has a stud web and an upper Stud leg protruding from the joist web and a lower joist leg protruding from the stud web. Typically the stud web has one or more openings through the stud web for passing utility lines through the shear wall.

Figure 3:
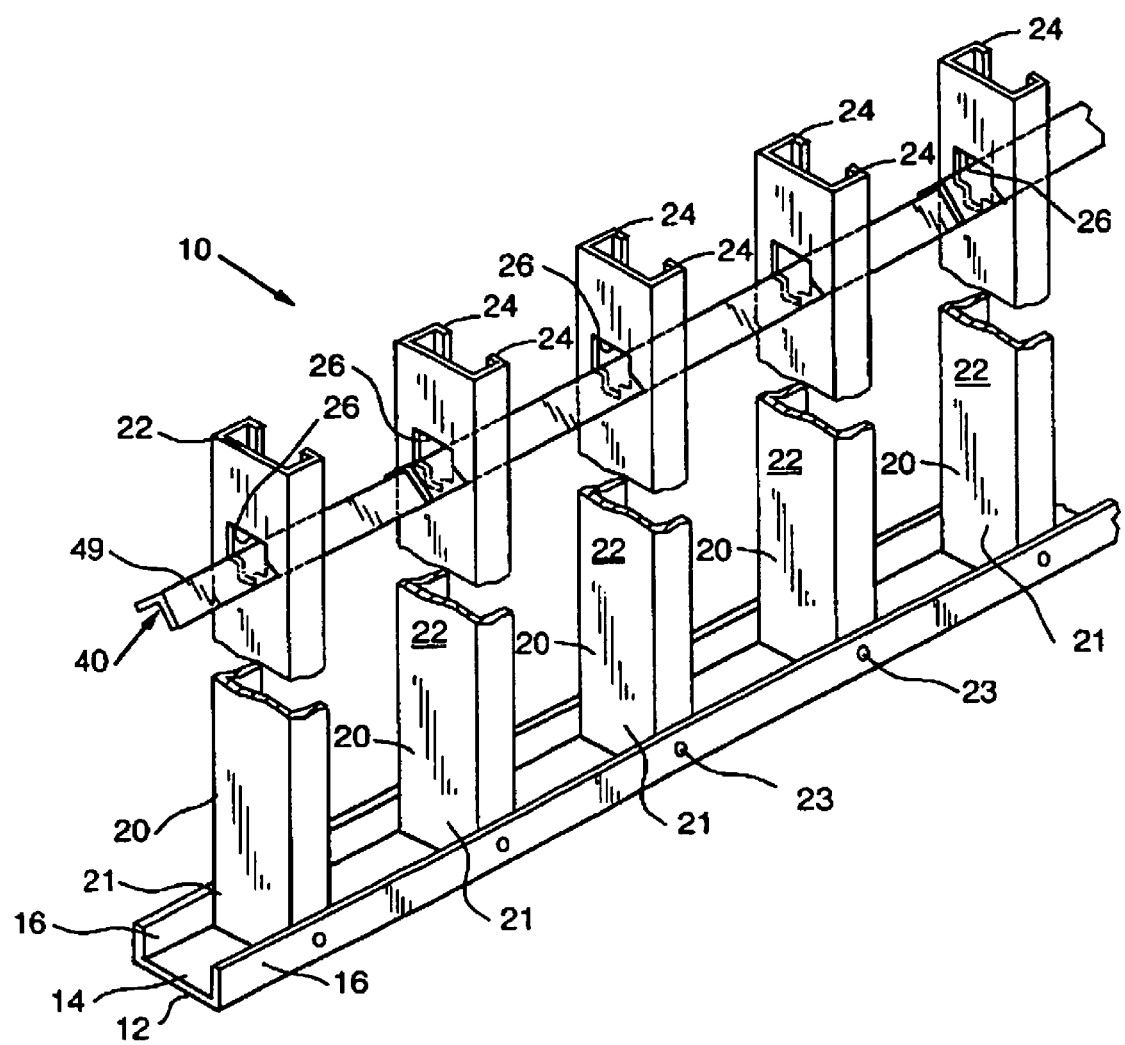
FIG. 3 is a perspective view of a metal stud wall employing a spacer member and studs of typical framing suitable for employing with a structural cementitious panel (SCP) panel in the non-combustible shear wall system of the present invention.

FIG. 3 shows a typical system that may be employed in the present shear wall system. FIG. 3 shows metal stud wall "skeleton" 10 fabricated according to U.S. Pat. No. 6,694,695 to Collins et al., incorporated herein by reference, and suitable for combination with a SCP panel to achieve a shear wall system of the present invention. This metal frame system is merely provided as illustrative as other metal frames may also be employed. In this embodiment, the metal stud wall skeleton 10 includes a lower track 12, a plurality of metal studs 20, and at least one spacer member 40. SCP panels 4 (FIG. 1) may be secured in any known manner to one or both sides of the metal studs 20 to close the wall and form the exterior surface or surfaces of the wall.

Figure 4:
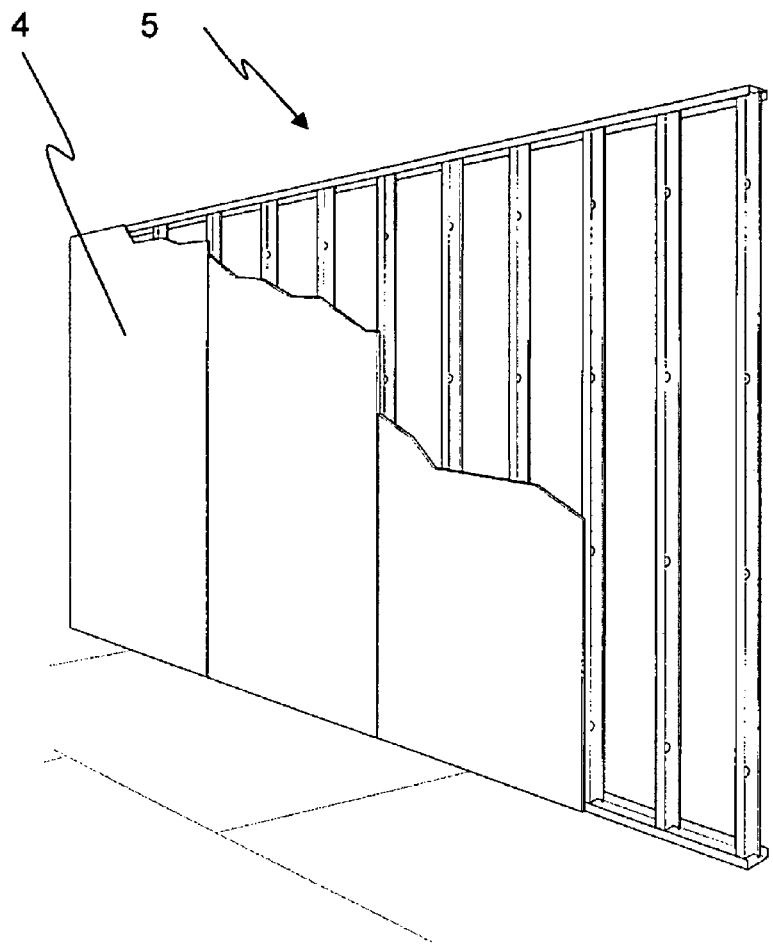
FIG. 4 is a perspective view of a metal stud wall having an SCP panel attached to one side.

FIG. 4 is a perspective view of a metal stud wall 5 having an SCP panel 4 attached to one side.

U.S. Pat. No. 6,694,695 to Collins et al. discloses that, while wooden studs are formed of solid wood, typically having nominal cross section dimensions of two inches by four inches, the much greater structural strength of metal, such as twenty-gauge galvanized steel allows building studs to be employed which are not solid, but rather are hollow and have a channel or "C-shaped" cross section. To conform to the architectural plans and building materials developed over the years based on the use of wooden studs having specific cross sectional dimensions, commercially available metal studs are constructed with the same outer dimensions in which wooden studs have been manufactured for many years. Specifically, metal studs are typically formed of sheet metal bent to encompass a cross sectional area having nominal dimensions of two inches by four inches.

For ease of fabrication the metal studs are formed of sheet metal bent into a generally "U-shaped" cross section and in which a relatively broad central web is flanked by a pair of narrower sides that are bent at right angles to the web or base. The web typically has a uniform nominal width of either four inches or three and one half inches, and the sides of the U-shaped stud typically extend a nominal distance of two inches from the web. To enhance structural rigidity the edges of the sides of the metal stud are normally bent over into a plane parallel to and spaced from the plane of the web. These turned over edges of the side walls thereby form marginal lips which are typically one quarter to one half an inch in width. The finished stud therefore has a generally "C-shaped" cross section.

The outside dimensions of the metal framing members and studs, and the weight or gauge of the member or stud, vary. Typically the members are fabricated to be approximately 4 inches wide by 2 inches deep, corresponding thereby to the width and depth of wood framing and stud members, in which case the lips may extend ¼ to ½ inch from the sides of the studs. Eighteen to 20 gauge metal may be used for light gauge, residential construction and commercial wall construction. A heavier range of metal gauge is used in some residential and commercial framing and particularly in multiple story commercial construction.

The overhead beams that extend along the tops of the studs in interior building wall construction have a U-shaped configuration. They are each formed with a horizontally disposed web from which a pair of side walls depends vertically on opposite sides of the web. The side walls embrace the sides of the vertical studs so that the upper extremities of the studs extend perpendicular into the concave, downwardly facing channel formed by the overhead beam. The spacing of the studs along the length of the beam is typically either sixteen or twenty-four inches.

There has developed a variety of methods for connecting and securing metal frames and wall studs. At the most basic level, metal studs are inserted into and secured within metal tracks by drilling and screwing, from the outside wall of the track into an adjoining metal stud. Similarly, commercially available devices for interconnecting metal framing members, as for example tie brackets, shear connectors and plate connectors, typically use screws and bolts applied from the outside of the track or stud member inwards.

Metal studs and framing members have been modified to include saw or punch slots, tabs and brackets intended to facilitate the interconnection of these studs and framing member to adjoining studs and framing members and/or to cross-bars and other non-framing members that serve to reinforce the studs and framing members. Known connectors, including bracket, plate and tie connectors, presently used to tie together and interconnect metal studs, are generally drilled and screwed on site. Drilling and screwing unsecured connectors pose a safety risk to the worker since the connectors tend to be small and light, and thus easily grabbed and spun by a hand drill.

U.S. Pat. No. 5,687,538 discloses a structural framing member with a C-shaped cross section comprising of a main planar surface and two planar side walls at right angles suitable for use with the present shear wall system. The side walls present an inwardly turned lip formed substantially parallel to the base. The capacity of the metal framing joist sections is increased by embossing longitudinal stiffeners perpendicular to the top and bottom side walls, with a minimum depth of 0.01" (0.025 cm), continuous along the face of the main planar surface for the full length of the section. By bridging these longitudinal stiffeners with, but not limiting to, diagonal embossed stiffeners, a series of adjoining geometric shapes between longitudinal chords has been created to increase the rigidity of the web via adjoining geometric stiffeners which will carry the load by axial deformation rather than pure shear deformation.

Calcium Sulfate Hemihydrate

Calcium sulfate hemihydrate, which may be used in panels of the invention, is made from gypsum ore, a naturally occurring mineral, (calcium sulfate dihydrate $CaSO_4.2H_2O$). Unless otherwise indicated, "gypsum" will refer to the dihydrate form of calcium sulfate. After being mined, the raw gypsum is thermally processed to form a settable calcium sulfate, which may be anhydrous, but more typically is the hemihydrate, $CaSO_4.\frac{1}{2}H_2O$. For the familiar end uses, the settable calcium sulfate reacts with water to solidify by forming the dihydrate (gypsum). The hemihydrate has two recognized morphologies, termed alpha hemihydrate and beta hemihydrate. These are selected for various applications based on their physical properties and cost. Both forms react with water to form the dihydrate of calcium sulfate. Upon hydration, alpha hemihydrate is characterized by giving rise to rectangular-sided crystals of gypsum, while beta hemihydrate is characterized by hydrating to produce needle-shaped crystals of gypsum, typically with large aspect ratio. In the present invention either or both of the alpha or beta forms may be used depending on the mechanical performance desired.

The beta hemihydrate forms less dense microstructures and is preferred for low density products. The alpha hemihydrate forms more dense microstructures having higher strength and density than those formed by the beta hemihydrate. Thus, the alpha hemihydrate could be substituted for beta hemihydrate to increase strength and density or they could be combined to adjust the properties.

A typical embodiment for the inorganic binder used to make panels of the present invention comprises of hydraulic cement such as Portland cement, high alumina cement, pozzolan-blended Portland cement, or mixtures thereof.

Another typical embodiment for the inorganic binder used to make panels of the present invention comprises a blend containing calcium sulfate alpha hemihydrate, hydraulic cement, pozzolan, and lime.

Hydraulic Cement

ASTM defines "hydraulic cement" as follows: a cement that sets and hardens by chemical interaction with water and is capable of doing so under water. There are several types of hydraulic cements that are used in the construction and building industries. Examples of hydraulic cements include Portland cement, slag cements such as blast-furnace slag cement and super-sulfated cements, calcium sulfoaluminate cement, high-alumina cement, expansive cements, white cement, and rapid setting and hardening cements. While calcium sulfate hemihydrate does set and harden by chemical interaction with water, it is not included within the broad definition of hydraulic cements in the context of this invention. All of the aforementioned hydraulic cements can be used to make the panels of the invention.

The most popular and widely used family of closely related hydraulic cements is known as Portland cement. ASTM defines "Portland cement" as a hydraulic cement produced by pulverizing clinker consisting essentially of hydraulic calcium silicates, usually containing one or more of the forms of calcium sulfate as an interground addition. To manufacture Portland cement, an intimate mixture of limestone, argallicious rocks and clay is ignited in a kiln to produce the clinker, which is then further processed. As a result, the following four main phases of Portland cement are produced: tricalcium silicate ($3CaO.SiO_2$, also referred to as $C_3S$), dicalcium silicate ($2CaO.SiO_2$, called $C_2S$), tricalcium aluminate ($3CaO.Al_2O_3$ or $C_3A$), and tetracalcium aluminoferrite ($4CaO.Al_2O_3.Fe_2O_3$ or $C_4AF$). Other compounds present in minor amounts in Portland cement include calcium sulfate and other double salts of alkaline sulfates, calcium oxide, and magnesium oxide. Of the various recognized classes of Portland cement, Type III Portland cement (ASTM classification) is preferred for making the panels of the invention, because of its fineness it has been found to provide greater strength. The other recognized classes of hydraulic cements including slag cements such as blast-furnace slag cement and super-sulfated cements, calcium sulfoaluminate cement, high-alumina cement, expansive cements, white cement, rapidly setting and hardening cements such as regulated set cement and VHE cement, and the other Portland cement types can also be successfully used to make the panels of the present invention. The slag cements and the calcium sulfoaluminate cement have low alkalinity and are also suitable to make the panels of the present invention.

Fibers

Glass fibers are commonly used as insulating material, but they have also been used as reinforcing materials with various matrices. The fibers themselves provide tensile strength to materials that may otherwise be subject to brittle failure. The fibers may break when loaded, but the usual mode of failure of composites containing glass fibers occurs from degradation and failure of the bond between the fibers and the continuous phase material. Thus, such bonds are important if the reinforcing fibers are to retain the ability to increase ductility and strengthen the composite over time. It has been found that glass fiber reinforced cements do lose strength as time passes, which has been attributed to attack on the glass by the lime which is produced when cement is cured. One possible way to overcome such attack is to cover the glass fibers with a protective layer, such as a polymer layer. In general, such protective layers may resist attack by lime, but it has been found that the strength is reduced in panels of the invention and, thus, protective layers are not preferred. A more expensive way to limit lime attack is to use special alkali-resistant glass fibers (AR glass fibers), such as Nippon Electric Glass (NEG) 350Y. Such fibers have been found to provide superior bonding strength to the matrix and are, thus, preferred for panels of the invention. The glass fibers are monofilaments that have a diameter from about 5 to 25 microns (micrometers) and typically about 10 to 15 microns (micrometers). The filaments generally are combined into 100 filament strands, which may be bundled into rovings containing about 50 strands. The strands or rovings will generally be chopped into suitable filaments and bundles of filaments, for example, about 0.25 to 3 inches (6.3 to 76 mm) long, typically 1 to 2 inches (25 to 50 mm).

It is also possible to include other non-combustible fibers in the panels of the invention, for example, steel fibers are also potential additives.

Pozzolanic Materials

As has been mentioned, most Portland and other hydraulic cements produce lime during hydration (curing). It is desirable to react the lime to reduce attack on glass fibers. It is also known that when calcium sulfate hemihydrate is present, it reacts with tricalcium aluminate in the cement to form ettringite, which can result in undesirable cracking of the cured product. This is often referred to in the art as "sulfate attack." Such reactions may be prevented by adding "pozzolanic" materials, which are defined in ASTM C618-97 as " . . . siliceous or siliceous and aluminous materials which in themselves possess little or no cementitious value, but will, in finely divided form and in the presence of moisture, chemically react with calcium hydroxide at ordinary temperatures to form compounds possessing cementitious properties." One often used pozzolanic material is silica fume, a finely divided amorphous silica which is the product of silicon metal and ferro-silicon alloy manufacture. Characteristically, it has a high silica content and a low alumina content. Various natural and man-made materials have been referred to as having pozzolanic properties, including pumice, perlite, diatomaceous earth, tuff, trass, metakaolin, microsilica, ground granulated blast furnace slag, and fly ash. While silica fume is a particularly convenient pozzolan for use in the panels of the invention, other pozzolanic materials may be used. In contrast to silica fume, metakaolin, ground granulated blast furnace slag, and pulverized fly ash have a much lower silica content and large amounts of alumina, but can be effective pozzolanic materials. When silica fume is used, it will constitute about 5 to 20 wt. %, preferably 10 to 15 wt. %, of the reactive powders (i.e., hydraulic cement, calcium sulfate alpha hemihydrate, silica fume, and lime). If other pozzolans are substituted, the amounts used will be chosen to provide chemical performance similar to silica fume.

Lightweight Fillers/Microspheres

The lightweight panels employed in systems of the present invention typically have a density of 65 to 90 pounds per cubic foot, preferably 65 to 85 pounds per cubic foot, more preferably 72 to 80 pounds per cubic foot. In contrast, typical Portland cement based panels without wood fiber will have densities in the 95 to 110 pcf range, while the Portland Cement based panels with wood fibers will be about the same as SCP (about 65 to 85 pcf).

To assist in achieving these low densities the panels are provided with lightweight filler particles. Such particles typically have an average diameter (average particle size) of about 10 to 500 microns (micrometers). More typically they have a mean particle diameter (mean particle size) from 50 to 250 microns (micrometers) and/or fall within a particle diameter (size) range of 10 to 500 microns. They also typically have a particle density (specific gravity) in the range from 0.02 to 1.00. Microspheres or other lightweight filler particles serve an important purpose in the panels of the invention, which would otherwise be heavier than is desirable for building panels. Used as lightweight fillers, the microspheres help to lower the average density of the product. When the microspheres are hollow, they are sometimes referred to as microballoons.

When the microspheres are hollow, they are sometimes referred to as microballoons.

The microspheres are either non-combustible themselves or, if combustible, added in sufficiently small amounts to not make the SCP panel combustible. Typical lightweight fillers for including in mixtures employed to make panels of the present invention are selected from the group consisting of ceramic microspheres, polymer microspheres, perlite, glass microspheres, and/or fly ash cenospheres.

Ceramic microspheres can be manufactured from a variety of materials and using different manufacturing processes. Although a variety of ceramic microspheres can be utilized as a filler component in the panels of the invention, the preferred ceramic microspheres of the invention are produced as a coal combustion by-product and are a component of the fly ash found at coal fired utilities, for example, EXTENDOSPHERES-SG made by Kish Company Inc., Mentor, Ohio or FILLITE® Brand ceramic microspheres made by Trelleborg Fillite Inc., Norcross, Ga. USA. The chemistry of the preferred ceramic microspheres of the invention is predominantly silica ($SiO_2$) in the range of about 50 to 75 wt. % and alumina ($Al_2O_3$) in the range of about 15 to 40 wt. %, with up to 35 wt. % of other materials. The preferred ceramic microspheres of the invention are hollow spherical particles with diameters in the range of 10 to 500 microns (micrometers), a shell thickness typically about 10% of the sphere diameter, and a particle density preferably about 0.50 to 0.80 g/mL. The crushing strength of the preferred ceramic microspheres of the invention is greater than 1500 psi (10.3 MPa) and is preferably greater than 2500 psi (17.2 MPa).

Preference for ceramic microspheres in the panels of the invention primarily stems from the fact that they are about three to ten times stronger than most synthetic glass microspheres. In addition, the preferred ceramic microspheres of invention are thermally stable and provide enhanced dimensional stability to the panel of invention. Ceramic microspheres find use in an array of other applications such as adhesives, sealants, caulks, roofing compounds, PVC shear walling, paints, industrial coatings, and high temperature-resistant plastic composites. Although they are preferred, it should be understood that it is not essential that the microspheres be hollow and spherical, since it is the particle density and compressive strength which provide the panel of the invention with its low weight and important physical properties. Alternatively, porous irregular particles may be substituted, provided that the resulting panels meet the desired performance.

The polymer microspheres, if present, are typically hollow spheres with a shell made of polymeric materials such as polyacrylonitrile, polymethacrylonitrile, polyvinyl chloride or polyvinylidine chloride, or mixtures thereof. The shell may enclose a gas used to expand the polymeric shell during manufacture. The outer surface of the polymer microspheres may have some type of an inert coating such as calcium carbonate, titanium oxides, mica, silica, and talc. The polymer microspheres have a particle density preferably about 0.02 to 0.15 g/mL and have diameters in the range 10 to 350 microns (micrometers). The presence of polymer microspheres may facilitate simultaneous attainment of low panel density and enhanced cutability and nailability.

Other lightweight fillers, for example glass microspheres, perlite or hollow alumino-silicate cenospheres or microspheres derived from fly ash, are also suitable for including in mixtures in combination with or in place of ceramic microspheres employed to make panels of the present invention.

The glass microspheres typically are made of alkali resistant glass materials and may be hollow. Typical glass microspheres are available from GYPTEK INC., Suite 135, 16 Midlake Blvd SE, Calgary, AB, T2X 2X7, CANADA.

In a first embodiment of the invention, only ceramic microspheres are used throughout the full thickness of the panel. The panel typically contains about 35 to 42 weight % of ceramic microspheres uniformly distributed throughout the thickness of the panel.

In a second embodiment of the invention, a blend of lightweight ceramic and glass microspheres is used throughout the full thickness of the panel. The volume fraction of the glass microspheres in the panel of the second embodiment of the invention will typically be in the range of 0 to 15% of the total volume of the dry ingredients, where the dry ingredients of the composition are the reactive powders (examples of reactive powders: hydraulic cement only; blend of hydraulic cement and pozzolan; or blend of hydraulic cement, calcium sulfate alpha hemihydrate, pozzolan, and lime), ceramic microspheres, polymer microspheres, and alkali-resistant glass fibers. A typical aqueous mixture has a ratio of water-to-reactive powders from greater than 0.3/1 to 0.7/1.

If desired the panel may have a single layer as shown in FIG. 3. However, the panel typically is made by a process that applies multiple layers that, depending upon how the layers are applied and cured as well as whether the layers have the same or different compositions, may or may not in the final panel product retain distinct layers.

Figure 5:
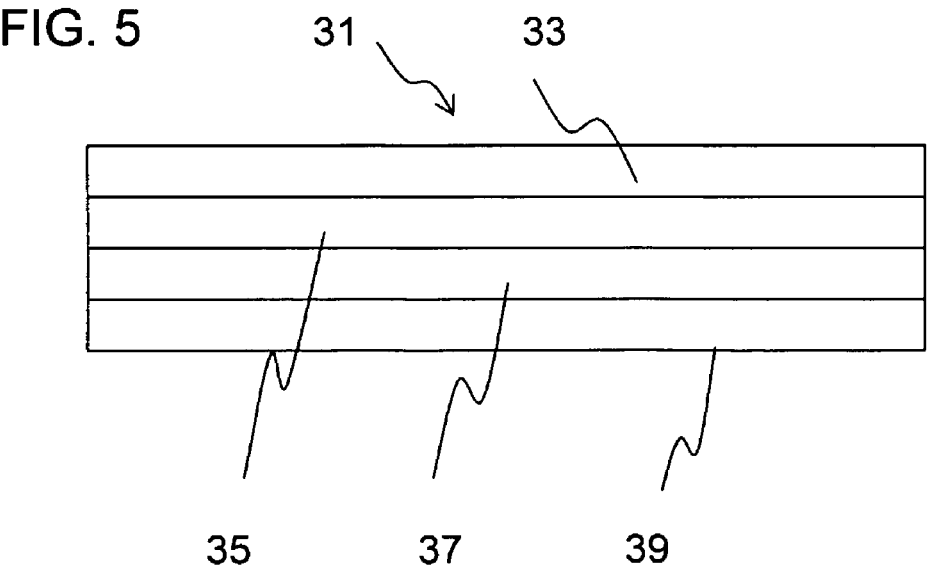
FIG. 5 shows a schematic side view of a multi-layer SCP panel for employing with metal framing in the non-combustible shear wall system of the present invention.

FIG. 5 shows a multi-layer structure of a panel 31 having layers 33, 35, 37 and 39. In the multi-layer structure the composition of the layers may be the same or different. The typical thickness of the layer(s) ranges between about 1/32 to 1.0 inches (about 0.75 to 25.4 mm). Where only one outer layer is used, it typically will be less than 3/8 of the total panel thickness.

Figure 5A:
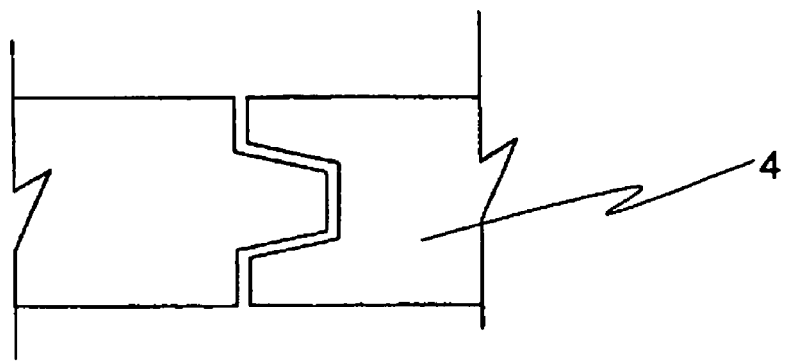
FIGS. 5A-5C illustrate a typical design and dimensions of tongue and groove employed in a ¾ inch (19.1 mm) thick SCP panel (with dimensions in inches).
Figure 5B:
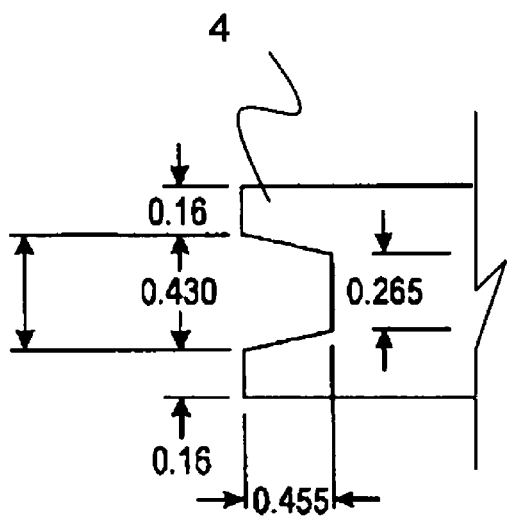
Figure 5C:
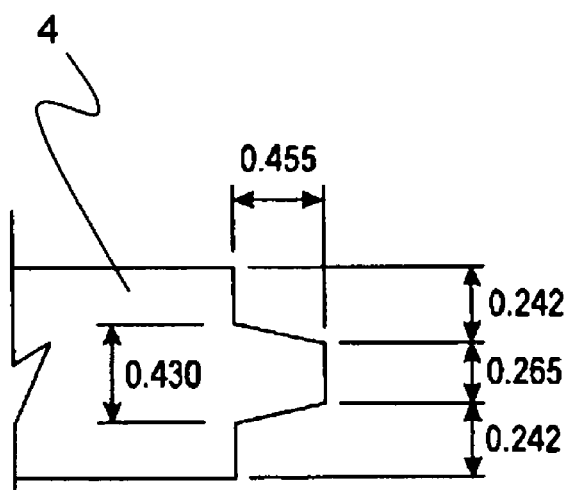

FIGS. 5A-5C illustrate a typical design and dimensions of tongue and groove employed in a 3/4 inch (19.1 mm) thick SCP panel 4.

Figure 6:
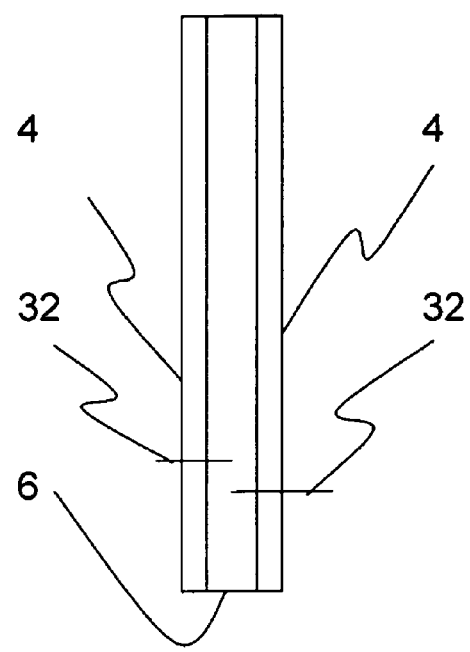
FIG. 6 is a fragmentary cross-section of the SCP panel of FIG. 1 supported on C-stud metal framing of FIG. 1 in the non-combustible shear wall system of the present invention.
Figure 7:
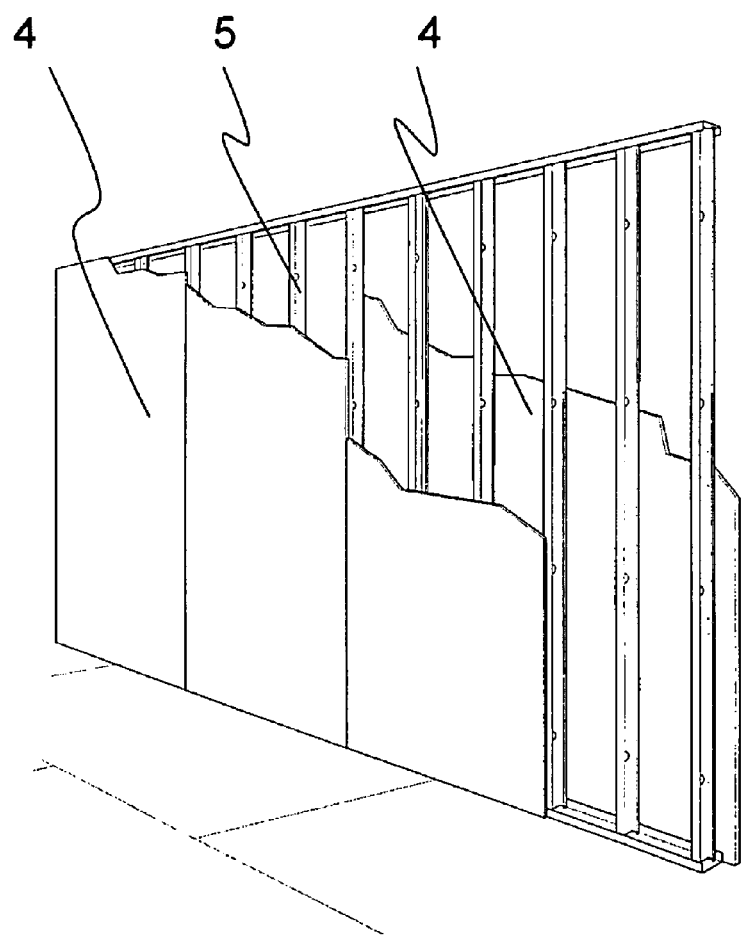
FIG. 7 is a perspective view of a metal stud wall having a respective SCP panel attached to opposing sides.

FIG. 6 is a side elevational view of single-layer SCP panels 4 of FIG. 1 supported on metal framing 6, of FIG. 2 in the system of the present invention. For illustrative purposes fasteners 32 are schematically shown attaching SCP panels 4 to framing 6. In practice the SCP panels 4 may be mechanically or adhesively attached to the framing 6. FIG. 7 is a perspective view of a metal stud wall 5 having respective SCP panels 4 attached to opposing sides.

Formulation of SCP Panels

The components used to make the shear resistant panels of the invention are hydraulic cement, calcium sulfate alpha hemihydrate, an active pozzolan such as silica fume, lime, ceramic microspheres, alkali-resistant glass fibers, superplasticizer (e.g., sodium salt of polynapthalene sulfonate), and water. Typically, both hydraulic cement and calcium sulfate alpha hemihydrate are present. Long term durability of the composite is compromised if calcium sulfate alpha hemihydrate is not present along with silica fume. Water/moisture durability is compromised when Portland cement is not present. Small amounts of accelerators and/or retarders may be added to the composition to control the setting characteristics of the green (i.e., uncured) material. Typical non-limiting additives include accelerators for hydraulic cement such as calcium chloride, accelerators for calcium sulfate alpha hemihydrate such as gypsum, retarders such as DTPA (diethylene triamine pentacetic acid), tartaric acid or an alkali salt of tartaric acid (e.g., potassium tartrate), shrinkage reducing agents such as glycols, and entrained air.

Panels of the invention will include a continuous phase in which alkali-resistant glass fibers and light weight filer, e.g., microspheres, are uniformly distributed. The continuous phase results from the curing of an aqueous mixture of the reactive powders, i.e., blend of hydraulic cement, calcium sulfate alpha hemihydrate, pozzolan, and lime), preferably including superplasticizer and/or other additives.

Typical weight proportions of embodiments of the reactive powders (inorganic binder), e.g., hydraulic cement, calcium sulfate alpha hemihydrate, pozzolan and lime, in the invention, based on dry weight of the reactive powders, are shown in TABLE 1. TABLE 1A lists typical ranges of reactive powders, lightweight filler, and glass fibers in compositions of the present invention.

TABLE 1

| Reactive Powder | Weight Proportion (%) | |
| --- | --- | --- |
| | Broad | Typical |
| Hydraulic Cement | 20-55 | 25-40 |
| Calcium Sulfate Alpha Hemihydrate | 35-75 | 45-65 |
| Pozzolan | 5-25 | 10-15 |
| Lime | up to 3.5 or 0.2 to 3.5 | 0.75-1.25 |

TABLE 1A

| SCP Composition (dry basis) | Typical Weight Proportion (%) | Typical Weight Proportion (%) |
| --- | --- | --- |
| Reactive Powder | 35-70 | 35-68 |
| Lightweight Filler | 20-50 | 23-49 |
| Glass Fibers | 5-20 | 5-17 |

Lime is not required in all formulations of the invention, but it has been found that adding lime provides superior panels and it usually will be added in amounts greater than about 0.2 wt. %. Thus, in most cases, the amount of lime in the reactive powders will be about 0.2 to 3.5 wt. %.

In the first embodiment of the invention, the dry ingredients of the composition will be the reactive powders (i.e., blend of hydraulic cement, calcium sulfate alpha hemihydrate, pozzolan, and lime), ceramic microspheres and alkali-resistant glass fibers, and the wet ingredients of the composition will be water and superplasticizer. The dry ingredients and the wet ingredients are combined to produce the panel of the invention. The ceramic microspheres are uniformly distributed in the matrix throughout the full thickness of the panel. Of the total weight of dry ingredients, the panel of the invention is formed from about 49 to 56 wt. % reactive powders, 35 to 42 wt. % ceramic microspheres and 7 to 12 wt. % alkali-resistant glass fibers. In a broad range, the panel of the invention is formed from 35 to 58 wt. % reactive powders, 34 to 49 wt. % lightweight filler, e.g., ceramic microspheres, and 6 to 17 wt. % alkali-resistant glass fibers of the total dry ingredients. The amounts of water and superplasticizer added to the dry ingredients will be sufficient to provide the desired slurry fluidity needed to satisfy processing considerations for any particular manufacturing process. The typical addition rates for water range between 35 to 60% of the weight of reactive powders and those for superplasticizer range between 1 to 8% of the weight of reactive powders.

The glass fibers are monofilaments having a diameter of about 5 to 25 microns (micrometers), preferably about 10 to 15 microns (micrometers). The monofilaments typically are combined in 100 filament strands, which may be bundled into rovings of about 50 strands. The length of the glass fibers will typically be about 0.25 to 1 or 2 inches (6.3 to 25 or 50 mm) or about 1 to 2 inches (25 to 50 mm) and broadly about 0.25 to 3 inches (6.3 to 76 mm). The fibers have random orientation, providing isotropic mechanical behavior in the plane of the panel.

The second embodiment of the invention contains a blend of ceramic and glass microspheres uniformly distributed throughout the full thickness of the panel. Accordingly, in the second embodiment of the invention, the dry ingredients of the composition will be the reactive powders (hydraulic cement, calcium sulfate alpha hemihydrate, pozzolan, and lime), ceramic microspheres, glass microspheres, and alkali-resistant glass fibers, and the wet ingredients of the composition will be water and superplasticizer. The dry ingredients and the wet ingredients will be combined to produce the panel of the invention. The volume fraction of the glass microspheres in the panel will typically be in the range of 7 to 15% of the total volume of dry ingredients. Of the total weight of dry ingredients, the panel of the invention is formed from about 54 to 65 wt. % reactive powders, 25 to 35 wt. % ceramic microspheres, 0.5 to 0.8 wt. % glass microspheres, and 6 to 10 wt. % alkali-resistant glass fibers. In the broad range, the panel of the invention is formed from 42 to 68 wt. % reactive powders, 23 to 43 wt. % lightweight fillers, e.g., ceramic microspheres, 0.2 to 1.0 wt. % glass microspheres, and 5 to 15 wt. % alkali-resistant glass fibers, based on the total dry ingredients. The amounts of water and superplasticizer added to the dry ingredients will be adjusted to provide the desired slurry fluidity needed to satisfy the processing considerations for any particular manufacturing process. The typical addition rates for water range between 35 to 70% of the weight of reactive powders, but could be greater than 60% up to 70% (weight ratio of water to reactive powder of 0.6/1 to 0.7/1), preferably 65% to 75%, when it is desired to use the ratio of water-to-reactive powder to reduce panel density and improve cutability. The amount of superplasticizer will range between 1 to 8% of the weight of reactive powders. The glass fibers are monofilaments having a diameter of about 5 to 25 microns (micrometers), preferably about 10 to 15 microns (micrometers). They typically are bundled into strands and rovings as discussed above. The length of the glass fibers typically is about 1 to 2 inches (25 to 50 mm) and broadly about 0.25 to 3 inches (6.3 to 76 mm). The fibers will have random orientation providing isotropic mechanical behavior in the plane of the panel.

In the third embodiment of the invention, a multi-layer structure in the panel is created where the outer layer(s) have improved nailability (fastening ability)/cutability. This is achieved by increasing the water-to-cement ratio in the outer layer(s), and/or changing the amount of filler, and/or adding an amount of polymer microspheres sufficiently small such that the panel remains noncombustible. The core of the panel will typically contain ceramic microspheres uniformly distributed throughout the layer thickness or alternatively, a blend of one or more of ceramic microspheres, glass microspheres and fly ash cenospheres.

The dry ingredients of the core layer of this embodiment of the present invention will be the reactive powders (typically hydraulic cement, calcium sulfate alpha hemihydrate, pozzolan, and lime), lightweight filler particles (typically microspheres such as ceramic microspheres alone or one or more of ceramic microspheres, glass microspheres and fly ash cenospheres), and alkali-resistant glass fibers, and the wet ingredients of the core layer are water and superplasticizer. The dry ingredients and the wet ingredients will be combined to produce the core layer of the panel of the invention. Of the total weight of dry ingredients, the core of the panel of the invention preferably is formed from about 49 to 56 wt. % reactive powders, 35 to 42 wt. % hollow ceramic microspheres and 7 to 12 wt. % alkali-resistant glass fibers, or alternatively, about 54 to 65 wt. % reactive powders, 25 to 35 wt. % ceramic microspheres, 0.5 to 0.8 wt. % glass microspheres or fly ash cenospheres, and 6 to 10 wt. % alkali-resistant glass fibers. In the broad range, the core layer of the panel of this embodiment of the present invention is typically formed by about 35 to 58 wt. % reactive powders, 34 to 49 wt. % lightweight fillers, e.g., ceramic microspheres, and 6 to 17 wt. % alkali-resistant glass fibers, based on the total dry ingredients, or alternatively, about 42 to 68 wt. % of reactive powders, 23 to 43 wt. % ceramic microspheres, up to 1.0 wt. %, preferably 0.2 to 1.0 wt. %, other lightweight filler, e.g., glass microspheres or fly ash cenospheres, and 5 to 15 wt. % alkali-resistant glass fibers. The amounts of water and superplasticizer added to the dry ingredients will be adjusted to provide the desired slurry fluidity needed to satisfy the processing considerations for any particular manufacturing process. The typical addition rates for water will range between 35 to 70% of the weight of reactive powders but will be greater than 60% up to 70% when it is desired to use the ratio of water-to-reactive powders to reduce panel density and improve nailability and those for superplasticizer will range between 1 to 8% of the weight of reactive powders. When the ratio of water-to-reactive powder is adjusted, the slurry composition will be adjusted to provide the panel of the invention with the desired properties.

There is generally an absence of polymer microspheres and an absence of polymer fibers that would cause the SCP panel to become combustible.

The dry ingredients of the outer layer(s) of this embodiment of the present invention will be the reactive powders (typically hydraulic cement, calcium sulfate alpha hemihydrate, pozzolan, and lime), lightweight filler particles (typically microspheres such as ceramic microspheres alone or one or more of ceramic microspheres, glass microspheres and fly ash cenospheres), and alkali-resistant glass fibers, and the wet ingredients of the outer layer(s) will be water and superplasticizer. The dry ingredients and the wet ingredients are combined to produce the outer layers of the panel of the invention. In the outer layer(s) of the panel of this embodiment of the present invention, the amount of water is selected to furnish good fastening and cutting ability to the panel. Of the total weight of dry ingredients, the outer layer(s) of the panel of the invention preferably are formed from about 54 to 65 wt. % reactive powders, 25 to 35 wt. % ceramic microspheres, 0 to 0.8 wt. % glass microspheres, and 6 to 10 wt. % alkali-resistant glass fibers. In the broad range, the outer layers of the panel of the invention are formed from about 42 to 68 wt. % reactive powders, 23 to 43 wt. % ceramic microspheres, up to 1.0 wt. % glass microspheres (and/or fly ash cenospheres), and 5 to 15 wt. % alkali-resistant glass fibers, based on the total dry ingredients. The amounts of water and superplasticizer added to the dry ingredients are adjusted to provide the desired slurry fluidity needed to satisfy the processing considerations for any particular manufacturing process. The typical addition rates for water range between 35 to 70% of the weight of reactive powders and particularly greater than 60% up to 70% when the ratio of water-to-reactive powders is adjusted to reduce panel density and improve nailability, and typical addition rates for superplasticizer will range between 1 to 8% of the weight of reactive powders. The preferable thickness of the outer layer(s) ranges between $\frac{1}{32}$ to $\frac{4}{32}$ inches (0.8 to 3.2 mm) and the thickness of the outer layer when only one is used will be less than $\frac{3}{8}$ of the total thickness of the panel.

In both the core and outer layer(s) of this embodiment of the present invention, the glass fibers are monofilaments having a diameter of about 5 to 25 microns (micrometers), preferably 10 to 15 microns (micrometers). The monofilaments typically are bundled into strands and rovings as discussed above. The length typically is about 1 to 2 inches (25 to 50 mm) and broadly about 0.25 to 3 inches (6.3 to 76 mm). The fiber orientation will be random, providing isotropic mechanical behavior in the plane of the panel.

The invention also includes a fourth embodiment of a multi-layer panel having a density of 65 to 90 pounds per cubic foot and capable of resisting shear loads when fastened to framing and comprising a core layer of a continuous phase resulting from the curing of an aqueous mixture, a continuous phase resulting from the curing of an aqueous mixture comprising, on a dry basis, 35 to 70 weight % reactive powder, 20 to 50 weight percent lightweight filler, and 5 to 20 weight % glass fibers, the continuous phase being reinforced with glass fibers and containing the lightweight filler particles, the lightweight filler particles having a particle specific gravity of from 0.02 to 1.00 and an average particle size of about 10 to 500 microns (micrometers); and at least one outer layer of respectively another continuous phase resulting from the curing of an aqueous mixture comprising, on a dry basis, 35 to 70 weight % reactive powder, 20 to 50 weight percent lightweight filler, and 5 to 20 weight % glass fibers, the continuous phase being reinforced with glass fibers and containing the lightweight filler particles, the lightweight filler particles having a particle specific gravity of from 0.02 to 1.00 and an average particle size of about 10 to 500 microns (micrometers) on each opposed side of the inner layer, wherein the at least one outer layer has a higher percentage of glass fibers than the inner layer. For example in FIG. 5, layer 35 could be an inner layer and layers 33, 37, 39 could be outer layers having a higher percentage of glass fibers than the inner layer.

Making a Panel of the Invention

The reactive powders, e.g., blend of hydraulic cement, calcium sulfate alpha hemihydrate, pozzolan, and lime), and lightweight filler, e.g., microspheres, are blended in the dry state in a suitable mixer.

Then, water, a superplasticizer (e.g., the sodium salt of polynapthalene sulfonate), and the pozzolan (e.g., silica fume or metakaolin) are mixed in another mixer for 1 to 5 minutes.

If desired, a retarder (e.g., potassium tartrate) is added at this stage to control the setting characteristics of the slurry. The dry ingredients are added to the mixer containing the wet ingredients and mixed for 2 to 10 minutes to form smooth homogeneous slurry.

The slurry is then combined with glass fibers, in any of several ways, with the objective of obtaining a uniform slurry mixture. The cementitious panels are then formed by pouring the slurry containing fibers into an appropriate mold of desired shape and size. If necessary, vibration is provided to the mold to obtain good compaction of material in the mold. The panel is given required surface finishing characteristics using an appropriate screed bar or trowel.

One of a number of methods to make multi-layer SCP panels is as follows. The reactive powders, e.g., blend of hydraulic cement, calcium sulfate alpha hemihydrate, pozzolan, and lime), and lightweight filler, e.g., microspheres, are blended in the dry state in a suitable mixer. Then, water, a superplasticizer (e.g., the sodium salt of polynapthalene sulfonate), and the pozzolan (e.g., silica fume or metakaolin) are mixed in another mixer for 1 to 5 minutes. If desired, a retarder (e.g., potassium tartrate) is added at this stage to control the setting characteristics of the slurry. The dry ingredients are added to the mixer containing the wet ingredients and mixed for 2 to 10 minutes to form a smooth homogeneous slurry.

The slurry may be combined with the glass fibers in several ways, with the objective of obtaining a uniform mixture. The glass fibers typically will be in the form of rovings that are chopped into short lengths. In a preferred embodiment, the slurry and the chopped glass fibers are concurrently sprayed into a panel mold. Preferably, spraying is done in a number of passes to produce thin layers, preferably up to about 0.25 inches (6.3 mm) thick, which are built up into a uniform panel having no particular pattern and with a thickness of $\frac{1}{4}$ to 1 inch (6.3 to 25.4 mm). For example, in one application, a 3×5 ft (0.91×1.52 m) panel was made with six passes of the spray in the length and width directions. As each layer is deposited, a roller may be used to assure that the slurry and the glass fibers achieve intimate contact. The layers may be leveled with a screed bar or other suitable means after the rolling step. Typically, compressed air will be used to atomize the slurry. As it emerges from the spray nozzle, the slurry mixes with glass fibers that have been cut from a roving by a chopper mechanism mounted on the spray gun. The uniform mixture of slurry and glass fibers is deposited in the panel mold as described above.

If desired the outer surface layers of the panel may contain polymer spheres, or be otherwise constituted, in order that the fasteners used to attach the panel to framing can be driven easily. The preferable thickness of such layers will be about $\frac{1}{32}$ inches to $\frac{4}{32}$ inches (0.8 to 3.2 mm). The same procedure described above by which the core of the panel is made may be used to apply the outer layers of the panel.

Other methods of depositing a mixture of the slurry and glass fibers will occur to those familiar with the panel-making art. For example, rather than using a batch process to make each panel, a continuous sheet may be prepared in a similar manner, which after the material has sufficiently set, can be cut into panels of the desired size. The percentage of fibers relative to the volume of slurry typically constitutes approximately in the range of 0.5% to 3%, for example 1.5%. Typical panels have a thickness of about $\frac{1}{4}$ to $1\frac{1}{2}$ inches (6.3 to 38.1 mm).

Another method of making panels of the present invention is by using the process steps disclosed in U.S. patent application Ser. No. 10/666,294 incorporated herein by reference.

U.S. patent application Ser. No. 10/666,294, incorporated herein by reference, discloses after one of an initial deposition of loosely distributed, chopped fibers or a layer of slurry upon a moving web, fibers are deposited upon the slurry layer. An embedment device compacts the recently deposited fibers into the slurry, after which additional layers of slurry, then chopped fibers are added, followed by more embedment. The process is repeated for each layer of the board, as desired. Upon completion, the board has a more evenly distributed fiber component, which results in relatively strong panels without the need for thick mats of reinforcing fibers, as taught in prior art production techniques for cementitious panels.

More specifically, U.S. patent application Ser. No. 10/666,294 discloses a multi-layer process for producing structural cementitious panels, including: (a.) providing a moving web; (b.) one of depositing a first layer of loose fibers and (c.) depositing a layer of settable slurry upon the web; (d.) depositing a second layer of loose fibers upon the slurry; (e.) embedding the second layer of fibers into the slurry; and (f.) repeating the slurry deposition of step (c.) through step (d.) until the desired number of layers of settable fiber-enhanced slurry in the panel is obtained.

Figure 21:
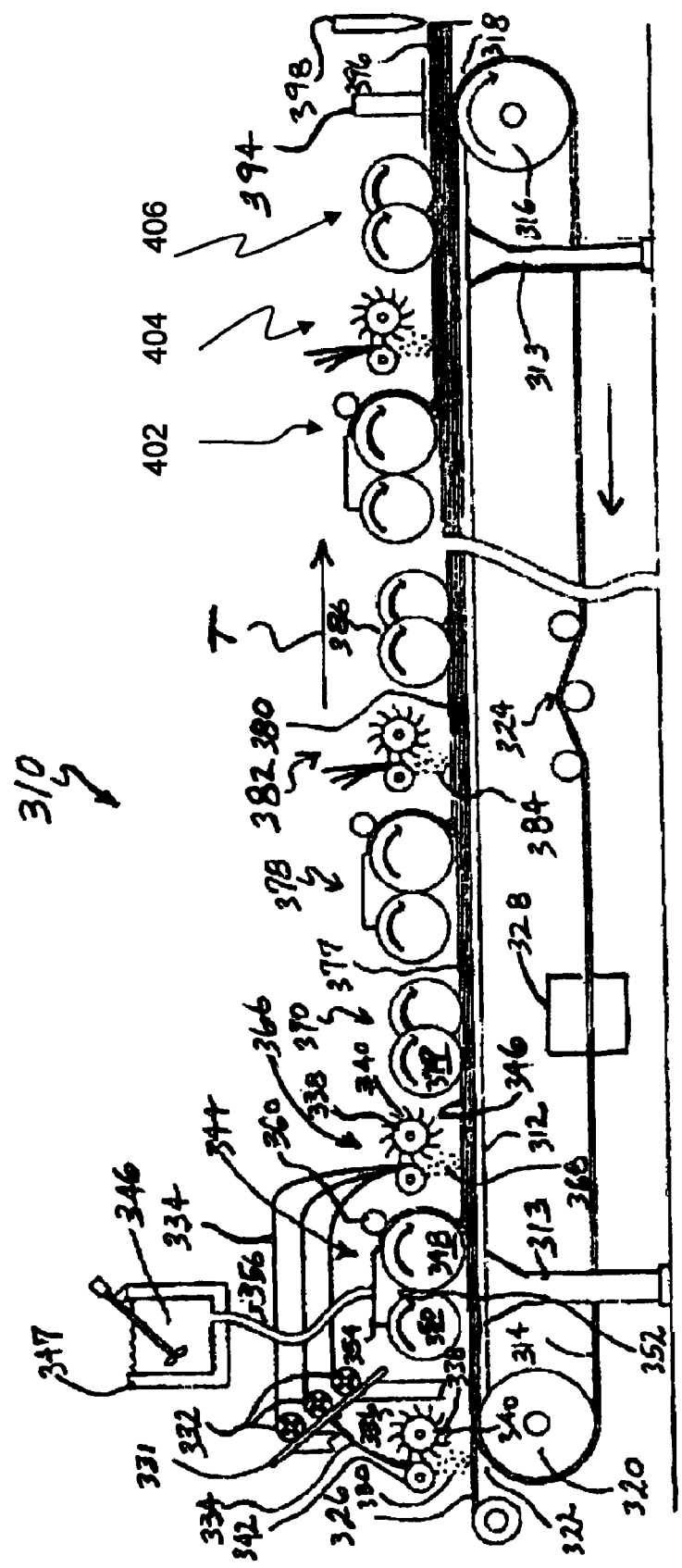
FIG. 21 is a diagrammatic elevational view of an apparatus which is suitable for performing a process for making SCP panels.

FIG. 21 is a diagrammatic elevational view of an apparatus which is suitable for performing the process of U.S. patent application Ser. No. 10/666,294. Referring now to FIG. 21, a structural panel production line is diagrammatically shown and is generally designated 310. The production line 310 includes a support frame or forming table 312 having a plurality of legs 313 or other supports. Included on the support frame 312 is a moving carrier 314, such as an endless rubber-like conveyor belt with a smooth, water-impervious surface, however porous surfaces are contemplated. As is well known in the art, the support frame 312 may be made of at least one table-like segment, which may include designated legs 313. The support frame 312 also includes a main drive roll 316 at a distal end 318 of the frame, and an idler roll 320 at a proximal end 322 of the frame. Also, at least one belt tracking and/or tensioning device 324 is preferably provided for maintaining a desired tension and positioning of the carrier 314 upon the rolls 316, 320.

Also, in the preferred embodiment, a web 326 of Kraft paper, release paper, and/or other webs of support material designed for supporting slurry prior to setting, as is well known in the art, may be provided and laid upon the carrier 314 to protect it and/or keep it clean. However, it is also contemplated that the panels produced by the present line 310 are formed directly upon the carrier 314. In the latter situation, at least one belt washing unit 328 is provided. The carrier 314 is moved along the support frame 312 by a combination of motors, pulleys, belts or chains which drive the main drive roll 316 as is known in the art. It is contemplated that the speed of the carrier 314 may vary to suit the application.

In the apparatus of FIG. 21, structural cementitious panel production is initiated by one of depositing a layer of loose, chopped fibers 330 or a layer of slurry upon the web 326. An advantage of depositing the fibers 330 before the first deposition of slurry is that fibers will be embedded near the outer surface of the resulting panel. A variety of fiber depositing and chopping devices are contemplated by the present line 310, however the preferred system employs at least one rack 331 holding several spools 332 of fiberglass cord, from each of which a cord 334 of fiber is fed to a chopping station or apparatus, also referred to as a chopper 336.

The chopper 336 includes a rotating bladed roll 338 from which project radially extending blades 340 extending transversely across the width of the carrier 314, and which is disposed in close, contacting, rotating relationship with an anvil roll 342. In the preferred embodiment, the bladed roll 338 and the anvil roll 342 are disposed in relatively close relationship such that the rotation of the bladed roll 338 also rotates the anvil roll 342, however the reverse is also contemplated. Also, the anvil roll 342 is preferably covered with a resilient support material against which the blades 340 chop the cords 334 into segments. The spacing of the blades 340 on the roll 338 determines the length of the chopped fibers. As is seen in FIG. 21, the chopper 336 is disposed above the carrier 314 near the proximal end 322 to maximize the productive use of the length of the production line 310. As the fiber cords 334 are chopped, the fibers 330 fall loosely upon the carrier web 326.

Next, a slurry feed station, or a slurry feeder 344 receives a supply of slurry 346 from a remote mixing location 347 such as a hopper, bin or the like. It is also contemplated that the process may begin with the initial deposition of slurry upon the carrier 314. The slurry is preferably comprised of varying amounts of Portland cement, gypsum, aggregate, water, accelerators, plasticizers, foaming agents, fillers and/or other ingredients, and described above and in the patents listed above which have been incorporated by reference for producing SCP panels. The relative amounts of these ingredients, including the elimination of some of the above or the addition of others, may vary to suit the use.

While various configurations of slurry feeders 344 are contemplated which evenly deposit a thin layer of slurry 346 upon the moving carrier 314, the preferred slurry feeder 344 includes a main metering roll 348 disposed transversely to the direction of travel of the carrier 314. A companion or back up roll 350 is disposed in close parallel, rotational relationship to the metering roll 348 to form a nip 352 there between. A pair of sidewalls 354, preferably of non-stick material such as Teflon® brand material or the like, prevents slurry 346 poured into the nip 352 from escaping out the sides of the feeder 344.

The feeder 344 deposits an even, relatively thin layer of the slurry 346 upon the moving carrier 314 or the carrier web 326. Suitable layer thicknesses range from about 0.05 inch to 0.20 inch. However, with four layers preferred in the preferred structural panel produced by the present process, and a suitable building panel being approximately 0.5 inch, an especially preferred slurry layer thickness is approximately 0.125 inch.

Referring now to FIGS. 21 and 22, to achieve a slurry layer thickness as described above, several features are provided to the slurry feeder 344. First, to ensure a uniform disposition of the slurry 346 across the entire web 326, the slurry is delivered to the feeder 344 through a hose 356 located in a laterally reciprocating, cable driven, fluid powered dispenser 358 of the type well known in the art. Slurry flowing from the hose 356 is thus poured into the feeder 344 in a laterally reciprocating motion to fill a reservoir 359 defined by the rolls 348, 350 and the sidewalls 354. Rotation of the metering roll 348 thus draws a layer of the slurry 346 from the reservoir.

Next, a thickness monitoring or thickness control roll 360 is disposed slightly above and/or slightly downstream of a vertical centerline of the main metering roll 348 to regulate the thickness of the slurry 346 drawn from the feeder reservoir 357 upon an outer surface 362 of the main metering roll 348. Also, the thickness control roll 360 allows handling of slurries with different and constantly changing viscosities. The main metering roll 348 is driven in the same direction of travel "T" as the direction of movement of the carrier 314 and the carrier web 326, and the main metering roll 348, the backup roll 350 and the thickness monitoring roll 360 are all rotatably driven in the same direction, which minimizes the opportunities for premature setting of slurry on the respective moving outer surfaces. As the slurry 346 on the outer surface 362 moves toward the carrier web 326, a transverse stripping wire 364 located between the main metering roll 348 and the carrier web 326 ensures that the slurry 346 is completely deposited upon the carrier web and does not proceed back up toward the nip 352 and the feeder reservoir 359. The stripping wire 364 also helps keep the main metering roll 348 free of prematurely setting slurry and maintains a relatively uniform curtain of slurry.

A second chopper station or apparatus 366, preferably identical to the chopper 336, is disposed downstream of the feeder 344 to deposit a second layer of fibers 368 upon the slurry 346. In the preferred embodiment, the chopper apparatus 366 is fed cords 334 from the same rack 331 that feeds the chopper 336. However, it is contemplated that separate racks 331 could be supplied to each individual chopper, depending on the application.

Referring now to FIGS. 21 and 23, next, an embedment device, generally designated 370 is disposed in operational relationship to the slurry 346 and the moving carrier 314 of the production line 310 to embed the fibers 368 into the slurry 346. While a variety of embedment devices are contemplated, including, but not limited to vibrators, sheep's foot rollers and the like, in the preferred embodiment, the embedment device 370 includes at least a pair of generally parallel shafts 372 mounted transversely to the direction of travel "T" of the carrier web 326 on the frame 312. Each shaft 372 is provided with a plurality of relatively large diameter disks 374 which are axially separated from each other on the shaft by small diameter disks 376.

During SCP panel production, the shafts 372 and the disks 374, 376 rotate together about the longitudinal axis of the shaft. As is well known in the art, either one or both of the shafts 372 may be powered, and if only one is powered, the other may be driven by belts, chains, gear drives or other known power transmission technologies to maintain a corresponding direction and speed to the driving roll. The respective disks 374, 376 of the adjacent, preferably parallel shafts 372 are intermeshed with each other for creating a "kneading" or "massaging" action in the slurry, which embeds the fibers 368 previously deposited thereon. In addition, the close, intermeshed and rotating relationship of the disks 372, 374 prevents the buildup of slurry 346 on the disks, and in effect creates a "self-cleaning" action which significantly reduces production line downtime due to premature setting of clumps of slurry.

The intermeshed relationship of the disks 374, 376 on the shafts 372 includes a closely adjacent disposition of opposing peripheries of the small diameter spacer disks 376 and the relatively large diameter main disks 374, which also facilitates the self-cleaning action. As the disks 374, 376 rotate relative to each other in close proximity (but preferably in the same direction), it is difficult for particles of slurry to become caught in the apparatus and prematurely set. By providing two sets of disks 374 which are laterally offset relative to each other, the slurry 346 is subjected to multiple acts of disruption, creating a "kneading" action which further embeds the fibers 368 in the slurry 346.

Once the fibers 368 have been embedded, or in other words, as the moving carrier web 326 passes the embedment device 370, a first layer 377 of the SCP panel is complete. In the preferred embodiment, the height or thickness of the first layer 377 is in the approximate range of 0.05-0.20 inches. This range has been found to provide the desired strength and rigidity when combined with like layers in a SCP panel. However, other thicknesses are contemplated depending on the application.

To build a structural cementitious panel of desired thickness, additional layers are needed. To that end, a second slurry feeder 378, which is substantially identical to the feeder 344, is provided in operational relationship to the moving carrier 314, and is disposed for deposition of an additional layer 380 of the slurry 346 upon the existing layer 377.

Next, an additional chopper 382, substantially identical to the choppers 336 and 366, is provided in operational relationship to the frame 312 to deposit a third layer of fibers 384 provided from a rack (not shown) constructed and disposed relative to the frame 312 in similar fashion to the rack 331. The fibers 384 are deposited upon the slurry layer 380 and are embedded using a second embedment device 386. Similar in construction and arrangement to the embedment device 370, the second embedment device 386 is mounted slightly higher relative to the moving carrier web 314 so that the first layer 377 is not disturbed. In this manner, the second layer 380 of slurry and embedded fibers is created.

Referring now to FIG. 21, with each successive layer of settable slurry and fibers, an additional slurry feeder station 344, 378, 402 followed by a fiber chopper 336, 366, 382, 404 and an embedment device 370, 386, 406 is provided on the production line 310. In the preferred embodiment, four total layers (see for example, the panel 101 of FIG. 29) are provided to form the SCP panel. Upon the disposition of the four layers of fiber-embedded settable slurry as described above, a forming device 394 is preferably provided to the frame 312 to shape an upper surface 396 of the panel. Such forming devices 394 are known in the settable slurry/board production art, and typically are spring-loaded or vibrating plates which conform the height and shape of the multi-layered panel to suit the desired dimensional characteristics.

The panel which is made has multiple layers (see for example layers 22, 24, 26, 28 of panel 31 of FIG. 5) which upon setting form an integral, fiber-reinforced mass. Provided that the presence and placement of fibers in each layer are controlled by and maintained within certain desired parameters as is disclosed and described below, it will be virtually impossible to delaminate the panel.

At this point, the layers of slurry have begun to set, and the respective panels are separated from each other by a cutting device 398, which in the preferred embodiment is a water jet cutter. Other cutting devices, including moving blades, are considered suitable for this operation, provided that they can create suitably sharp edges in the present panel composition. The cutting device 398 is disposed relative to the line 310 and the frame 312 so that panels are produced having a desired length, which may be different from the representation shown in FIG. 21. Since the speed of the carrier web 314 is relatively slow, the cutting device 398 may be mounted to cut perpendicularly to the direction of travel of the web 314. With faster production speeds, such cutting devices are known to be mounted to the production line 310 on an angle to the direction of web travel. Upon cutting, the separated panels 321 are stacked for further handling, packaging, storage and/or shipment as is well known in the art.

In quantitative terms, the influence of the number of fiber and slurry layers, the volume fraction of fibers in the panel, and the thickness of each slurry layer, and fiber strand diameter on fiber embedment efficiency has been investigated. In the analysis, the following parameters were identified:

$v_T$=Total composite volume
$v_s$=Total panel slurry volume
$v_f$=Total panel fiber volume
$v_{f,l}$=Total fiber volume/layer
$v_{T,l}$=Total composite volume/layer
$v_{s,l}$=Total slurry volume/layer $N_l$=Total number of slurry layers; Total number of fiber layers
$V_f$=Total panel fiber volume fraction
$d_f$=Equivalent diameter of individual fiber strand
$l_f$=Length of individual fiber strand
t=Panel thickness
$t_l$=Total thickness of individual layer including slurry and fibers
$t_{s,l}$=Thickness of individual slurry layer
$n_{f,l}, n_{f1,l}, n_{f2,l}$=Total number of fibers in a fiber layer
$s_{f,l}^P, s_{f1,l}^P, s_{f2,l}^P$=Total projected surface area of fibers contained in a fiber layer
$S_{f,l}^P, S_{f1,l}^P, S_{f2,l}^P$=Projected fiber surface area fraction for a fiber layer.

Projected Fiber Surface Area Fraction, $S_{f,l}^P$

Assume a panel composed of equal number of slurry and fiber layers. Let the number of these layers be equal to $N_l$, and the fiber volume fraction in the panel be equal to $V_f$.

In summary, the projected fiber surface area fraction, $S_{f,l}^P$ of a layer of fiber network being deposited over a distinct slurry layer is given by the following mathematical relationship:

$$S_{f,l}^P = \frac{4V_f t}{\pi N_l d_f} = \frac{4V_f * t_{s,l}}{\pi d_f (1 - V_f)}$$

where, $V_f$ is the total panel fiber volume fraction, t is the total panel thickness, $d_f$ is the diameter of the fiber strand, $N_l$ is the total number of fiber layers and $t_{s,l}$ is the thickness of the distinct slurry layer being used.

Accordingly, to achieve good fiber embedment efficiency, the objective function becomes keeping the fiber surface area fraction below a certain critical value. It is noteworthy that by varying one or more variables appearing in the Equations 8 and 10, the projected fiber surface area fraction can be tailored to achieve good fiber embedment efficiency.

Different variables that affect the magnitude of projected fiber surface area fraction are identified and approaches have been suggested to tailor the magnitude of "projected fiber surface area fraction" to achieve good fiber embedment efficiency. These approaches involve varying one or more of the following variables to keep projected fiber surface area fraction below a critical threshold value: number of distinct fiber and slurry layers, thickness of distinct slurry layers and diameter of fiber strand.

Based on this fundamental work, the preferred magnitudes of the projected fiber surface area fraction, $S_{f,l}^P$ have been discovered to be as follows:

Preferred projected fiber surface area fraction, $S_{f,l}^P < 0.65$

Most preferred projected fiber surface area fraction, $S_{f,l}^P < 0.45$

For a design panel fiber volume fraction, $V_f$, achievement of the aforementioned preferred magnitudes of projected fiber surface area fraction can be made possible by tailoring one or more of the following variables—total number of distinct fiber layers, thickness of distinct slurry layers and fiber strand diameter. In particular, the desirable ranges for these variables that lead to the preferred magnitudes of projected fiber surface area fraction are as follows:

Thickness of Distinct Slurry Layers in Multiple Layer SCP Panels, $t_{s,l}$

Preferred thickness of distinct slurry layers, $t_{s,l} \leq 0.20$ inches

More Preferred thickness of distinct slurry layers, $t_{s,l} \leq 0.12$ inches

Most preferred thickness of distinct slurry layers, $t_{s,l} \leq 0.08$ inches

Number of Distinct Fiber Layers in Multiple Layer SCP Panels, $N_l$

Preferred number of distinct fiber layers, $N_l \geq 4$

Most preferred number of distinct fiber layers, $N_l \geq 6$

Fiber Strand Diameter, $d_f$

Preferred fiber strand diameter, $d_f \geq 30$ tex

Most preferred fiber strand diameter, $d_f \geq 70$ tex

Properties

The SCP panel metal frame system of the present invention preferably has one or more of the properties listed in TABLES 2A-2D. The properties are for ½ inch (12.7 mm) thick SCP panel unless otherwise indicated.

TABLE 2A

| Physical Characteristics | ASTM Test Method | Unit | Preferred Target Value | Typical Range | Notes |
|---|---|---|---|---|---|
| Non-Combustibility | E-136 | Weight Loss | ≦50% | ≦50% | From Sec. 8, E-136 |
|  |  | Temp Rise | ≦54° F. | ≦54° | From Sec. 8, E-136 |
|  |  | 30 seconds | No flaming | No flaming | From Sec. 8, E-136 |
| Water Durability Flex. Strength of Sheathing |  |  |  |  |  |
| Dry | C-947 | psi | ≧1800 | 1400-3500 |  |
| Wet | C-947 | psi | ≧1650 | 1300-3000 |  |
| AMOE of Sheathing |  |  |  |  |  |
| Dry |  | ksi | ≧700 | 600-1000 |  |
| Wet |  | ksi | ≧600 | 550-950 |  |
| Screw Withdrawal |  |  |  |  | (screw size: #8 wire 1⅝ inch screw with 0.25 inch diameter head minimum) |

TABLE 2A-continued

| Physical Characteristics | ASTM Test Method | Unit | Preferred Target Value | Typical Range | Notes |
|---|---|---|---|---|---|
| ½" Panel-Dry | D-1761 | pounds | 352 | 250-450 | Equiv. to American Plywood Assoc. (APA) S-4 |
| ½" Panel-Wet | D-1761 | pounds | 293 | 200-400 | % of force for SCP relative to OSB 82%; % of force for SCP relative to Plywood 80% |
| ¾" Panel-Dry | D-1761 | pounds | 522 | 450-600 | Equiv. to American Plywood Assoc. (APA) S-4 |
| ¾" Panel-Wet | D-1761 | pounds | 478 | 450-550 | % of force for SCP relative to OSB 82%; % of force for SCP relative to Plywood 80% |

TABLE 2B

| Physical Characteristics | ASTM Test Method | Unit | Preferred Target Value | Typical Range | Notes |
|---|---|---|---|---|---|
| Lateral Screw Resistance | | | | | Screw size: #8 wire 1⅝ inch screw with 0.25 inch diameter head minimum |
| ½" Panel-Dry | D-1761 | pounds | 445 | 350-550 | Equiv. to APA S-4 |
| ½" Panel-Wet | D-1761 | pounds | 558 | 400-650 | % of force for SCP relative to OSB 73; % of force for SCP relative to Plywood 82% |
| ¾" Panel-Dry | D-1761 | pounds | 414 | 400-500 | Equiv. to APA S-4 |
| ¾" Panel-Wet | D-1761 | pounds | 481 | 400-500 | % of force for SCP relative to OSB 73; % of force for SCP relative to Plywood 82% |
| Static & Impact Test (¾ inch thick SCP) Ultimate | | | | | |
| Static | E-661 | pounds | 1286 | 1000-1500 | APA S-1; 16 inch o.c. Span Rating ≧ 550 lbs. |
| Following Impact | E-661 | pounds | 2206 | 1500-3000 | APA S-1; 16 inch o.c. Span Rating ≧ 400 lbs |
| Deflection under 200 lb. Load | | | | | |
| Static | E-661 | inches | 0.014 | 0.010-0.060 | APA S-1; 16 inch o.c. Span Rating ≦ 0.078" |
| Following Impact | E-661 | inches | 0.038 | 0.020-0.070 | APA S-1; 16 inch o.c. Span Rating ≦ 0.078" |
| Uniform Load | | | | | |
| ¾" Panel-Dry | | psf | 330 | 300-450 | 16 inch o.c. Span Rating ≧ 330 psf |
| Linear Expansion | | | | | |
| ½" to ¾" Panel | APA P-1 | % | ≦0.1 | ≦0.1 | APA P-1 requires ≦ 0.5% |

TABLE 2C

| Physical Characteristics | ASTM Test Method | Unit | Preferred Target Value | Typical Range | Notes |
|---|---|---|---|---|---|
| Water Absorption | | | | | |
| ½" Panel | APA PRP-108 | % | 11.8 | 7 to 15 | % water absorption of SCP relative to ½ inch thick OSB: 51.5%, % water absorption of |

TABLE 2C-continued

| Physical Characteristics | ASTM Test Method | Unit | Preferred Target Value | Typical Range | Notes |
| --- | --- | --- | --- | --- | --- |
| ¾" Panel | APA PRP-108 | % | 10.8 | 7 to 15 | SCP relative to ½ inch thick Plywood: 46.2% % water absorption of SCP relative to OSB: 51.3%, % water absorption of SCP relative to Plywood: 48.1% |
| Thickness Swell | | | | | |
| ½" Panel | APA PRP-108 | % | 2.3 | 1 to 5 | % water absorption of SCP relative to ½ inch thick OSB: 22.2%, % water absorption of SCP relative to ½ inch thick Plywood: 7.8% |
| ¾" Panel | APA PRP-108 | % | 2.4 | 1 to 5 | % water absorption of SCP relative to OSB: 22.2%, % water absorption of SCP relative to Plywood: 7.8% |
| Mold & Bacteria Resistance | | | | | |
| ½ to ¾" Panel | G-21 | | 0 | 0-1 | OSB & Plywood have food source |
| ½ to ¾" Panel | D-3273 | | 10 | 10 | OSB & Plywood have food source |
| Termite Resistance | | | | | |
| ½ to ¾" Panel | | | No food source | No food source | |

TABLE 2D

| Physical Characteristics | ASTM Test Method | Unit | Preferred Target Value | Typical Range | Notes |
| --- | --- | --- | --- | --- | --- |
| Horizontal Design Shear Capacity of the SCP Diaphragm | | | | | |
| ¾" Panel- 10' × 20' Frame | E-455 | pounds per linear foot | 487.2 | 300-1000 Typically 400-800 | Performance relates to panel properties, joist depth & spacing and fastener type and spacing |
| System Fire Resistance | | | | | |
| ⅝ to ¾" SCP Panel on one side of metal frame | E-119 | Time | 1 hr and 10 min. | 1 to 1.5 hr. | Nominal 4" deep stud, 24" O.C., batt insulation, 1 layer ⅝" FIRECODE Gypsum Board available from USG. |
| ¾" Panel SCP on one side of metal frame | E-119 | Time | 2 hr - 9 min. | 2 hr. | Nominal 10" deep joist, 24" O.C., batt insulation, 1 layer ⅝" FIRECODE Gypsum Board available from USG |

Horizontal Design Shear Capacity in Table 2D provides for a safety factor of 3.

A system having ⅜-¾ inch (9-19 mm), e.g. ½ inch (12.5 mm), thick SCP panels mechanically and/or adhesively laterally braced metal framing when tested according to ASTM E-72 typically has a nominal wall shear capacity (also known as nominal racking shear strength) of 200 to 1200, or 400 to 1200, or 800 to 1200 pounds per linear foot.

A typical ¾ inch (19 mm) thick panel when tested according to ASTM E661 and APA S-1 test methods over a span of 16 inches (406.4 mm) on centers, has an ultimate load capacity greater than 550 lb (250 kg), under static loading, an ultimate load capacity greater than 400 lb (182 kg) under impact loading, and a deflection of less than 0.078 inches (1.98 mm) under both static and impact loading with a 200 lb (90.9 kg) load.

Typically, the flexural strength of a panel having a dry density of 65 lb/ft$^3$ (1041 kg/m$^3$) to 90 lb/ft$^3$ (1442 kg/m$^3$) or 65 lb/ft$^3$ (1041 kg/m$^3$) to 95 lb/ft$^3$ (1522 kg/m$^3$) after being soaked in water for 48 hours is at least 1000 psi (7 MPa), e.g. 1300 psi (9 MPa), preferably 1650 psi (11.4 MPa), more preferably at least 1700 psi (11.7 MPa) as measured by the ASTM C 947 test.

Typically the SCP shear wall diaphragm system has a higher specific stiffness than a shear wall system of load bearing masonry walls.

Typically the vertical shear diaphragm load carrying capacity of the system will not be lessened by more than 25%, preferably not be lessened by more than 20%, when exposed to water in a test wherein a 2 inch head of water is maintained over a horizontally oriented ½ to ¾ inch thick SCP panels fastened on a 10 foot by 20 foot metal frame for a period of 24 hours and afterwards reoriented vertically and tested for Vertical shear diaphragm load carrying capacity.

Typically the system will not absorb more than 0.7 pounds per square foot of water when exposed to water in a test wherein a 2 inch head of water is maintained over ¾ inch thick SCP panels fastened on a 10 foot by 20 foot metal frame for a period of 24 hours.

Typically an embodiment of the present system having a 10 foot wide by 20 foot long by ¾ inch thick diaphragm of the SCP panels attached to a 10 foot by 20 foot metal frame will not swell more than 5% when exposed to a 2 inch head of water maintained over the SCP panels fastened on the metal frame for a period of 24 hours.

Typically, every component of the present system meets ASTM G-21 in which the system achieves approximately a 1 and meets ASTM D-3273 in which the system achieves approximately a 10. Also, typically the present system supports substantially zero bacteria growth when clean. Also, typically the present system is inedible to termites.

Due to its being lightweight and strong, this combination of the present shear wall system of a horizontal diaphragm of ½ to ¾ inch thick SCP panel on metal frame permits efficient use of building volume for a given building footprint to permit maximization of building volume for the given building footprint. The lightweight nature of this system avoids the dead load associated with load bearing masonry systems. Less dead load allows building comparable size structures on less stable soil. Moreover, the system may be non-directional, in that the panels of the system may be placed with their long dimension parallel or perpendicular to the metal studs of the frame without losing strength or load carrying characteristics, wherein the ability of the system to support dead and live loads without failure is the same regardless of the orientation of the SCP panel on the metal framing.

A non-combustible shear wall system of the present invention may be made by a method including placing the SCP panel on metal studs. The SCP panels may be placed on vertically oriented metal framing elements, or on horizontally oriented framing elements that are afterwards oriented vertically, and attached to the framing by mechanical or adhesive means. The present system has the advantage that the SCP panels can withstand rough treatment while being placed on the metal frames during construction of residential and commercial buildings. For example, the present SCP panels can preferably withstand rough treatment during construction in cold weather, e.g., when the ambient temperature is less than 32 degrees F. (0 degrees C.) or even when the ambient temperature is less than 20 degrees F. (minus 7.5 degrees C.). Preferably, the SCP panels can withstand being placed to lie horizontally on the metal framing elements when the ambient temperature is less than 32 degrees F. (0 degrees C.) in a method including dropping the panel on the metal framing elements such that at least one end of the panel falls at least 2 feet, or at least 3 feet, or in a range of 3 to 6 feet (without cracking the SCP panel), and afterwards reorienting the panel and metal framing elements vertically.

EXAMPLES

An experiment was conducted for fire endurance testing on comparative structural sheathing in the small-scale horizontal furnace (SSHF). Five samples, ½ inch (13 mm). Structural Cement Panel (SCP) of a composition of the present invention, ¾ in. (19 mm) VIROC panel, ½ in. (13 mm) NOVATECH panel, $^{15}/_{32}$ in. (12 mm) plywood (grade A-C) and $^{31}/_{64}$ in. (12 mm) Oriented Strand Board (OSB), were tested as part of 4 ft. by 4 ft. assemblies.

Each assembly was constructed of metal framing, 358, 20 gauge CR runners and ST studs spaced 24 in. on center. The test material was applied to the exposed surface and one layer of USG's SHEETROCK ⅝ in. (16 mm) FIRECODE Type SCX gypsum wallboard was applied to the unexposed surface for each of the five tests. The exposed surface material is applied perpendicular to the studs with a joint at the mid-span of the assembly. Thermocouples were placed in both cavities underside of the exposed panel and on the unexposed surface for temperature comparison of the assemblies. The furnace temperatures were controlled to the ASTM E119 Time/Temperature Curve. Temperature measurements were made of the finish rating and the unexposed surface for the duration of the test. Observations were made as to the estimated condition of the exposed surface during the test. Standard ASTM E119 temperature limits for the thermocouple readings were 250° F. (136° C.) above ambient for the average and 325° F. (183° C.) above ambient for the individual were used as control limits.

The purpose of the testing was to provide a relative comparison of the performance of product material in the fire test. The procedure does not provide a fire endurance rating for a system.

The formulation of the SCP panels used in the small-scale horizontal furnace test (Example 1 and Example 3) is as follows in TABLE 2E:

TABLE 2E

| | Weight Proportion (%) |
|---|---|
| Reactive Powder Blend | |
| Reactive Powder Blend | |
| Portland Cement | 29 |
| Calcium Sulfate Alpha Hemihydrate | 58 |
| Silica Fume | 12 |
| Lime | 1 |
| SCP Cementitious Composition | |
| Ingredient | |
| Portland Cement | 12.3 |
| Calcium Sulfate Alpha Hemihydrate | 24.7 |
| Silica Fume | 5.1 |
| Lime | 0.4 |
| Ceramic Microspheres | 26.4 |
| Superplasticizer | 1.9 |
| Water | 21.9 |
| Alkali-Resistant Glass Fibers[1] | 7.2 |

[1]Weight proportion corresponds to 3.06% volume fraction of AR Glass Fibers in the composite Length of glass fibers used in the small-scale horizontal furnace test - 40 mm.

The results from testing of the five samples can be found in TABLE 3. Both the average (A) and the individual (I) readings are in minutes when the temperature criteria limits were exceeded during each test. The SCP board has a composition of a panel of the present invention.

TABLE 3

Data Summary for Examples 1-5

| SSHF Example No. | Sample ID | Finish Rating (Minutes) | Unexposed Surface (Overlimit/Minutes) | Exposed Surface Condition: End of Test |
|---|---|---|---|---|
| 1 | ½ in. (13 mm) SCP board | 09:24 (A) 10:05 (I) | 46:05 (A) 46:16 (I) | Intact Low Shrinkage |
| 2 | ¾ in. (19 mm) VIROC board | 19:16 (A) 21.52 (I) | 48:42 (A) 47:49 (I) | Intact Moderate Shrinkage |
| 3 | ½ in. (13 mm) NOVATECH board | 12:52 (A) 13 27 (I) | 46 42 (A) 47:13 (I) | Panel Delamination No Fall Off |
| 4 | 15/32 in. (12 mm) Plywood board (A-C Grade) | 6:40 (A) 7:10 (I) | 23:42 (A) 23:31 (I) | Board Fall Off |
| 5 | 31/64 in. (12 mm) OSB board | 6:50 (A) 8:12 (I) | 24.25 (A) 23:30 (I) | Board Fall Off |

Example 1

Sample Construction

Size 48 in. (122 cm) by 48⅝ in. (124 cm)
Studs: 358 ST, 20 gauge Spacing: 24 in. (61 cm) on center
Runners: 358 CR, 20 gauge; Cavity: Void
Facing: (Fire Side) One layer ½ in. (13 mm) USG Structural Cement Panel (SCP)
(Unexposed Side) One layer ⅝ in. (16 mm) SHEETROCK® FIRECODE® (Type X) panel Table 4 lists the boards employed in this example as test materials. The boards were subjected to heating as presented in Table 5. Observations from this heating are presented in Table 6.

TABLE 4

Example 1 Test Materials

| | ½" (13 mm) SCP ½" × 48" × 96" (13 mm × 122 cm × 244 cm) | SHEETROCK® Brand Wallboard ⅝" × 48" × 120" (16 mm × 122 cm × 305 cm) Type C |
|---|---|---|
| Lbs/1000 sq. ft | 2736 | 2290 |
| Average board thickness, in. (mm) | 0.528 (13.4) | 0.620 (15.7) |
| Average density, pcf (g/cc) | 62.128 (0.995) | 44.332 (0.710) |
| Average panel weight, lbs. (kgs.) | 22.46 (10.19) | 37.13 (16.84) |

TABLE 5

Example 1 Temperature Information

| | Average | Individual |
|---|---|---|
| Unexposed Surface Limiting Temperature Criteria Degrees 79° F. (29° C.) Ambient | 324° F. (182° C.) | 399° F. (229° C.) |
| Unexposed Surface Temperature Limits Reached | 46:05 | TC #4 at 46:16 |
| Finish Rating Limiting Temperature Criteria Degrees 79° F. (29° C.) Ambient | 323° F. (182° C.) | 398° F. (229° C.) |
| Finish Rating Temperature Limits Reached | 9:24 | TC #8 at 10:05 |

FIRE TEST DURATION: 70 MIN. 0 SEC.
TEST TERMINATED: No Board Fall Off

TABLE 6

Example 1 Observations

| Time (Min:Sec) | Furnace Pressure | Observations |
|---|---|---|
| 4:00 | +0.10 | The exposed board is very light tan in color. |
| 12:00 | +0.07 | Very light smoke and steam vapor emitting from unexposed surface. |
| 18:00 | +0.08 | Butt joint opening is at estimated 1/16 inch max. More smoke and steam vapor emitting from unexposed surface. |
| 22:00 | +0.08 | Very heavy smoke and steam vapor emitting from unexposed surface. Exposed board looks good and is in place. |
| 30:00 | +0.06 | Butt joint opening is at estimated ⅛ inch max. |

TABLE 6-continued

Example 1 Observations

| Time (Min:Sec) | Furnace Pressure | Observations |
|---|---|---|
| 33:00 | +0.08 | Board sag in between the studs is at estimated ⅛ inch to ¼ inch max. |
| 38:00 | +0.07 | Light smoke and steam vapor emitting from unexposed surface. |
| 41:00 | +0.10 | Board sag in between the studs is at estimated ⅛ to ¼ inch max. |
| 48:00 | +0.07 | Butt joint opining is at 3/16 to ¼ inch max. |
| 51:00 | +0.08 | Board sag in between the studs is at estimated ½ inch max. |
| 53:00 | +0.09 | Can hear audible sound of paper burning on unexposed surface. |
| 63:00 | +0.08 | Board sag in between the studs is at estimated ½ to ⅝ inch max. |
| 70:00 | | Test terminated. No board fall off. |

Example 2

Sample Construction

Size 48 in. (122 cm) by 48⅝ in. (124 cm)

Studs: 358 ST, 20 gauge Spacing: 24 in. (61 cm) on center

Runners: 358 CR, 20 gauge; Cavity: Void

Facing: (Fire Side) One layer ¾ in. VIROC Board (Unexposed Side) One layer ⅝ in. (16 mm) SHEETROCK® FIRECODE® (Type X) panel Table 7 lists the boards employed in this example as test materials. The boards were subjected to heating as presented in Table 8. Observations from this heating are presented in Table 9.

TABLE 7

Example 2 Test Materials

| | VIROC Board ¾" × 48" × 48⅝" (13 mm × 122 cm × 124 cm) | SHEETROCK® Brand Wallboard ⅝" × 48" × 120" (16 mm × 122 cm × 305 cm) Type X |
|---|---|---|
| Lbs/1000 sq. ft | — | 2290 |
| Average board thickness, inches (mm) | 0.760 (19) | 0.620 (15.7) |
| Average density, pcf (g/cc) | 83.00 (1.33) | 44.344 (0.710) |
| Average panel weight, lbs. (kgs.) | 22.46 (10.19) | 37.13 (16.84) |

TABLE 8

Example 2 Temperature Information

| | Average | Individual |
|---|---|---|
| Unexposed Surface Limiting Temperature Criteria Degrees 73° F. (26° C.) Ambient | 323° F. (182° C.) | 398° F. (229° C.) |
| Unexposed Surface Temperature Limits Reached | 48:42 | TC #4 at 47:49 |
| Finish Rating Limiting Temperature Criteria Degrees 79° F. (29° C.) Ambient | 325° F. (183° C.) | 400° F. (230° C.) |
| Finish Rating Temperature Limits Reached | 19:16 | TC #8 at 21:52 |

FIRE TEST DURATION: 60 MIN. 0 SEC.

TEST TERMINATED: No Board Fall Off

TABLE 9

Example 2 Observations

| Time (Min:Sec) | Furnace Pressure | Observations |
|---|---|---|
| 2:30 | +0.08 | The butt joint is smoking and is dark brown in color. Smoke emitting from unexposed surface. |
| 6:00 | +0.08 | Exposed board is charred and black in color. Butt joint opening is an estimated ⅛ inch max. Board crack by west perimeter by center stud. |

TABLE 9-continued

Example 2 Observations

| Time (Min:Sec) | Furnace Pressure | Observations |
|---|---|---|
| 9:00 | +0.08 | Exposed board is lightly flaming on the entire surface. Butt joint opening is at estimated 3/16 inch to 1/4 inch max. Board sag is at estimated 1/4 inch to 3/8 inch max. |
| 12:30 | +0.08 | Board sag is at estimated 1/2 inch to 3/4 inch max. Butt joint opening is at estimated 1/2 inch max. and is peeling away towards fire. Surface is still lightly flaming. |
| 18:00 | +0.08 | Board is still flaming on entire surface. Smoke and steam vapor is emitting from unexposed surface. |
| 19:30 | +0.08 | Butt joint opening is at estimated 1 inch max. and peeling away. Board sag is estimated 1 1/2 inch max. Exposed board is still flaming. |
| 24:00 | +0.08 | Butt joint opening is at estimated 1 1/2 to 2 inches max. The west board has a crack across the center by stud. Center board screws have pulled away from center stud. |
| 29:00 | +0.08 | Crack opening in the center of the west board is at estimated 1/2 inch max. Board sag is at estimated 2 1/2 to 3 inches max. The board is still flaming. Smoke and steam vapor are emitting from unexposed surface. |
| 34:00 | +0.07 | Board sag is at estimated 4 inches max. East board has a crack at the center by the stud. |
| 40:00 | +0.08 | West board is sagged towards fire an estimated 5 inches max. East board crack opening is an estimated 5/8 inches max. Board is still flaming. |
| 43:00 | +0.08 | Board sample is peeling away towards fire at estimated 5-6 inches max. The sample cavity is seen due to board peel away. |
| 50:00 | +0.0 | Board sag is at estimated 6 to 7 inches max. and still peeling towards fire. Butt joint opening is at estimated 3 inches max. East and west center board cracks are at estimated 1 1/2 inches max. |
| 60:00 | | Test terminated. No board fall off. |

Example 3

Sample Construction

Size 48 in. (122 cm) by 48 5/8 in. (124 cm)
Studs: 358 ST, 20 gauge Spacing: 24 in. (61 cm) on center
Runners: 358 CR, 20 gauge; Cavity: Void
Facing: (Fire Side) One layer 1/2 inch NovaTech Board
(Unexposed Side) One layer 5/8 in. (16 mm) SHEETROCK® FIRECODE® (Type X) panel.

Table 10 lists the boards employed in this example as test materials. The boards were subjected to heating as presented in Table 11. Observations from this heating are presented in Table 12.

TABLE 10

Example 3 Test Materials

|  | NovaTech Board 3/4" × 48" × 48 5/8" (13 mm × 122 cm × 124 cm) | SHEETROCK® Brand Wallboard 5/8" × 48" × 120" (16 mm × 122 cm × 305 cm) Type X |
|---|---|---|
| Lbs/1000 sq. ft | 3163 | 2298 |
| Average board thickness, in. (mm) | 0.531 (13) | 0.620 (15.7) |
| Average density, pcf (g/cc) | 71.544 (1.15) | 44.517 (0.713) |
| Average panel weight, lbs. (kgs.) | 25.90 (11.75) | 37.25 (16.9) |

TABLE 11

Example 3 TEMPERATURE INFORMATION

|  | Average | Individual |
|---|---|---|
| Unexposed Surface Limiting Temperature Criteria Degrees 74° F. (26° C.) Ambient | 324° F. (182° C.) | 399° F. (229° C.) |
| Unexposed Surface Temperature Limits Reached | 46:42 | TC #2 at 47:13 |
| Finish Rating Limiting Temperature Criteria Degrees 76° F. (27° C.) Ambient | 326° F. (183° C.) | 401° F. (231° C.) |
| Finish Rating Temperature Limits Reached | 12:52 | TC #8 at 13:27 |

FIRE TEST DURATION: 70 MIN. 0 SEC.
TEST TERMINATED—Board Delamination, No Board Fall Off

TABLE 12

Example 3 Observations

| Time (Min:Sec) | Furnace Pressure | Observations |
|---|---|---|
| 2:30 | +0.07 | Exposed south half of west board popped apart and delaminated and has fallen off. Estimated ¼ inch of board thickness is still in place at the cold junction. Exposed glass fibers are seen on remaining board. |
| 8:00 | +0.07 | Light smoke and steam vapor emitting from unexposed surface. |
| 18:00 | +0.08 | More smoke and steam vapor emitting from unexposed surface. More board cracks by center stud screws |
| 24:00 | +0.07 | Heavy smoke and steam vapor emitting from unexposed surface. Butt joint is at estimated 3/16 to ¼ inch max. Northeast corner board is peeling away towards furnace and is estimated at ¼ inch max. Board thickness is falling off |
| 32:00 | +0.07 | Less smoke and steam vapor emitting from unexposed surface. |
| 35:00 | +0.07 | Butt joint opening is at estimated ⅜ inch max. |
| 37:00 | +0.08 | Estimated ¼ inch thick by 12 inch by 24 inch Board has fallen at corner of north east board |
| 45:30 | +0.08 | Very light smoke and steam vapor is emitting from unexposed surface. Exposed board sag is at estimated ½ to ⅝ inch max |
| 53:00 | +0.07 | Butt joint opening is at estimated ⅜ inch to ½ inch max. |
| 57:00 | +0.08 | Unexposed wall board is starting to get brown in color over butt joint location. Very little smoke and steam vapor emitting from unexposed surface |
| 61:00 | +0.07 | Board sag is at estimated 1 to 1½ inches max. |
| 63:00 | +0.10 | Hair cracks starting on southeast section of board |
| 65:00 | +0.09 | Butt joint opening is at estimated ½ inches max. |
| 67:00 | +0.10 | More exposed board peeling at northeast section. Total board delamination is an estimated 15% max |
| 70:00 | | Test terminated. Some board delamination. No board fall off. |

Example 4

Sample Construction

Size 48 in. (122 cm) by 48⅝ in. (124 cm)
Studs: 358 ST, 20 gauge; Spacing: 24 in. (61 cm) on center
Runners: 358 CR, 20 gauge; Cavity: Void Facing: (Fire Side) One layer 15/32 inch (12 mm) Plywood (A/C) Board
(Unexposed Side) One layer ⅝ in. (16 mm) SHEETROCK® FIRECODE® (Type X) panel.

Table 13 lists the boards employed in this example as test materials. The boards were subjected to heating as presented in Table 14. Observations from this heating are presented in Table 15.

TABLE 13

Example 4 Test Materials

| | Plywood Board 15/32" × 48" × 48⅝" (16 mm × 122 cm × 124 cm) | SHEETROCK ® Brand Wallboard ⅝" × 48" × 120" (16 mm × 122 cm × 305 cm) Type X |
|---|---|---|
| Lbs/1000 sq. ft | 1644 | 2283 |
| Average board thickness, in. (mm) | 0.499 (12.6 mm) | 0.619 (16) |
| Average density, pcf (g/cc) | 39.544 (0.633) | 44.242 (0.709) |
| Average panel weight, lbs. (kgs.) | 52.50 (28.8) | 37.00 (16.78) |

TABLE 14

Example 4 Temperature Information

| | Average | Individual |
|---|---|---|
| Unexposed Surface Limiting Temperature Criteria Degrees 73° F. (26° C.) Ambient | 323° F. (182° C.) | 398° F. (229° C.) |
| Unexposed Surface Temperature Limits Reached | 23:42 | TC #3 at 23:31 |
| Finish Rating Limiting Temperature Criteria | 325° F. (183° C.) | 400° F. (230° C.) |

TABLE 14-continued

Example 4 Temperature Information

| | Average | Individual |
|---|---|---|
| Degrees 76° F. (27° C.) Ambient Finish Rating Temperature Limits Reached | 6:40 | TC #7 at 7:10 |

FIRE TEST DURATION: 32 MIN. 0 SEC.

TEST TERMINATED: Board Fall Off

TABLE 15

Example 4 Observations

| Time (Min:Sec) | Furnace Pressure | Observations |
|---|---|---|
| 0:30 | +0.06 | Exposed boards are black in color, burnt charred surface. |
| 2:00 | +0.04 | Heavy smoke emitting from unexposed surface. |
| 4:00 | +0.08 | Exposed boards are flaming. Very heavy smoke emitting from unexposed surface. |
| 6:00 | +0.08 | Butt joint opening is at estimated ¼ in. max. |
| 8:00 | +0.08 | Very heavy flaming seen through furnace view ports. Sample can not be seen. |
| 9:00 | +0.07 | Exposed ½ inch plywood has fallen in furnace. Cavity is now exposed. |
| 14:00 | +0.08 | Still very heavy smoke and steam vapor emitting from unexposed surface. |
| 19:00 | +0.08 | The exposed wallboard has hairline haze cracking seen from exposed cavity. |
| 28:00 | +0.07 | Less smoke and steam vapor emitting from unexposed surface. The unexposed side wallboard is now brown in color. |
| 32:00 | | Test terminated. Board has fallen off. |

Example 5

Sample Construction

Size 48 in. (122 cm) by 48⅝ in. (124 cm)
Studs: 358 ST, 20 gauge; Spacing: 24 in. (61 cm) on center
Runners: 358 CR, 20 gauge; Cavity: Void
Facing: (Fire Side) One layer ³¹⁄₆₄ inch Oriented Strand Board (OSB)
(Unexposed Side) One layer ⅝ in. (16 mm) SHEETROCK® FIRECODE® (Type X) panel.

Table 16 lists the boards employed in this example as test materials. The boards were subjected to heating as presented in Table 17. Observations from this heating are presented in Table 18.

TABLE 16

Example 5 Test Materials

|  | OSB Board<br>¹⁵⁄₃₂" × 48" × 48⅝"<br>(12 mm × 122 cm × 124 cm) | SHEETROCK ® Brand Wallboard<br>⅝" × 48" × 120"<br>(16 mm × 122 cm × 305 cm) Type X |
|---|---|---|
| Lbs/1000 sq. ft | 1644 | 2283 |
| Average board thickness, in. (cm) | 0.499 (12.6 mm) | 0.619 (0.157) |
| Average density, pcf (g/cc) | 39.544 (0.633) | 44.242 (0.709) |
| Average panel weight, lbs. (kgs.) | 52.50 (28.8) | 37.00 (16.78) |

TABLE 17

Example 5 Temperature Information

|  | Average | Individual |
|---|---|---|
| Unexposed Surface Limiting Temperature Criteria Degrees 77° F. (28° C.)Ambient | 327° F. (184° C.) | 402° F. (231° C.) |
| Unexposed Surface Temperature Limits Reached | 24:25 | TC #3 at 23:30 |
| Finish Rating Limiting Temperature Criteria | 330° F. (186° C.) | 405° F. (233° C.) |
| Degrees 80° F. (30° C.) Ambient Finish Rating | 6:50 | TC #8 at |
| Temperature Limits Reached |  | 8:12 |

FIRE TEST DURATION: 32 MIN. 0 SEC.

TEST TERMINATED: Board Fall Off

TABLE 18

Example 5 Observations

| Time (Min:Sec) | Furnace Pressure | Observations |
|---|---|---|
| 1:00 | +0.02 | Exposed board is smoking and black in color |
| 1:30 | +0.08 | Smoke is heavy, emitting from unexposed surface |
| 3:00 | +0.07 | The entire board is flaming. Surface is hard. |
| 5:00 | +0.08 | Butt joint opening is at estimated ⅛ to ¼ inches max. |
| 6:00 | +0.08 | Very heavy smoke emitting from unexposed surface. |
| 8:00 | +0.15 | Board sag is at estimated 1 inch max. Still is flaming. |
| 9:30 | +0.08 | Exposed board has fallen out. Remaining perimeter boards still flaming. Exposed wallboard is seen from exposed cavity. |
| 15:00 | +0.07 | Still heavy smoke and steam emitting from unexposed surface. |
| 19:00 | +0.08 | Board crack running along the center stud on the unexposed surface. |
| 23:00 | +0.07 | Smoke and steam is starting to decrease at unexposed surface. |
| 25:00 | +0.08 | Unexposed board crack running the stud length is at estimated ⅛ inches max. |
| 29:00 | +0.07 | Hairline haze cracking is seen on wallboard viewed from exposed cavity. |

TABLE 18-continued

Example 5 Observations

| Time (Min:Sec) | Furnace Pressure | Observations |
|---|---|---|
| 31:00 | +0.07 | The unexposed surface wallboard is now dark brown in color. Little smoke and steam vapor emitting from unexposed surface. |
| 32:00 | | Test terminated. Board has fallen off. |

Example 6

This example determines the horizontal diaphragm strength of a single floor diaphragm constructed as explained below using a Prototype ¾ inch thick SCP panel by ASTM E 455-98 Static Load Testing of Framed Floor or Roof Diaphragm Construction for Buildings, single beam method.

Test Specimen Materials

A. Floor Diaphragm Materials:

Prototype ¾" SCP—Structural Cement Panel of the present invention reinforced with fiberglass strands. A "V"-groove and tongue is located along the 8' dimension of the 4'×8' sheets. The formulation used in the SCP panel examples of this floor diaphragm test is listed in TABLE 18A.

TABLE 18A

| Ingredient | Weight Proportion (%) |
|---|---|
| Reactive Powder Blend | |
| Portland Cement | 29 |
| Calcium Sulfate Alpha Hemihydrate | 58 |
| Silica Fume | 12 |
| Lime | 1 |
| SCP Cementitious Composition | |
| Portland Cement | 12.2 |
| Calcium Sulfate Alpha Hemihydrate | 24.4 |
| Silica Fume | 5.1 |
| Lime | 0.4 |
| Ceramic Microspheres | 27.4 |
| Superplasticizer | 1.9 |
| Water | 24.2 |
| Alkali-Resistant Glass Fibers[1] | 4.4 |

[1]Weight proportion corresponds to 1.8% volume fraction of Alkali Resistant Glass Fibers in the composite.
Length of glass fibers used in the floor diaphragm test - 36 mm.

Fasteners—#8-18×1⅝" long BUGLE HEAD GRABBER SUPER DRIVE™ screws spaced 6" o.c. along the perimeter, and 12" o.c. in the field of the panels. All fasteners were placed a minimum of ¾ inches in from panel edges and ½ inch in from seams. At panel corners the fasteners were inset 2 inches.

Adhesive—ENERFOAM SF polyurethane foam adhesive manufactured by Flexible Products Company of Canada, Inc. was applied to all butt-joints, and tongue and groove joints. One (1) ⅜" bead was applied to the bottom of the groove before setting into place. A ⅜" gap was left at the butt-joint to allow one (1) ⅜" bead of adhesive to be applied in the gap, before sliding the joint together.

Figure 8:
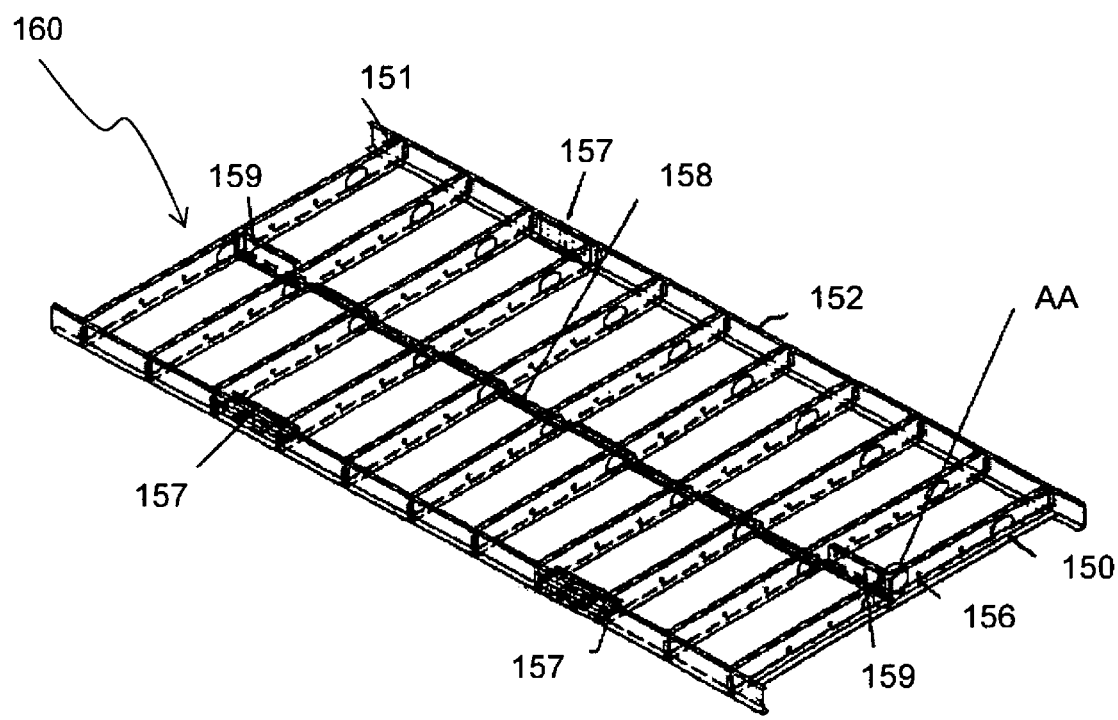
FIG. 8 shows assembled metal, e.g., steel, floor framing.

B. Floor Framing:

FIG. 8 shows assembled metal, e.g., steel, floor framing. This includes the following parts:

A. Transverse Joists 150—16 gauge×10 inches deep×10 foot long Trade Ready™ Joists manufactured by Dietrich Industries. The joists were stamped Dietrich TDW5 W 10 IN×L 10 FT 28324013 16 GAUGE G60 50 KSI.

B. Longitudinal Rim Track 152—16 gauge×10³⁄₁₆" deep× 16' long manufactured by Dietrich Industries with pre-bent joist attachment locations spaced at 24" o.c. The track was stamped Dietrich TD16 W 9¼IN×L 16 FT 28323858 16 GAUGE 3RD Fl.

C. 0.125" thick×2"×2" steel angles 154 (FIG. 10) are located on each of the transverse end joists 156 spaced starting at the bearing side and spanning up to 3 inches from the load side angel and fixed to the respective end transverse joists with #10-1" DRIVALL screws at 6" o.c.

D. Fasteners

10-16×¾" long hex-head, DRIVALL screws for attaching framing.

10-16×¾" long wafer head, self-drilling screws for attaching to framing 6" o.c. around the outermost edge and on both sides of the butt joints.

Test Specimen Construction

One (1) test sample was constructed to an overall dimension of 10'-0"×20'-0". FIG. 8 shows a perspective view of the metal frame.

Figure 9:
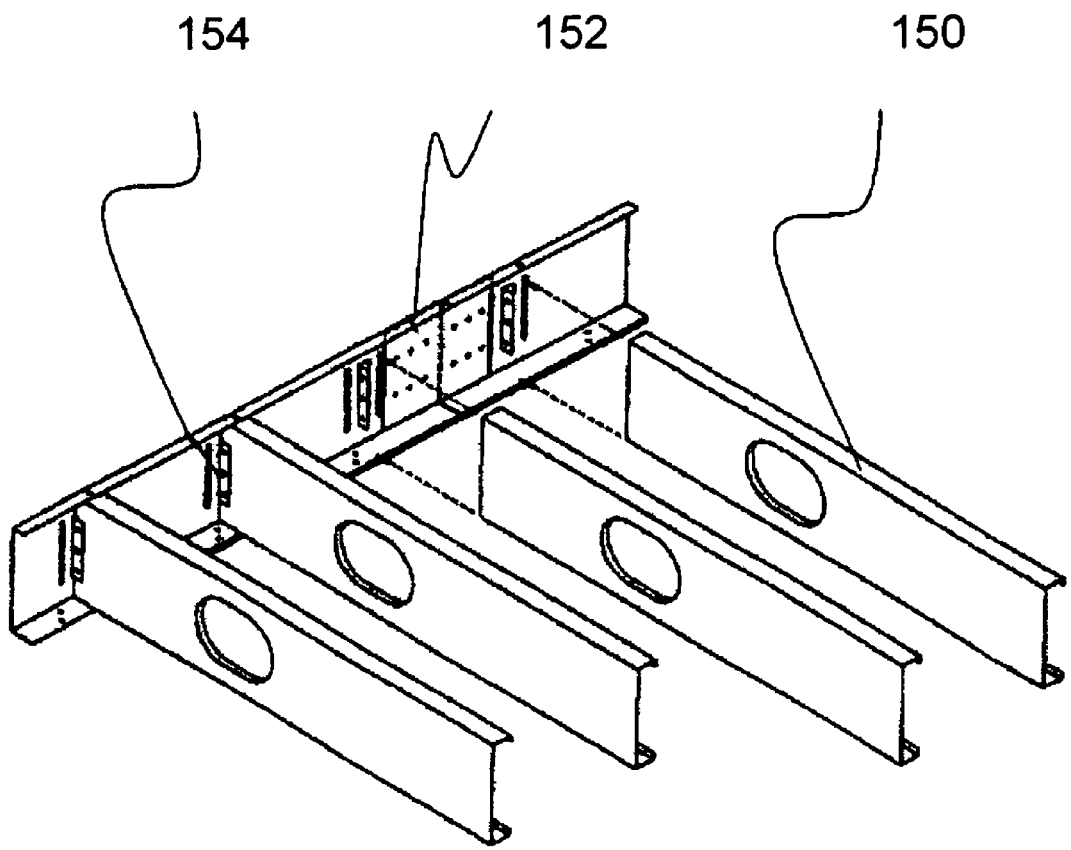
FIG. 9 shows attachment of the C-joist metal framing members to a header.

FIG. 9 shows an enlarged view of a portion of the frame of FIG. 8.

Figure 10:
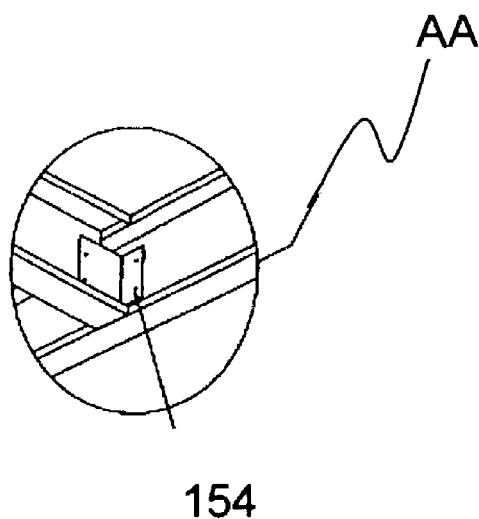
FIG. 10 shows an enlarged view of a portion of the frame of FIG. 8.

FIG. 10 shows an enlarged view of a portion AA of the frame of FIG. 8.

Figure 11:
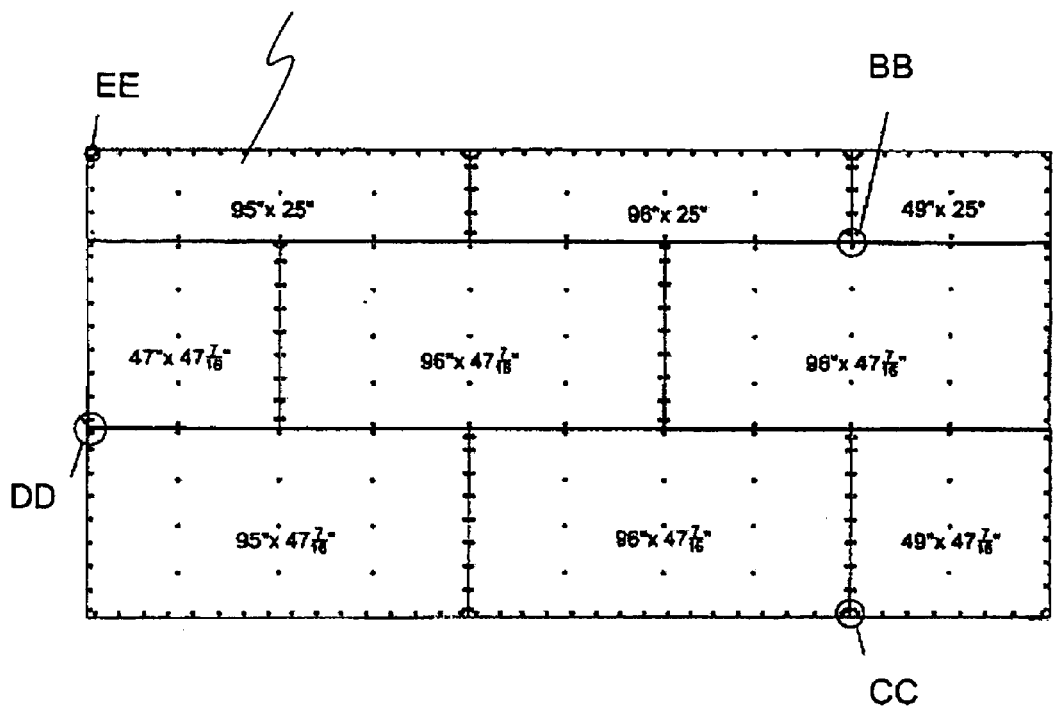
FIG. 11 shows a test SCP panel floor system configuration attached to the metal frame of FIG. 8.
Figure 12:
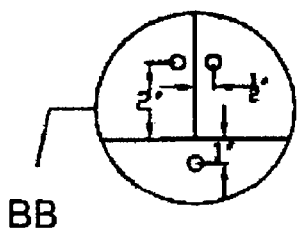
FIGS. 12, 13, 14 and 15 show enlarged views of respective portions of the floor of FIG. 11.
Figure 14:
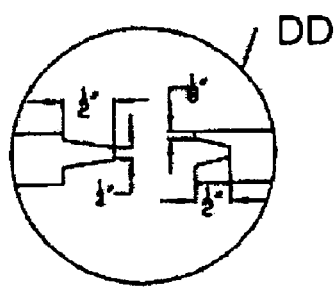
Figure 13:
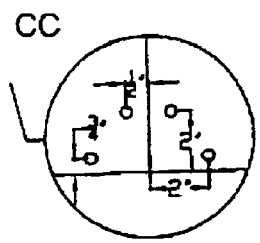
Figure 15:
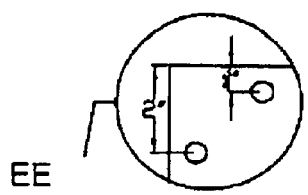

FIG. 11 shows a top view of the SCP panels 120 (with panel dimensions), but manufactured to have tongue and groove edges (not shown) similar to those of FIG. 5a, attached to the metal frame.

FIGS. 12, 13, 14 and 15 show enlarged views of respective portions BB, CC, DD and EE of the floor of FIG. 11.

A. The joists were attached to the rim track using three (3) hex head #10-16×¾" long Drivall screws into the side of the joist through the pre-bent tab and one (1) #10-16×¾" long wafer head self-drilling screws through the top of rim track into the joist, at each end. 0.078" thick×1½"×4" steel angles 151 which are 5" long were also fastened to the respective joist 1" o.c. with ¾ inch long DRIVALL screws and one ¾ inch long DRIVALL screw to the rim track.

B. 1½ inch×2⅝ inch×21¾ inch KATZ blocking 158 with a 2 inch long×1¾ inch tab on each end was fastened to the bottom of the joists across the center line of the floor. The blocking 158 was attached using (1) #10-16×¾" long Drivall screw through the end of each Katz blocking member 158. In particular, the Katz blocking 158 is located between transverse joists 50 by being positioned staggered on either side of the midpoint and attached by one #10-16×¾ inch long DRIVALL screw per tab.

C. Additional horizontal blocking was added, in two locations, to the rim track 152 on the load side to strengthen the rim track 152 for point loading purposes. Namely, 24 inch blocking 157 for load support is provided along the longitudinal rim track between a number of transverse joists 150. 20 inch long blocking 159 is fixed between each transverse end joist and the respective penultimate transverse end joist generally along the longitudinal axis of the frame with four #10-16×¾ inch long DRIVALL screws on each end.

D. The frame was squared and then the prototype SCP panel was fastened to it as shown in FIG. 11. The prototype SCP was fastened at 6" o.c. around the perimeter inset 2" from the corners, and 12 inches o.c. in the field with #8-18×1⅝ inch long Bugle head GRABBER SUPER DRIVE™ screws (winged self drilling screws 162). Care was taken to ensure that the fasteners were kept flush or slightly below the surface of the prototype SCP and also did not strip out in the steel framing. At the butt-joints and tongue and groove locations, a ⅜ inch bead of ENERFOAM SF polyurethane foam adhesive manufactured by Flexible Products Company of Canada, Inc. was applied in the joint.

E. ⅛"×2"×2" angle iron was then fastened to the end joists flush to the bottom of the joists to minimize crumpling of the joists at the bearings and to represent the top plate member. An additional 6 inches long angle was fastened at the bearing side of the end joists flush to the top of the joist also to minimize crumpling.

F. The test sample set for a minimum of 36 hours to allow the adhesive to cure.

Figure 16:
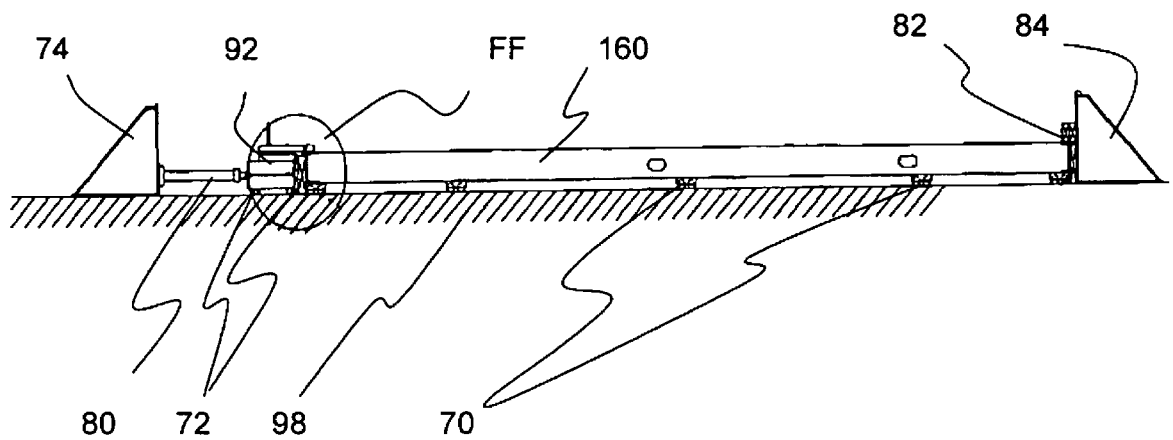
FIG. 16 shows the frame of FIG. 8 having the attached shear wall of FIG. 9 mounted on a shear wall diaphragm testing apparatus.

G. FIG. 16 shows the test sample 80, made of frame 160 of FIG. 8 having the attached floor 120 of FIG. 9, supported by appliance rollers 70 at 2 foot on center (o.c.) around the perimeter of the sample 80 on a concrete floor 98 (FIG. 17).

Figure 17:
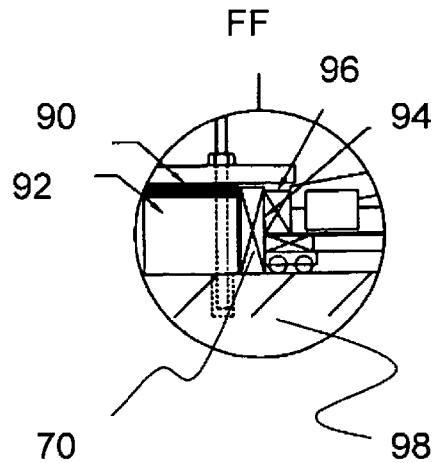
FIG. 17 shows an enlarged view of a portion of the apparatus of FIG. 16.

FIG. 17 shows an enlarged view of portion FF of FIG. 16. A bearing support 74, 84 was placed at both ends of the test sample 80. Three (3) loading cylinders 80 were located on the opposite side of the test sample 80. The load was applied from the cylinders through steel-beams, to six (6) 18" bearing blocks to uniformly apply the load to the floor test sample 80. Five (5) dial indicators were placed along the bearing side of the test sample 80 to measure deflections. FIG. 17 shows hold down 92 provided with spacers 90. A gap 96 of about ⅛ inch, and an 18 inch load block 94. The hold down 92 is mounted in cement 98. Another hold down 82 is provided at the other end of the test sample 80. The hold down 92 is supported on solid rollers 72.

Test Equipment

A. Three (3) ENERPAC Model P-39 hydraulic hand pumps.

B. Three (3) ENERPAC Model RC-1010 hydraulic cylinders.

C. Five dial indicators: 2 inches movement—0.001 inch increments.

D. Three (3) Omega digital meters.

E. Three (3) Omega pressure transducers.

F. Three (3) 6 ft. I-beams.

G. Five (5) rigid bearings bolted to floor.

Procedure

A. The loads were generated using three (3) 1½ inch diameter×10 inches stroke hydraulic cylinders, one at each load point. The applied forces were measured with three (3) digital meters and pressure transducers. A permanent record of the applied forces was made on the attached data sheets.

B. The loads were generated by applying hydraulic pressure to create mechanical force until the required load was indicated on the digital meters.

C. The entire floor assembly was loaded in increments of 700 lbs. Each load was held for 1 minute before the deflection readings were taken. After the 14,000 lbs. deflection reading was taken, the assembly was then loaded at a rate of approximately 2800 pounds per minute, until a failure occurred.

FIG. 19 shows a photograph of the SCP panel and metal frame floor mounted on the test apparatus of FIG. 16 at design load.

FIG. 20 shows a photograph of the SCP panel and metal frame floor mounted on the test apparatus of FIG. 16 at failure.

Test Results

TABLE 19 shows the results of a Floor Diaphragm Test of applying loads to the above-described entire floor assembly. The floor having a width of 120 inches.

Using a factor of safety of 3.0 the following values were obtained.

Ultimate Load=14,618.5 lbs./10.0 ft.=1,461.8 PLF (pounds per linear foot)

Design Shear=1461.8/3.0 safety factor=487.2 PLF

Design shear is calculated by dividing the ultimate load by a safety factor of 3.

Figure 18:
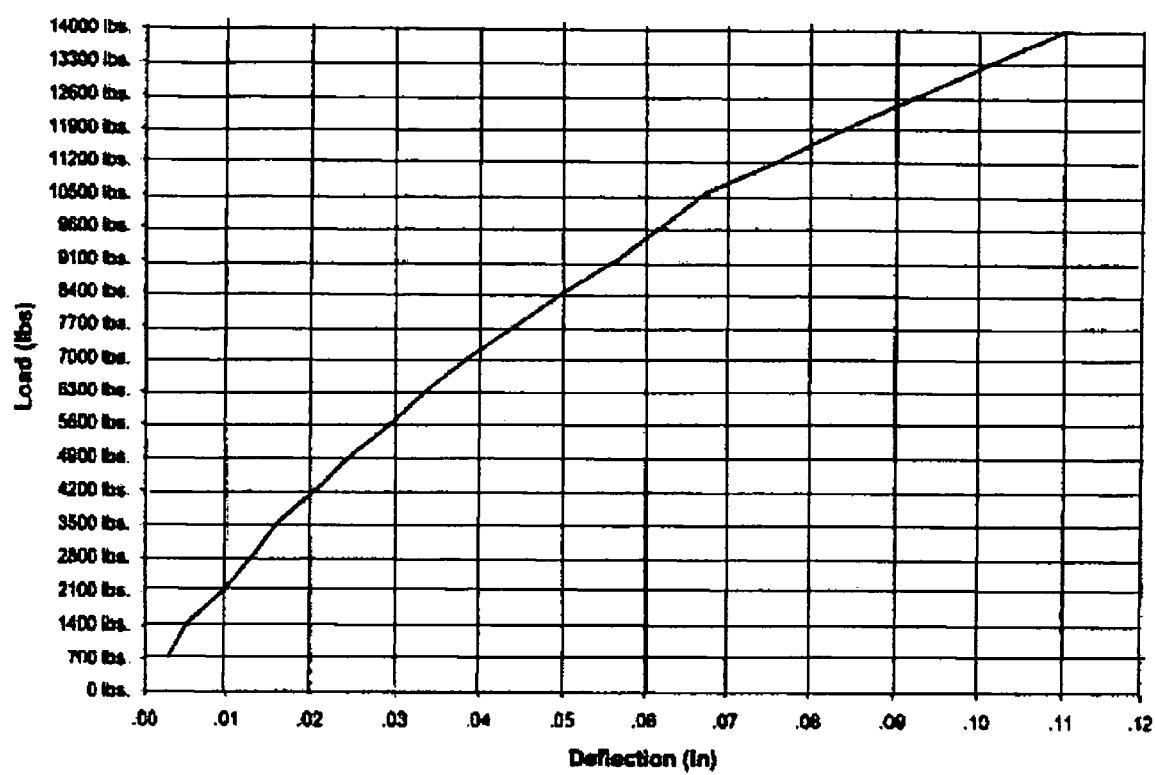
FIG. 18 shows experimental load versus deflection data from an example employing the floor diaphragm testing apparatus of FIG. 16.

Table 20 shows Resultant Deflection occurring due to the application of loads to the floor. FIG. 18 graphs the data of Table 20. FIG. 18 shows experimental load versus deflection data from the floor diaphragm test using ¾ inch structural cement panel (SCP panel) employing the floor diaphragm testing apparatus of FIG. 16.

Table 21 shows average bearing deflection from applying loads at bearing points to the test sample floor.

Based on the data obtained from this single test sample a design shear of 487.2 PLF (pounds per linear foot) can be achieved from the above-described single floor diaphragm sample constructed as follows:

TABLE 19

Floor Diagram Test

| Loading Increments | Total Ceiling Load (lbs.) | Load No. 1 (lbs.) | Load No. 2 (lbs.) | Load No. 3 (lbs.) |
|---|---|---|---|---|
| No Load | 0 | 0 | 0 | 0 |
| 1 | 700 | 233 | 233 | 233 |
| 2 | 1400 | 467 | 467 | 467 |
| 3 | 2100 | 700 | 700 | 700 |
| 4 | 2800 | 933 | 933 | 933 |
| 5 | 3500 | 1167 | 1167 | 1167 |
| 6 | 4200 | 1400 | 1400 | 1400 |
| 7 | 4900 | 1633 | 1633 | 1633 |
| 8 | 5600 | 1867 | 1867 | 1867 |
| 9 | 6300 | 2100 | 2100 | 2100 |
| 10 | 7000 | 2333 | 2333 | 2333 |
| 11 | 7700 | 2567 | 2567 | 2567 |
| Design Load | 8400 | 2800 | 2800 | 2800 |
| 13 | 9100 | 3033 | 3033 | 3033 |
| 14 | 9800 | 3267 | 3267 | 3267 |
| 15 | 10500 | 3500 | 3500 | 3500 |
| 16 | 11200 | 3733 | 3733 | 3733 |
| 17 | 11900 | 3967 | 3967 | 3967 |
| 18 | 14000 | 4667 | 4667 | 4667 |
| Ultimate Load | 29237 | 9717 | 9750 | 9770 |
| Design Load 487.3 P.L.F. | | | | |

Floor Width: 120 inches;
Design Load: 420 P.L.F. (estimated)

TABLE 20

Temp. & Humidity During Construction: 71 deg. F./32% Temp. & Humidity During Test: 73 deg. F./35%

| Time Load/ Reading | Loading Increments | Load (lbs.) | Floor Test Loads | | | | | | Resultant Deflection* |
|---|---|---|---|---|---|---|---|---|---|
| | | | Clear Span | | | | | | |
| | | | Indicator #2 | | Indicator #3 | | Indicator #4 | | |
| | | | Reading | Deflection | Reading | Defl. | Reading | Defl. | |
| 9:30 | No Load | 0 | 0.100 | | 0.100 | | 0.100 | | |
| 9:31/9:32 | 1 | 700 | 0.168 | 0.068 | 0.155 | 0.055 | 0.133 | 0.033 | 0.003 |
| 9:33/9:34 | 2 | 1400 | 0.185 | 0.085 | 0.169 | 0.069 | 0.151 | 0.051 | 0.005 |
| 9:35/9:36 | 3 | 2100 | 0.203 | 0.103 | 0.185 | 0.085 | 0.163 | 0.063 | 0.009 |
| 9:37/9:38 | 4 | 2800 | 0.219 | 0.119 | 0.199 | 0.099 | 0.174 | 0.074 | 0.013 |
| 9:39/9:40 | 5 | 3500 | 0.231 | 0.131 | 0.210 | 0.110 | 0.184 | 0.084 | 0.016 |
| 9:41/9:42 | 6 | 4200 | 0.242 | 0.142 | 0.222 | 0.122 | 0.194 | 0.094 | 0.021 |
| 9:43/9:44 | 7 | 4900 | 0.253 | 0.153 | 0.233 | 0.133 | 0.204 | 0.104 | 0.025 |
| 9:45/9:46 | 8 | 5600 | 0.265 | 0.165 | 0.244 | 0.144 | 0.214 | 0.114 | 0.030 |
| 9:47/9:48 | 9 | 6300 | 0.276 | 0.176 | 0.255 | 0.155 | 0.224 | 0.124 | 0.034 |
| 9:49/9:50 | 10 | 7000 | 0.288 | 0.188 | 0.267 | 0.167 | 0.234 | 0.134 | 0.039 |
| 9:51/9:52 | 11 | 7700 | 0.300 | 0.200 | 0.279 | 0.179 | 0.244 | 0.144 | 0.045 |
| 9:53/9:54 | Design Load | 8400 | 0.311 | 0.211 | 0.290 | 0.190 | 0.255 | 0.155 | 0.050 |
| 9:55/9:56 | 13 | 9100 | 0.321 | 0.221 | 0.302 | 0.202 | 0.264 | 0.164 | 0.057 |
| 9:57/9:58 | 14 | 9800 | 0.334 | 0.234 | 0.314 | 0.214 | 0.275 | 0.175 | 0.062 |
| 9:59/10:00 | 15 | 10500 | 0.346 | 0.246 | 0.327 | 0.227 | 0.290 | 0.190 | 0.067 |
| 10:01/10:02 | 16 | 11200 | 0.359 | 0.259 | 0.343 | 0.243 | 0.306 | 0.206 | 0.076 |
| 10:03/10:04 | 17 | 11900 | 0.373 | 0.273 | 0.360 | 0.260 | 0.327 | 0.227 | 0.084 |
| 10:05/10:06 | 18 | 14000 | 0.412 | 0.312 | 0.413 | 0.313 | 0.387 | 0.287 | 0.111 |

Sample Description: Prototype ¾ inch SCP adhered to 16 gauge- 10 inches steel joists, using ENERFOAM SF polyurethane foam adhesive
Mode of Failure: End #2 - butt joint separation on the 4' sheet in the middle row, and at the 95½" sheet on the load side as the tongue and groove joint slipped. Secondary Failure - Board shear approximately 6' in from the end on the bearing side (See FIG. 20).
*The resultant deflection is equal to the average deflection of the bearings minus the greatest point of deflection across the clear span.
FIG. 18 shows the data graphically.

TABLE 21

| Time Load/ Reading | Loading Increments | Load (lbs.) | Bearing Points | | | | Average Bearing Deflection |
|---|---|---|---|---|---|---|---|
| | | | Indicator #1 | | Indicator #5 | | |
| | | | Reading | Deflection | Reading | Defl. | |
| 9:30 | No Load | 0 | 0.000 | | 0.100 | | |
| 9:31/9:32 | 1 | 700 | 0.080 | 0.080 | 0.125 | 0.025 | 0.053 |
| 9:33/9:34 | 2 | 1400 | 0.096 | 0.096 | 0.132 | 0.032 | 0.064 |
| 9:35/9:36 | 3 | 2100 | 0.113 | 0.113 | 0.138 | 0.038 | 0.076 |
| 9:37/9:38 | 4 | 2800 | 0.127 | 0.127 | 0.145 | 0.045 | 0.086 |
| 9:39/9:40 | 5 | 3500 | 0.137 | 0.137 | 0.151 | 0.051 | 0.094 |
| 9:41/9:42 | 6 | 4200 | 0.145 | 0.145 | 0.158 | 0.058 | 0.102 |
| 9:43/9:44 | 7 | 4900 | 0.152 | 0.152 | 0.165 | 0.065 | 0.109 |
| 9:45/9:46 | 8 | 5600 | 0.158 | 0.158 | 0.171 | 0.071 | 0.115 |
| 9:47/9:48 | 9 | 6300 | 0.166 | 0.166 | 0.177 | 0.077 | 0.122 |
| 9:49/9:50 | 10 | 7000 | 0.174 | 0.174 | 0.183 | 0.083 | 0.129 |
| 9:51/9:52 | 11 | 7700 | 0.179 | 0.179 | 0.190 | 0.090 | 0.135 |
| 9:53/9:54 | Design Load | 8400 | 0.185 | 0.185 | 0.195 | 0.095 | 0.140 |
| 9:55/9:56 | 13 | 9100 | 0.191 | 0.191 | 0.200 | 0.100 | 0.146 |
| 9:57/9:58 | 14 | 9800 | 0.197 | 0.197 | 0.207 | 0.107 | 0.152 |
| 9:59/10:00 | 15 | 10500 | 0.203 | 0.203 | 0.217 | 0.117 | 0.160 |
| 10:01/10:02 | 16 | 11200 | 0.208 | 0.208 | 0.226 | 0.126 | 0.167 |
| 10:03/10:04 | 17 | 11900 | 0.214 | 0.214 | 0.238 | 0.138 | 0.176 |
| 10:05/10:06 | 18 | 14000 | 0.227 | 0.227 | 0.278 | 0.178 | 0.203 |

Example 7

This example determines the effect of water exposure on the horizontal diaphragm strength of an assembly using ¾" inch thick SCP panel by ASTM E455-98 Static Load Testing of Framed Floor or Roof Diaphragm Construction for Buildings, single beam method.

Test Specimen Materials
  A. Floor Diaphragm Materials:
  ¾ inch SCP panel reinforced with fiberglass strands. A "V"-groove and tongue are located along the 8' dimension of the 4 foot×8 foot sheets.
  Fasteners employed included #8-18×1⅝ inch long Bugle head GRABBER SUPER DRIVE screws, available for GRABBER Construction Products, spaced 6 inches on center along the perimeter, and 12 inches on center in the field of the panels. All fasteners were placed a minimum of ¾ inches in from the panel edges and ½ inches from the seams. At panel corners the fasteners were inset 2 inches. See FIG. 11 for fastener locations.
  B. Floor Framing:
  Joists included CSJ 16 gauge×8 inches deep×10 foot rim track manufactured by Dietrich Industries.

Test Specimen Construction
  Four (4) test samples were constructed to an overall dimension of 10'-0"×20'-0" as was the test sample described above in Example 6. FIG. 8 shows a perspective of the metal frame.
  However, the frame was squared and then the prototype SCP panel was fastened to it as shown in FIG. 11. The prototype SCP was fastened at 6" o.c. around the perimeter and inset 2" from the corners, 12" o.c. in the field with #8-18×1⅝" long Bugle head Grabber SuperDrive screws (winged self drilling screws 162). Care was taken to ensure that the fasteners were kept flush or slightly below the surface of the prototype SCP and also did not strip out in the steel framing. In contrast to the test sample of Example 6, at the butt-joints and tongue and groove locations, a ⅜ inch bead of ENER-FOAM SF polyurethane foam adhesive manufactured by Flexible Products Company of Canada, Inc. was not applied in the joint.

Test Equipment
  A. Four (4) ENERPAC Model P-39 hydraulic hand pumps
  B. Four (4) ENERPAC Model RC-1010 hydraulic cylinders
  C. Five (5) dial indicators 2" movement—0.001 increments
  D. Four (4) OMEGA digital meters
  E. Four (4) OMEGA pressure transducers
  F. Four (4) 6 ft I-Beams
  G. Six (6) rigid bearings bolted to the floor Procedure
  A. Two of the test assemblies were tested in an "as received", or dry condition and two samples were tested after a 1" head of water was present for a minimum of 24 hours.
  B. The loads were generated using four (4) 1½" diameter hydraulic cylinders, one at each loading point. The applied forces were measured with four (4) calibrated digital meters and pressure transducers. A permanent record of the applied forces was made on the attached data sheets.
  C. The loads were generated be applying hydraulic pressure to create mechanical force until the required load was indicated on the digital meters.
  D. The entire floor assembly was loaded in increments of 700 lbs. Each load was held for 1 minute before the deflection readings were taken. After the 14000 lb deflection reading was taken, the assembly was then loaded at a rate of approximately 2800 pounds per minute, until a failure occurred.

Figure 24:
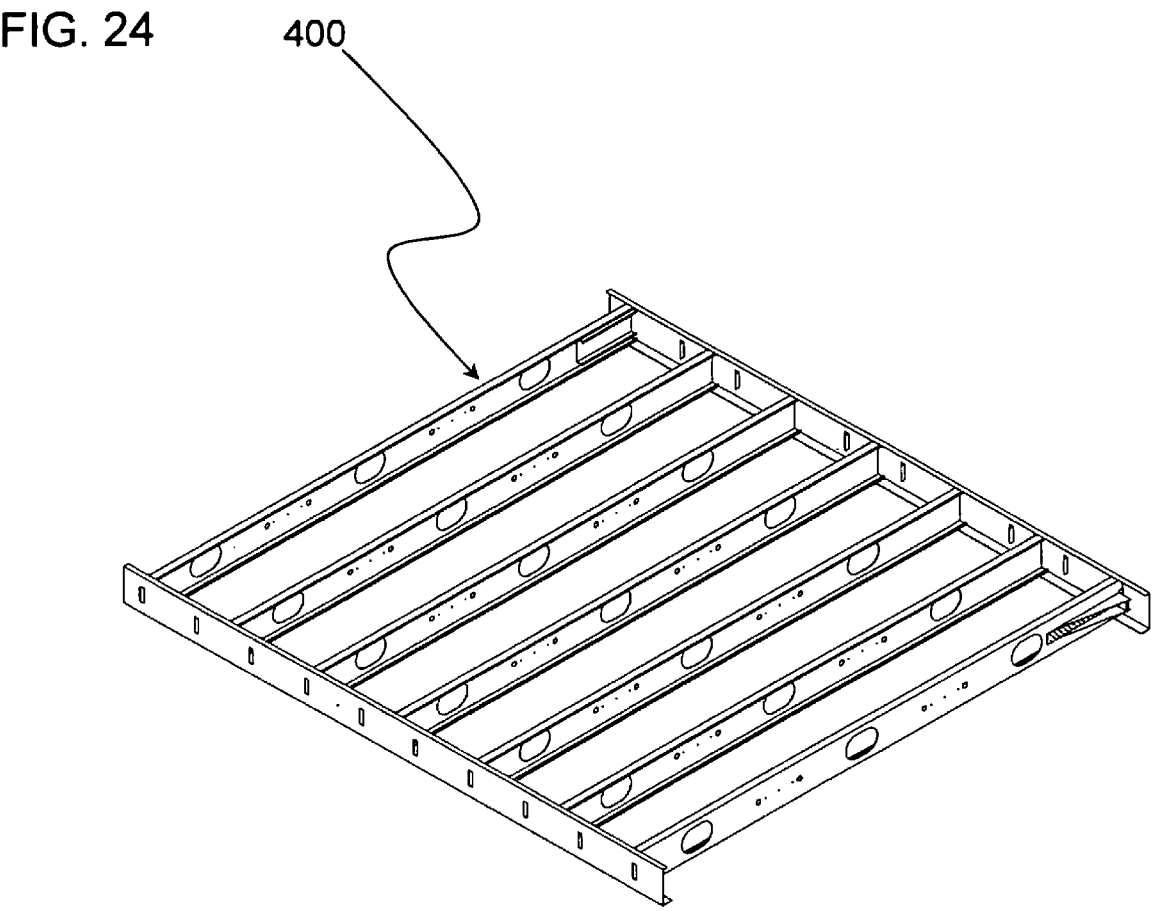
FIG. 24 shows a floor framing used in the AISI TS-7 tests.
Figure 25:
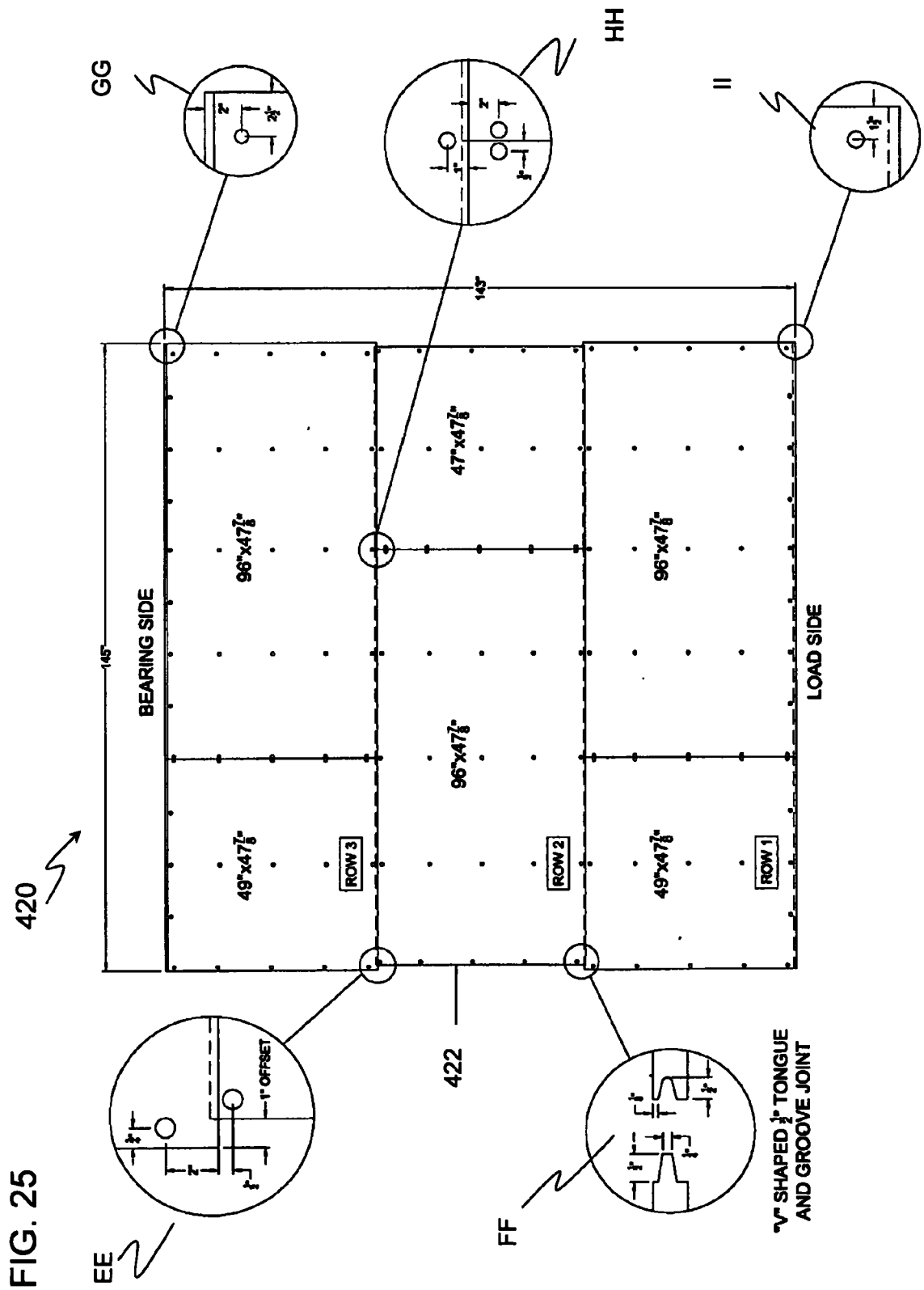
FIG. 25 shows one of the SCP Floors used in the AISI TS-7 tests.

Test Results
  TABLES 22-38 and FIGS. 24 and 25 show the results of the floor diaphragm tests of applying loads to the above described entire floor assembly. The floor having a width of 120 inches. FIG. 24 shows the data of Dry Test 1 and Dry Test 2. FIG. 25 shows data from Wet Test 1 and Wet Test 2.
  Using a factor of safety of 3.0, the following values were obtained.
  Average ultimate load of dry samples=15,908.2 lb/10 ft=1,590.8 PLF
  Design Shear of dry samples=1,590.8 PLF/3.0 safety factor=530.2 PLF
  Average ultimate load of wet samples=14,544.5 lb/10 ft=1,454.4 PLF
  Design Shear of wet samples=1,454.4 PLF/3.0 safety factor=484.8 PLF
  These results indicate than approximately a 91% retention of diaphragm strength after continuous exposure to water for a 24 hour time period.

TABLE 22

Floor Diaphragm Test; Floor width 120 inches; Design Load 420 P.L.F. (Dry Test 1)

| Loading Increments | Total Ceiling Load (lbs.) | Load No. 1 (lbs.) | Load No. 2 (lbs.) | Load No. 3 (lbs.) | Load No. 4 (lbs.) |
|---|---|---|---|---|---|
| No Load | 0 | 0 | 0 | 0 | 0 |
| 1 | 700 | 175 | 175 | 175 | 175 |
| 2 | 1400 | 350 | 350 | 350 | 350 |
| 3 | 2100 | 525 | 525 | 525 | 525 |
| 4 | 2800 | 700 | 700 | 700 | 700 |
| 5 | 3500 | 875 | 875 | 875 | 875 |
| 6 | 4200 | 1050 | 1050 | 1050 | 1050 |
| 7 | 4900 | 1225 | 1225 | 1225 | 1225 |
| 8 | 5600 | 1400 | 1400 | 1400 | 1400 |
| 9 | 6300 | 1575 | 1575 | 1575 | 1575 |
| 10 | 7000 | 1750 | 1750 | 1750 | 1750 |
| 11 | 7700 | 1925 | 1925 | 1925 | 1925 |
| Design Load | 8400 | 2100 | 2100 | 2100 | 2100 |
| 13 | 9100 | 2275 | 2275 | 2275 | 2275 |
| 14 | 9800 | 2450 | 2450 | 2450 | 2450 |
| 15 | 10500 | 2625 | 2625 | 2625 | 2625 |
| 16 | 11200 | 2800 | 2800 | 2800 | 2800 |
| 17 | 11900 | 2975 | 2975 | 2975 | 2975 |
| 18 | 14000 | 3500 | 3500 | 3500 | 3500 |
| Ultimate Load | 28,665 | 7,039 | 7,317 | 7,262 | 7,047 |

Design Load 477.8 P.L.F.

There are two design loads in this table. To set up the test and size the test equipment you initially hypothesize t first design load, here 420 P.L.F.

The measured 477.8 P.L.F. is the actual Design Load determined from actual measurements and adding a safety factor.

TABLE 23

Floor Diaphragm Test (Dry Test 1)
Clear Span

| Load Increment | Load (lbs.) | Indicator #2 Reading | Deflection | Indicator #3 Reading | Deflection | Indicator #4 Reading | Deflection | RESULTANT DEFLECTION* |
|---|---|---|---|---|---|---|---|---|
| No Load | 0 | 0.154 | — | 0.084 | — | 0.094 | — | — |
| 1 | 700 | 0.187 | 0.033 | 0.128 | 0.044 | 0.148 | 0.054 | 0.044 |
| 2 | 1400 | 0.225 | 0.071 | 0.165 | 0.081 | 0.182 | 0.088 | 0.081 |
| 3 | 2100 | 0.244 | 0.090 | 0.187 | 0.103 | 0.202 | 0.108 | 0.103 |
| 4 | 2800 | 0.260 | 0.106 | 0.211 | 0.127 | 0.223 | 0.129 | 0.127 |
| 5 | 3500 | 0.275 | 0.121 | 0.228 | 0.144 | 0.242 | 0.148 | 0.144 |
| 6 | 4200 | 0.291 | 0.137 | 0.250 | 0.166 | 0.265 | 0.171 | 0.166 |
| 7 | 4900 | 0.308 | 0.154 | 0.274 | 0.190 | 0.292 | 0.198 | 0.190 |
| 8 | 5600 | 0.325 | 0.171 | 0.295 | 0.211 | 0.316 | 0.222 | 0.211 |
| 9 | 6300 | 0.338 | 0.184 | 0.309 | 0.225 | 0.326 | 0.232 | 0.224 |
| 10 | 7000 | 0.354 | 0.200 | 0.327 | 0.243 | 0.341 | 0.247 | 0.241 |
| 11 | 7700 | 0.369 | 0.215 | 0.344 | 0.260 | 0.356 | 0.262 | 0.258 |
| Design Load | 8400 | 0.386 | 0.232 | 0.362 | 0.278 | 0.372 | 0.278 | 0.276 |
| 13 | 9100 | 0.402 | 0.248 | 0.380 | 0.296 | 0.385 | 0.291 | 0.293 |
| 14 | 9800 | 0.425 | 0.271 | 0.405 | 0.321 | 0.410 | 0.316 | 0.313 |
| 15 | 10500 | 0.454 | 0.300 | 0.442 | 0.358 | 0.449 | 0.355 | 0.325 |
| 16 | 11200 | 0.495 | 0.341 | 0.490 | 0.406 | 0.502 | 0.408 | 0.348 |
| 17 | 11900 | 0.512 | 0.358 | 0.521 | 0.437 | 0.535 | 0.441 | 0.367 |
| 18 | 14000 | 0.569 | 0.415 | 0.596 | 0.512 | 0.614 | 0.520 | 0.422 |

Temp. and Humidity During Construction: 65° F./31%

Temp. and Humidity During Test: 65° F./31%

Sample Description 1/3 inch SCP panel fastened to 16 gauge - 10 inch steel joints Mode of failure: Several of the butt-joints opened up in several locations causing cement board core failure at the fasteners along the edges of the cement board.

*The resultant deflection is equal to the average deflection of the bearings minus the greatest point of deflection across the clearspan.

TABLE 24

Floor Diaphragm Test (Dry Test 1)

| Load Increment | Load (lbs.) | Indicator #1 Reading | Deflection | Indicator #5 Reading | Deflection | AVERAGE BEARING DEFLECTION |
|---|---|---|---|---|---|---|
| No Load | 0 lbs | 0.069 | — | 0.266 | — | — |
| 1 | 700 | 0.069 | 0.000 | 0.266 | 0.000 | 0.000 |
| 2 | 1400 | 0.069 | 0.000 | 0.266 | 0.000 | 0.000 |
| 3 | 2100 | 0.069 | 0.000 | 0.266 | 0.000 | 0.000 |
| 4 | 2800 | 0.069 | 0.000 | 0.266 | 0.000 | 0.000 |
| 5 | 3500 | 0.069 | 0.000 | 0.266 | 0.000 | 0.000 |
| 6 | 4200 | 0.069 | 0.000 | 0.266 | 0.000 | 0.000 |
| 7 | 4900 | 0.069 | 0.000 | 0.266 | 0.000 | 0.000 |
| 8 | 5600 | 0.069 | 0.000 | 0.266 | 0.000 | 0.000 |
| 9 | 6300 | 0.070 | 0.001 | 0.267 | 0.001 | 0.001 |
| 10 | 7000 | 0.072 | 0.003 | 0.267 | 0.001 | 0.002 |
| 11 | 7700 | 0.072 | 0.003 | 0.267 | 0.001 | 0.002 |
| Design Load | 8400 | 0.073 | 0.004 | 0.267 | 0.001 | 0.003 |
| 13 | 9100 | 0.075 | 0.006 | 0.267 | 0.001 | 0.004 |
| 14 | 9800 | 0.083 | 0.014 | 0.268 | 0.002 | 0.008 |
| 15 | 10500 | 0.094 | 0.025 | 0.307 | 0.041 | 0.033 |
| 16 | 11200 | 0.105 | 0.036 | 0.346 | 0.080 | 0.058 |
| 17 | 11900 | 0.107 | 0.038 | 0.369 | 0.103 | 0.071 |
| 18 | 14000 | 0.114 | 0.045 | 0.402 | 0.136 | 0.091 |

Bearing Indictors 2, 3 and 4 (labeled "Clear Span") of Table 23 are the instruments along the test specimen in the area between the support points at the two opposed ends of the frame.
Bearing Indicators 1 and 5 of Table 24 are at the support points of this test specimen.

TABLE 25

Floor Diaphragm Test; Floor width 120 inches; Design Load 420 P.L.F.
(Dry Test 2)
Floor Test Loads

| Loading Increments | Total Ceiling Load (lbs.) | Load No. 1 (lbs.) | Load No. 2 (lbs.) | Load No. 3 (lbs.) | Load No. 4 (lbs.) |
|---|---|---|---|---|---|
| No Load | 0 | 0 | 0 | 0 | 0 |
| 1 | 700 | 175 | 175 | 175 | 175 |
| 2 | 1400 | 350 | 350 | 350 | 350 |
| 3 | 2100 | 525 | 525 | 525 | 525 |
| 4 | 2800 | 700 | 700 | 700 | 700 |
| 5 | 3500 | 875 | 875 | 875 | 875 |
| 6 | 4200 | 1050 | 1050 | 1050 | 1050 |
| 7 | 4900 | 1225 | 1225 | 1225 | 1225 |
| 8 | 5600 | 1400 | 1400 | 1400 | 1400 |
| 9 | 6300 | 1575 | 1575 | 1575 | 1575 |
| 10 | 7000 | 1750 | 1750 | 1750 | 1750 |
| 11 | 7700 | 1925 | 1925 | 1925 | 1925 |
| Design Load | 8400 | 2100 | 2100 | 2100 | 2100 |
| 13 | 9100 | 2275 | 2275 | 2275 | 2275 |
| 14 | 9800 | 2450 | 2450 | 2450 | 2450 |
| 15 | 10500 | 2625 | 2625 | 2625 | 2625 |
| 16 | 11200 | 2800 | 2800 | 2800 | 2800 |
| 17 | 11900 | 2975 | 2975 | 2975 | 2975 |
| 18 | 14000 | 3500 | 3500 | 3500 | 3500 |
| Ultimate Load | 34,968 | 8,900 | 8,653 | 8,715 | 8,700 |

Design Load 582.8 P.L.F.

TABLE 26

Floor Diaphragm Test (Dry Test 2)

| | | Clear Span | | | | | | |
|---|---|---|---|---|---|---|---|---|
| Load | | Indicator #2 | | Indicator #3 | | Indicator #4 | | RESULTANT |
| Increment | Load (lbs.) | Reading | Deflection | Reading | Deflection | Reading | Deflection | DEFLECTION* |
| No Load | 0 lbs. | 0.290 | — | 0.127 | — | 0.231 | — | — |
| 1 | 700 lbs. | 0.322 | 0.032 | 0.156 | 0.029 | 0.250 | 0.019 | 0.028 |
| 2 | 1400 lbs. | 0.342 | 0.052 | 0.178 | 0.051 | 0.270 | 0.039 | 0.050 |
| 3 | 2100 lbs. | 0.365 | 0.075 | 0.202 | 0.075 | 0.292 | 0.061 | 0.073 |
| 4 | 2800 lbs. | 0.381 | 0.091 | 0.222 | 0.095 | 0.312 | 0.081 | 0.092 |
| 5 | 3500 lbs. | 0.398 | 0.108 | 0.244 | 0.117 | 0.334 | 0.103 | 0.113 |
| 6 | 4200 lbs. | 0.414 | 0.124 | 0.265 | 0.138 | 0.354 | 0.123 | 0.133 |
| 7 | 4900 lbs. | 0.429 | 0.139 | 0.285 | 0.158 | 0.375 | 0.144 | 0.152 |
| 8 | 5600 lbs. | 0.446 | 0.156 | 0.307 | 0.180 | 0.396 | 0.165 | 0.173 |
| 9 | 6300 lbs. | 0.463 | 0.173 | 0.328 | 0.201 | 0.415 | 0.184 | 0.192 |
| 10 | 7000 lbs. | 0.478 | 0.188 | 0.345 | 0.218 | 0.433 | 0.202 | 0.209 |
| 11 | 7700 lbs. | 0.493 | 0.203 | 0.363 | 0.236 | 0.450 | 0.219 | 0.225 |
| Design Load | 8400 lbs. | 0.510 | 0.220 | 0.486 | 0.259 | 0.471 | 0.240 | 0.247 |
| 13 | 9100 lbs. | 0.525 | 0.235 | 0.404 | 0.277 | 0.490 | 0.259 | 0.265 |
| 14 | 9800 lbs. | 0.543 | 0.253 | 0.429 | 0.302 | 0.513 | 0.282 | 0.289 |
| 15 | 10500 lbs. | 0.562 | 0.272 | 0.454 | 0.327 | 0.540 | 0.309 | 0.313 |
| 16 | 11200 lbs. | 0.581 | 0.291 | 0.478 | 0.351 | 0.564 | 0.333 | 0.337 |
| 17 | 11900 lbs. | 0.600 | 0.310 | 0.500 | 0.373 | 0.585 | 0.354 | 0.358 |
| 18 | 14000 lbs. | 0.655 | 0.365 | 0.565 | 0.438 | 0.640 | 0.409 | 0.421 |

Temp. and Humidity During Construction: 70° F./50%
Temp. and Humidity During Test: 70° F./48%
Sample Description: ³/₄ inch SCP panel fastened to 16 gauge - 8 inch steel joints
Mode of failure: Several of the butt-joints opened up in several locations causing cement board core failure at the fasteners along the edges of the cement board.
*The resultant deflection is equal to the average deflection of the bearings minus the greatest point of deflection across the clearspan.

TABLE 27

Floor Diagram Test (Dry Test 2)

| | | Bearing Points | | | | AVERAGE BEARING DEFLECTION |
|---|---|---|---|---|---|---|
| | | Indicator #1 | | Indicator #5 | | |
| Load Increment | Load (lbs.) | Reading | Deflection | Reading | Deflection | |
| No Load | 0 | 0.124 | — | 0.201 | — | — |
| 1 | 700 | 0.125 | 0.001 | 0.202 | 0.001 | 0.001 |
| 2 | 1400 | 0.125 | 0.001 | 0.203 | 0.002 | 0.002 |
| 3 | 2100 | 0.127 | 0.003 | 0.203 | 0.002 | 0.003 |
| 4 | 2800 | 0.128 | 0.004 | 0.203 | 0.002 | 0.003 |
| 5 | 3500 | 0.129 | 0.005 | 0.204 | 0.003 | 0.004 |
| 6 | 4200 | 0.131 | 0.006 | 0.205 | 0.004 | 0.005 |
| 7 | 4900 | 0.132 | 0.007 | 0.206 | 0.005 | 0.006 |
| 8 | 5600 | 0.134 | 0.010 | 0.206 | 0.005 | 0.007 |
| 9 | 6300 | 0.136 | 0.012 | 0.207 | 0.006 | 0.009 |
| 10 | 7000 | 0.137 | 0.013 | 0.208 | 0.006 | 0.009 |
| 11 | 7700 | 0.139 | 0.015 | 0.208 | 0.007 | 0.011 |
| Design Load | 8400 | 0.141 | 0.017 | 0.208 | 0.007 | 0.012 |
| 13 | 9100 | 0.141 | 0.017 | 0.208 | 0.007 | 0.012 |
| 14 | 9800 | 0.143 | 0.019 | 0.208 | 0.007 | 0.013 |
| 15 | 10500 | 0.145 | 0.021 | 0.209 | 0.008 | 0.015 |
| 16 | 11200 | 0.145 | 0.021 | 0.209 | 0.008 | 0.015 |
| 17 | 11900 | 0.147 | 0.023 | 0.209 | 0.008 | 0.016 |
| 18 | 14000 | 0.150 | 0.026 | 0.209 | 0.008 | 0.017 |

Temp. and Humidity During Construction: 70° F./50%
Temp. and Humidity During Test: 70° F./48%
Sample Description: ¾ inch SCP panel fastened to 16 gauge - 8 inch steel joints
Mode of failure: Several of the butt-joints opened up in several locations causing cement board core failure at the fasteners along the edges of the cement board.
*The resultant deflection is equal to the average deflection of the bearings minus the greatest point of deflection across the clearspan.

TABLE 28

Floor Diaphragm Test (Wet Test 1); Floor width 120 inches; Design Load 420 P.L.F.
Floor Test Loads

| Loading Increments | Total Ceiling Load (lbs.) | Load No. 1 (lbs.) | Load No. 2 (lbs.) | Load No. 3 (lbs.) | Load No. 4 (lbs.) |
|---|---|---|---|---|---|
| No Load | 0 | 0 | 0 | 0 | 0 |
| 1 | 700 | 175 | 175 | 175 | 175 |
| 2 | 1400 | 350 | 350 | 350 | 350 |
| 3 | 2100 | 525 | 525 | 525 | 525 |
| 4 | 2800 | 700 | 700 | 700 | 700 |
| 5 | 3500 | 875 | 875 | 875 | 875 |
| 6 | 4200 | 1050 | 1050 | 1050 | 1050 |
| 7 | 4900 | 1225 | 1225 | 1225 | 1225 |
| 8 | 5600 | 1400 | 1400 | 1400 | 1400 |
| 9 | 6300 | 1575 | 1575 | 1575 | 1575 |
| 10 | 7000 | 1750 | 1750 | 1750 | 1750 |
| 11 | 7700 | 1925 | 1925 | 1925 | 1925 |
| Design Load | 8400 | 2100 | 2100 | 2100 | 2100 |
| 13 | 9100 | 2275 | 2275 | 2275 | 2275 |
| 14 | 9800 | 2450 | 2450 | 2450 | 2450 |
| 15 | 10500 | 2625 | 2625 | 2625 | 2625 |
| 16 | 11200 | 2800 | 2800 | 2800 | 2800 |
| 17 | 11900 | 2975 | 2975 | 2975 | 2975 |
| 18 | 14000 | 3500 | 3500 | 3500 | 3500 |
| Ultimate Load | 27,893 | 7,097 | 6,878 | 6,850 | 7,068 |

Design Load 464.9 P.L.F.

TABLE 29

Floor Diaphragm Comparison Test (Wet Test 1)

| | | Clear Span | | | | | | RESULTANT DEFLECTION* |
|---|---|---|---|---|---|---|---|---|
| | | Indicator #2 | | Indicator #3 | | Indicator #4 | | |
| Load Increment | Load (lbs.) | Reading | Deflection | Reading | Deflection | Reading | Deflection | |
| No Load | 0 | 0.211 | — | 0.185 | — | 0.268 | — | — |
| 1 | 700 | 0.239 | 0.028 | 0.208 | 0.023 | 0.287 | 0.019 | 0.023 |
| 2 | 1400 | 0.245 | 0.034 | 0.225 | 0.040 | 0.293 | 0.025 | 0.040 |
| 3 | 2100 | 0.267 | 0.056 | 0.239 | 0.054 | 0.316 | 0.048 | 0.053 |
| 4 | 2800 | 0.287 | 0.076 | 0.260 | 0.075 | 0.336 | 0.068 | 0.073 |

TABLE 29-continued

Floor Diaphragm Comparison Test (Wet Test 1)

| Load Increment | Load (lbs.) | Clear Span | | | | | | RESULTANT DEFLECTION* |
|---|---|---|---|---|---|---|---|---|
| | | Indicator #2 | | Indicator #3 | | Indicator #4 | | |
| | | Reading | Deflection | Reading | Deflection | Reading | Deflection | |
| 5 | 3500 | 0.304 | 0.093 | 0.280 | 0.095 | 0.354 | 0.086 | 0.093 |
| 6 | 4200 | 0.320 | 0.109 | 0.300 | 0.115 | 0.372 | 0.104 | 0.113 |
| 7 | 4900 | 0.335 | 0.124 | 0.318 | 0.133 | 0.388 | 0.120 | 0.131 |
| 8 | 5600 | 0.354 | 0.143 | 0.339 | 0.154 | 0.405 | 0.137 | 0.152 |
| 9 | 6300 | 0.369 | 0.158 | 0.356 | 0.171 | 0.421 | 0.153 | 0.168 |
| 10 | 7000 | 0.388 | 0.177 | 0.378 | 0.193 | 0.441 | 0.173 | 0.188 |
| 11 | 7700 | 0.405 | 0.194 | 0.398 | 0.213 | 0.458 | 0.190 | 0.207 |
| Design Load | 8400 | 0.430 | 0.219 | 0.426 | 0.241 | 0.481 | 0.213 | 0.230 |
| 13 | 9100 | 0.469 | 0.258 | 0.463 | 0.278 | 0.508 | 0.240 | 0.252 |
| 14 | 9800 | 0.500 | 0.289 | 0.497 | 0.312 | 0.536 | 0.268 | 0.275 |
| 15 | 10500 | 0.521 | 0.310 | 0.522 | 0.337 | 0.558 | 0.290 | 0.298 |
| 16 | 11200 | 0.545 | 0.334 | 0.549 | 0.364 | 0.582 | 0.314 | 0.323 |
| 17 | 11900 | 0.569 | 0.358 | 0.579 | 0.394 | 0.610 | 0.342 | 0.351 |
| 18 | 14000 | 0.635 | 0.424 | 0.668 | 0.483 | 0.692 | 0.424 | 0.431 |

Temp. and Humidity During Construction: 65° F./31%
Temp. and Humidity During Test: 65° F./31%
Sample Description ¾ inch SCP panel fastened to 16 gauge - 8 inch steel joists
Several of the butt-joints opened up in several locations causing cement board core failure at the fasteners along the edges of the cement board.
*The resultant deflection is equal to the average deflection of the bearings minus the greatest point of deflection across the clearspan.

TABLE 30

Floor Diaphragm Test (Wet Test 1)

| Load Increment | Load (lbs.) | Bearing Points | | | | AVERAGE BEARING DEFLECTION |
|---|---|---|---|---|---|---|
| | | Indicator #1 | | Indicator #5 | | |
| | | Reading | Deflection | Reading | Deflection | |
| No Load | 0 | 0.199 | — | 0.341 | — | — |
| 1 | 700 | 0.199 | 0.000 | 0.342 | 0.001 | 0.001 |
| 2 | 1400 | 0.199 | 0.000 | 0.342 | 0.001 | 0.001 |
| 3 | 2100 | 0.199 | 0.000 | 0.343 | 0.002 | 0.001 |
| 4 | 2800 | 0.199 | 0.000 | 0.345 | 0.004 | 0.002 |
| 5 | 3500 | 0.199 | 0.000 | 0.345 | 0.004 | 0.002 |
| 6 | 4200 | 0.199 | 0.000 | 0.345 | 0.004 | 0.002 |
| 7 | 4900 | 0.199 | 0.000 | 0.346 | 0.005 | 0.002 |
| 8 | 5600 | 0.199 | 0.000 | 0.346 | 0.005 | 0.002 |
| 9 | 6300 | 0.200 | 0.001 | 0.347 | 0.006 | 0.003 |
| 10 | 7000 | 0.203 | 0.004 | 0.347 | 0.006 | 0.005 |
| 11 | 7700 | 0.204 | 0.005 | 0.348 | 0.007 | 0.006 |
| Design Load | 8400 | 0.214 | 0.015 | 0.348 | 0.007 | 0.011 |
| 13 | 9100 | 0.244 | 0.045 | 0.349 | 0.008 | 0.027 |
| 14 | 9800 | 0.265 | 0.066 | 0.349 | 0.008 | 0.037 |
| 15 | 10500 | 0.268 | 0.069 | 0.350 | 0.009 | 0.039 |
| 16 | 11200 | 0.272 | 0.073 | 0.351 | 0.010 | 0.042 |
| 17 | 11900 | 0.275 | 0.076 | 0.352 | 0.011 | 0.044 |
| 18 | 14000 | 0.289 | 0.090 | 0.355 | 0.014 | 0.052 |

Temp. and Humidity During Construction: 65° F./31%
Temp. and Humidity During Test: 65° F./31%
Sample Description ¾ inch SCP panel fastened to 16 gauge - 8 inch steel joists
Several of the butt-joints opened up in several locations causing cement board core failure at the fasteners along the edges of the cement board.
*The resultant deflection is equal to the average deflection of the bearings minus the greatest point of deflection across the clearspan.

TABLE 31

Floor Diaphragm Test (Wet); Floor Width; Design Load 420 P.L.F. (Wet Test 2)
Floor Test Loads

| Loading Increments | Total Ceiling Load (lbs.) | Load No. 1 (lbs.) | Load No. 2 (lbs.) | Load No. 3 (lbs.) | Load No. 4 (lbs.) |
|---|---|---|---|---|---|
| No Load | 0 | 0 | 0 | 0 | 0 |
| 1 | 700 | 175 | 175 | 175 | 175 |
| 2 | 1400 | 350 | 350 | 350 | 350 |
| 3 | 2100 | 525 | 525 | 525 | 525 |
| 4 | 2800 | 700 | 700 | 700 | 700 |
| 5 | 3500 | 875 | 875 | 875 | 875 |
| 6 | 4200 | 1050 | 1050 | 1050 | 1050 |
| 7 | 4900 | 1225 | 1225 | 1225 | 1225 |
| 8 | 5600 | 1400 | 1400 | 1400 | 1400 |
| 9 | 6300 | 1575 | 1575 | 1575 | 1575 |
| 10 | 7000 | 1750 | 1750 | 1750 | 1750 |
| 11 | 7700 | 1925 | 1925 | 1925 | 1925 |
| Design Load | 8400 | 2100 | 2100 | 2100 | 2100 |
| 13 | 9100 | 2275 | 2275 | 2275 | 2275 |
| 14 | 9800 | 2450 | 2450 | 2450 | 2450 |
| 15 | 10500 | 2625 | 2625 | 2625 | 2625 |
| 16 | 11200 | 2800 | 2800 | 2800 | 2800 |
| 17 | 11900 | 2975 | 2975 | 2975 | 2975 |
| 18 | 14000 | 3500 | 3500 | 3500 | 3500 |
| Ultimate Load | 30,285 | 7,327 | 7,707 | 7,740 | 7,511 |

Design Load 504.8 P.L.F.

TABLE 32

Floor Diaphragm Comparison Test (Wet Test 2)

| Load Increment | Load (lbs.) | Clear Span Indicator #2 Reading | Clear Span Indicator #2 Deflection | Clear Span Indicator #3 Reading | Clear Span Indicator #3 Deflection | Clear Span Indicator #4 Reading | Clear Span Indicator #4 Deflection | RESULTANT DEFLECTION* |
|---|---|---|---|---|---|---|---|---|
| No Load | 0 | 0.166 | — | 0.136 | — | 0.129 | — | — |
| 1 | 700 | 0.180 | 0.014 | 0.144 | 0.008 | 0.140 | 0.011 | 0.007 |
| 2 | 1400 | 0.193 | 0.027 | 0.156 | 0.020 | 0.150 | 0.021 | 0.019 |
| 3 | 2100 | 0.210 | 0.044 | 0.173 | 0.037 | 0.167 | 0.038 | 0.035 |
| 4 | 2800 | 0.228 | 0.062 | 0.192 | 0.056 | 0.181 | 0.052 | 0.054 |
| 5 | 3500 | 0.240 | 0.074 | 0.210 | 0.074 | 0.195 | 0.066 | 0.071 |
| 6 | 4200 | 0.268 | 0.102 | 0.233 | 0.197 | 0.213 | 0.084 | 0.094 |
| 7 | 4900 | 0.312 | 0.146 | 0.270 | 0.134 | 0.237 | 0.108 | 0.130 |
| 8 | 5600 | 0.337 | 0.171 | 0.293 | 0.157 | 0.255 | 0.126 | 0.152 |
| 9 | 6300 | 0.370 | 0.204 | 0.326 | 0.190 | 0.280 | 0.151 | 0.184 |
| 10 | 7000 | 0.387 | 0.221 | 0.345 | 0.209 | 0.295 | 0.166 | 0.201 |
| 11 | 7700 | 0.406 | 0.240 | 0.367 | 0.231 | 0.314 | 0.185 | 0.223 |
| Design Load | 8400 | 0.423 | 0.257 | 0.386 | 0.250 | 0.330 | 0.201 | 0.241 |
| 13 | 9100 | 0.440 | 0.274 | 0.406 | 0.270 | 0.351 | 0.222 | 0.260 |
| 14 | 9800 | 0.451 | 0.285 | 0.427 | 0.291 | 0.368 | 0.239 | 0.279 |
| 15 | 10500 | 0.471 | 0.309 | 0.448 | 0.312 | 0.387 | 0.258 | 0.298 |
| 16 | 11200 | 0.491 | 0.325 | 0.468 | 0.332 | 0.405 | 0.276 | 0.316 |
| 17 | 11900 | 0.512 | 0.346 | 0.494 | 0.358 | 0.429 | 0.300 | 0.341 |
| 18 | 14000 | 0.569 | 0.393 | 0.553 | 0.417 | 0.482 | 0.353 | 0.396 |

Temp. and Humidity During Construction: 70° F./50%
Temp. and Humidity During Test: 70° F./48%
Sample Description: ¾ inch SCP panel fastened to 16 gauge - 8 inch steel joints
Mode of failure: The butt-joints on the load side of the floor at end #1 opened up causing core failure to the cement board around the screws along the joint. The screws along the end joist at end #1 pulled through the cement board due to core
*The resultant deflection is equal to the average deflection of the bearings minus the greatest point of deflection across the clearspan.

TABLE 33

Floor Diaphragm Test (Wet Test 2)

| Load Increment | Load (lbs.) | Bearing Points Indicator #1 Reading | Bearing Points Indicator #1 Deflection | Bearing Points Indicator #5 Reading | Bearing Points Indicator #5 Deflection | AVERAGE BEARING DEFLECTION |
|---|---|---|---|---|---|---|
| No Load | 0 lbs | 0.075 | — | 0.110 | — | — |
| 1 | 700 lbs. | 0.077 | 0.002 | 0.110 | 0.000 | 0.001 |
| 2 | 1400 | 0.078 | 0.003 | 0.110 | 0.000 | 0.002 |
| 3 | 2100 | 0.078 | 0.003 | 0.111 | 0.001 | 0.002 |
| 4 | 2800 | 0.078 | 0.003 | 0.111 | 0.001 | 0.002 |

TABLE 33-continued

Floor Diaphragm Test (Wet Test 2)

| Load Increment | Load (lbs.) | Bearing Points Indicator #1 Reading | Deflection | Indicator #5 Reading | Deflection | AVERAGE BEARING DEFLECTION |
|---|---|---|---|---|---|---|
| 5 | 3500 | 0.079 | 0.004 | 0.112 | 0.002 | 0.003 |
| 6 | 4200 | 0.079 | 0.004 | 0.112 | 0.002 | 0.003 |
| 7 | 4900 | 0.080 | 0.005 | 0.113 | 0.003 | 0.004 |
| 8 | 5600 | 0.083 | 0.008 | 0.113 | 0.003 | 0.006 |
| 9 | 6300 | 0.084 | 0.009 | 0.114 | 0.004 | 0.007 |
| 10 | 7000 | 0.086 | 0.011 | 0.115 | 0.005 | 0.008 |
| 11 | 7700 | 0.087 | 0.012 | 0.115 | 0.005 | 0.009 |
| Design Load | 8400 | 0.089 | 0.014 | 0.115 | 0.005 | 0.010 |
| 13 | 9100 | 0.090 | 0.015 | 0.116 | 0.006 | 0.011 |
| 14 | 9800 | 0.092 | 0.017 | 0.118 | 0.008 | 0.013 |
| 15 | 10500 | 0.095 | 0.020 | 0.119 | 0.009 | 0.015 |
| 16 | 11200 | 0.097 | 0.022 | 0.120 | 0.010 | 0.016 |
| 17 | 11900 | 0.099 | 0.024 | 0.120 | 0.010 | 0.017 |
| 18 | 14000 | 0.105 | 0.030 | 0.123 | 0.013 | 0.022 |

Bearing Indictors 2, 3 and 4 (labeled "Clear Span") of Table 32 are the instruments along the test specimen in the area between the support points at the two opposed ends of the frame.
Bearing Indicators 1 and 5 of Table 33 are at the support points of this test specimen.

TABLE 34

Water Absorption Results - ¾ inch thick SCP panel

| Specimen | Weight Before Soak | Weight After Soak | Weight Gain | Weight Gain Percentage |
|---|---|---|---|---|
| A | 2069.0 g | 2082.3 g | 13.3 g | 0.6% |
| B | 2109.1 g | 2112.6 g | 3.5 g | 0.2% |
| C | 2145.0 g | 2149.9 g | 4.9 g | 0.2% |
| Average Water Absorption | | | | 0.3% |

This data is for moisture content tests done on specimens A, B and C which are 12 inch × 12 inch specimens of the SCP panel of the composition tested in the above "Wet" and "Dry" tests. In the moisture content tests the specimens are soaked 24 hours under a two inch head of water.

TABLE 35

Moisture Content ¾ inch thick SCP panel

| Specimen | Weight After Drying (g) | Before Soak Test Weight of samples before soak (g) | Weight Loss (g) | Weight Loss Percentage | After Soak Test Weight of samples after soak (g) | Weight Loss (g) | Weight Loss Percentage |
|---|---|---|---|---|---|---|---|
| A | 1801.9 | 2069.0 | 267.1 | 12.9% | 2082.3 | 280.4 | 13.5% |
| B | 1875.5 | 2109.1 | 230.6 | 10.9% | 2112.6 | 234.1 | 11.1% |
| C | 1904.5 | 2145.0 | 240.5 | 11.2% | 2149.9 | 245.4 | 11.4% |
| Average Moisture Content | | | | 11.7% | | | 12.0% |

TABLE 36

Board Expansion ¾ inch thick SCP panel (dimensions in inches)

| Specimen | Width 1 | Width 2 | Thick 1 | Thick 2 | Thick 3 | Thick 4 |
|---|---|---|---|---|---|---|
| A - Before Soak | 12.146 | 11.907 | 0.717 | 0.715 | 0.697 | 0.704 |
| A - After Soak | 12.146 | 11.907 | 0.717 | 0.715 | 0.697 | 0.704 |
| Difference | 0.000 | 0.000 | 0.000 | 0.000 | 0.000 | 0.000 |
| B - Before Soak | 12.072 | 11.940 | 0.710 | 0.740 | 0.732 | 0.715 |
| B - After Soak | 12.072 | 11.940 | 0.710 | 0.740 | 0.732 | 0.715 |
| Difference | 0.000 | 0.000 | 0.000 | 0.000 | 0.000 | 0.000 |
| C - Before Soak | 12.065 | 11.970 | 0.755 | 0.740 | 0.730 | 0.750 |
| C - After Soak | 12.065 | 11.970 | 0.755 | 0.740 | 0.730 | 0.750 |
| Difference | 0.000 | 0.000 | 0.000 | 0.000 | 0.000 | 0.000 |

Example 8

To determine the shear strength and shear stiffness of a floor diaphragm assembly using steel framing and SCP sheathing a test according to the AISI TS-7-02 Cantilever Test Method for Cold-Formed Steel Diaphragms was performed on ten (10) specimens. This data can be indicative of shear performance as a shear wall.

FIG. 24 shows a floor framing 400 used in the AISI TS-7 tests.

Floor Diaphragm Materials

Prototype ¾" SCP—Structural Cement Panel reinforced with fiberglass strands. A "V"-groove and tongue is located along the 8' dimension of the 4'×8' sheets.

¾" Plywood—²³⁄₃₂" GP Plus, Tongue and Groove (Quick Fit). APA Rated Sturd-I-Floor™, Exposure 1, PS1-95 Underlayment, Sanded Face, PRP-108 and manufactured by Georgia Pacific Corporation.

Fasteners—#8-18×1⅝" 1 g., winged driller Bugle head Grabber Super Drive ™ (Lox drive) screws, Item No. CHS8158JBW spaced 4", 6" and 12" o.c. along the perimeter, and 12" o.c. in the field of the panels. All fasteners were placed a minimum of ¾" in from panel edges and ½" in from seams. At panel corners the fasteners were inset 2".

Adhesive—PL Polyurethane Premium Construction Adhesive, manufactured by OSI Sealants. A ¼" bead was applied to all framing members with a double bead applied at panel butt-joints. A minimum of 24 hours of cure time was provided prior to any loading.

Floor Framing

Joists—16 ga.×10" deep×10' long Trade Ready™ Joists manufactured by Dietrich Industries. The joists were stamped Dietrich TDJ5 W 9¼IN×L 11 FT 10½IN 14453223 16 GAUGE G60 50 KSI. The average tested yield strength was 51.0 ksi.

Rim Track—16 ga.×10³⁄₁₆" deep×16' long with pre-bent joist attachment locations spaced at 24" o.c. The track was stamped Dietrich D16 W 9¼IN×L 16 FT 14453203 16 GAUGE G60. The average tested yield strength was 62.7 ksi.

Fasteners—#10-16×¾" long hex-head, Drivall screws.

Test Specimen Construction

Ten (10) test samples were constructed to an overall dimension of 11'-11"×12'-0". The rim track had the prebent tabs at 16" o.c. so, clip angles were welded at the 24" o.c. spacing.

The joists were attached to the track using three (3) hex-head #10-16×¾" 1 g. Drivall screws into the side of the joist through the pre-bent tab. A Simpson Strong-Tie Holdown Part No. S/HD15 was fastened to the Tension side of the floor using 48-#10×¾" 1 g. hex-head self-drilling screws. A 6⅛"×16" 1 g., 12 ga stud was attached to the compression joist using (14)—#10×¾" long hex-head self-drilling screws. This was added as a stiffener to avoid crushing the end joist prior to diaphragm failure. The frame was squared and then the prototype SCP or plywood was fastened to it. The floor sheathing was fastened at 4", 6" or 12" o.c. around the perimeter inset 2" from the corners, and 12" o.c. in the field with #8-18×1⅝" 1 g. Bugle head Grabber Super Drive™ screws. Care was taken to ensure that the fasteners were kept flush or slightly below the surface of the floor sheathing and also did not strip out in the steel framing. See attached drawings no. B6-B11 for details. The test samples using adhesive were allowed to set for a minimum of 24 hours to provide the recommended adhesive to cure.

FIG. 25 shows one of the SCP Floors 420 used in the AISI TS-7 tests with adhesive placement. The boards 442 were SCP panels having 0.670 inch-0.705 inch thickness. View EE shows offset panels at a joint. View FF shows "V"-shaped ½ inch tongue and groove joint. View GG shows a corner. View HH shows where three SCP panels meet. View II shows a corner.

Test Set-Up

Figure 26:
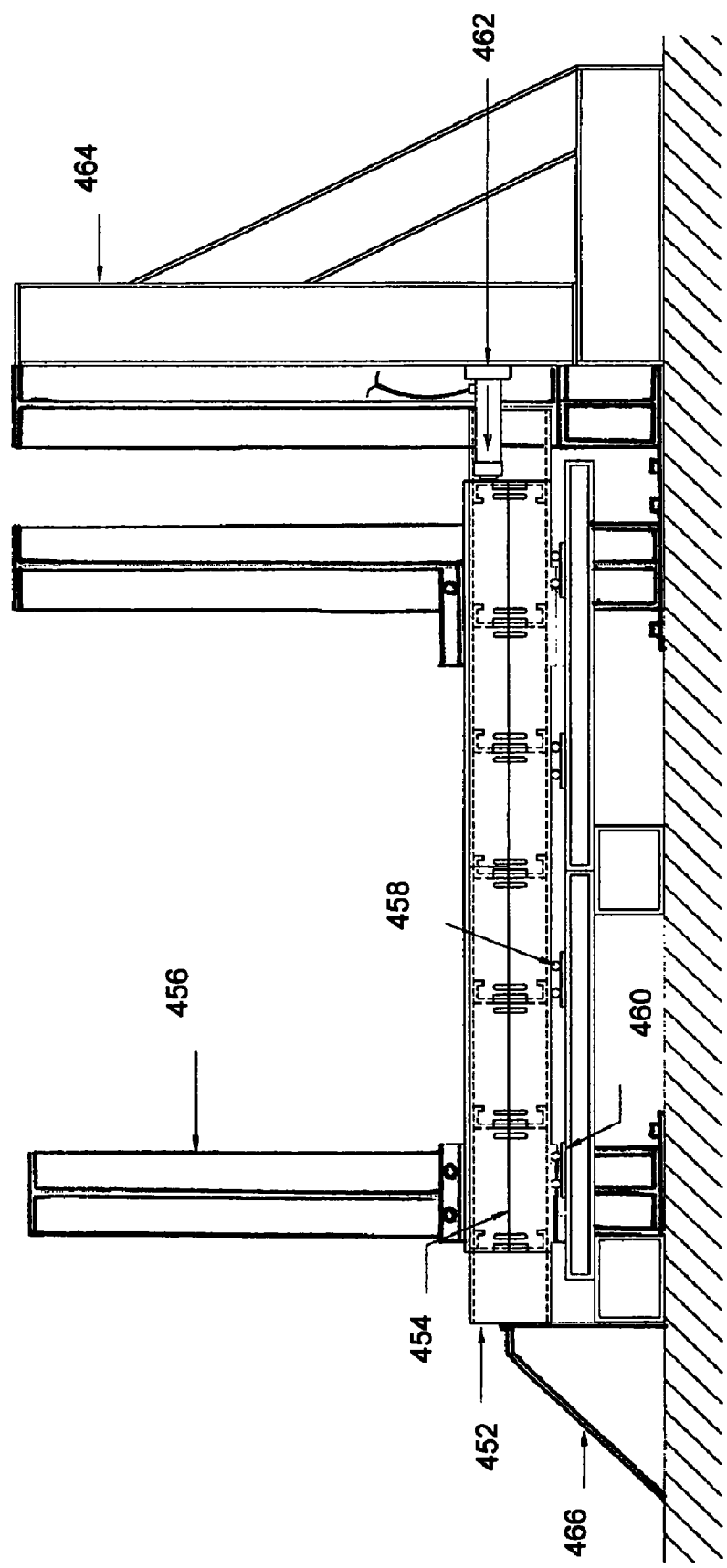
FIG. 26 shows the testing apparatus used in the AISI TS-7 tests.

FIG. 26 shows the testing apparatus 450 used in the AISI TS-7 tests. Test apparatus 450 has two 8 inch×72 inch long loading beams 454. A test specimen 452 is placed on 1 inch rollers 458 a steel plate 460 is provided under the rollers 458. A rigid bearing 466 and test fixture 456 and I-beam fixture are also provided. A hydraulic cylinder 462 applies pressure to the test specimen 452.

The test sample was positioned in the test fixture with one of the rim tracks set flush to the top of a 10"-30 lb./ft. C-channel. The rim track was then attached to the C-channel using a #12-24, T5 hex head screws spaced 12" o.c. Two (2) 8"×72" long I-beams were then attached to the other rim track, flush to the top, using #10×¾" long hex-head self-drilling screws. The fasteners were set 6" o.c. alternating sides of the I-beam flange. The I-beams were also bolted together. A hydraulic cylinder was positioned on a reaction beam in-line with the I-beams.

1" diameter threaded rod was placed thru the Simpson Holdown and connected to the rigid steel fixture. No specific torque was applied to the coupling nuts on the threaded rod. The rim track on the load side was positioned on double sets of rollers spaced approximately 48" apart. A hold down was placed over the sheathing on the compression side to prevent uplift. Two (2) 1" diameter rollers were placed between the hold down tube and a steel plate on the floor sheathing.

Four (4) Linear transducers were placed on floor diaphragms assembly in the following locations:

1—In-line with the Tension Joist,

2—In-line with the fixed rim track,

3—In-line with the loaded rim track on a clip angle, and

4—In-line with the Compression Joist.

The Linear transducers and hydraulic pressure transducer were connected to a data acquisition system.

Test Equipment

Four (4) Linear transducers were placed on floor diaphragms assembly in the following locations:

One (1) ENERPAC Model P-39 hydraulic hand pumps.

Three (3) EnerPac Model RC-1010 hydraulic cylinders.

Four (4) Linear transducers.

Five (5) rigid bearings bolted to floor.

One (1) C10×30 rigid channel bolted to three (3) of the bearings.
One (1) Omega digital meter.
One (1) Omega pressure transducer.
Two (2) 6 ft. I-beams.

Procedure

The loads were generated using a hydraulic cylinder, at the load point. The applied forces were measured with data acquisition equipment, and a pressure transducer. A permanent record of the applied forces was made on the attached data sheets. The loads were generated by applying hydraulic pressure to create mechanical force until the required load was indicated on the digital meter. The entire floor assembly was loaded in at a constant rate until no further gain in load could be attained.

Test Results

TABLE 37 summarizes the test results.

TABLE 37

Summary of Tests Nos. 1-10
Specimen: ¾" Prototype SCP (T&G) fastened to 16 ga. Steel Joists, set 24" o.c., with #8 × 1⅝" screws with various spacing around the perimeter and 12" o.c. in the field. The rows defined in the failure descriptions are #1-#3 with #1 the load side and Spacing Field. See FIGS. 27-30 for details.

| Test No. | Fastener Perimeter | Spacing Field | Adhesive to Framing | Sn Shear Strength (plf) | G' Shear Stiffness (plf) |
|---|---|---|---|---|---|
| 1 | 4" | 12" | No | 623.9 | 241,328 |
| 2 | | | | 637.9 | 178,433 |
| 3 | | | | 783.3 | 147,670 |
| 4 | 6" | 12" | No | 699.0 | 202,407 |
| 5 | | | | 544.8 | 121,526 |
| 6 | | | | 711.4 | 107,653 |
| 10 Plywood | | | | 527.9 | 78,880 |
| 7 | 4" | 12" | Yes | 1886.0 | 581,716 |
| 8 | 6" | | | 1612.5 | 803,716 |
| 9 | 12" | | | 1327.0 | 432,444 |

Figure 27:
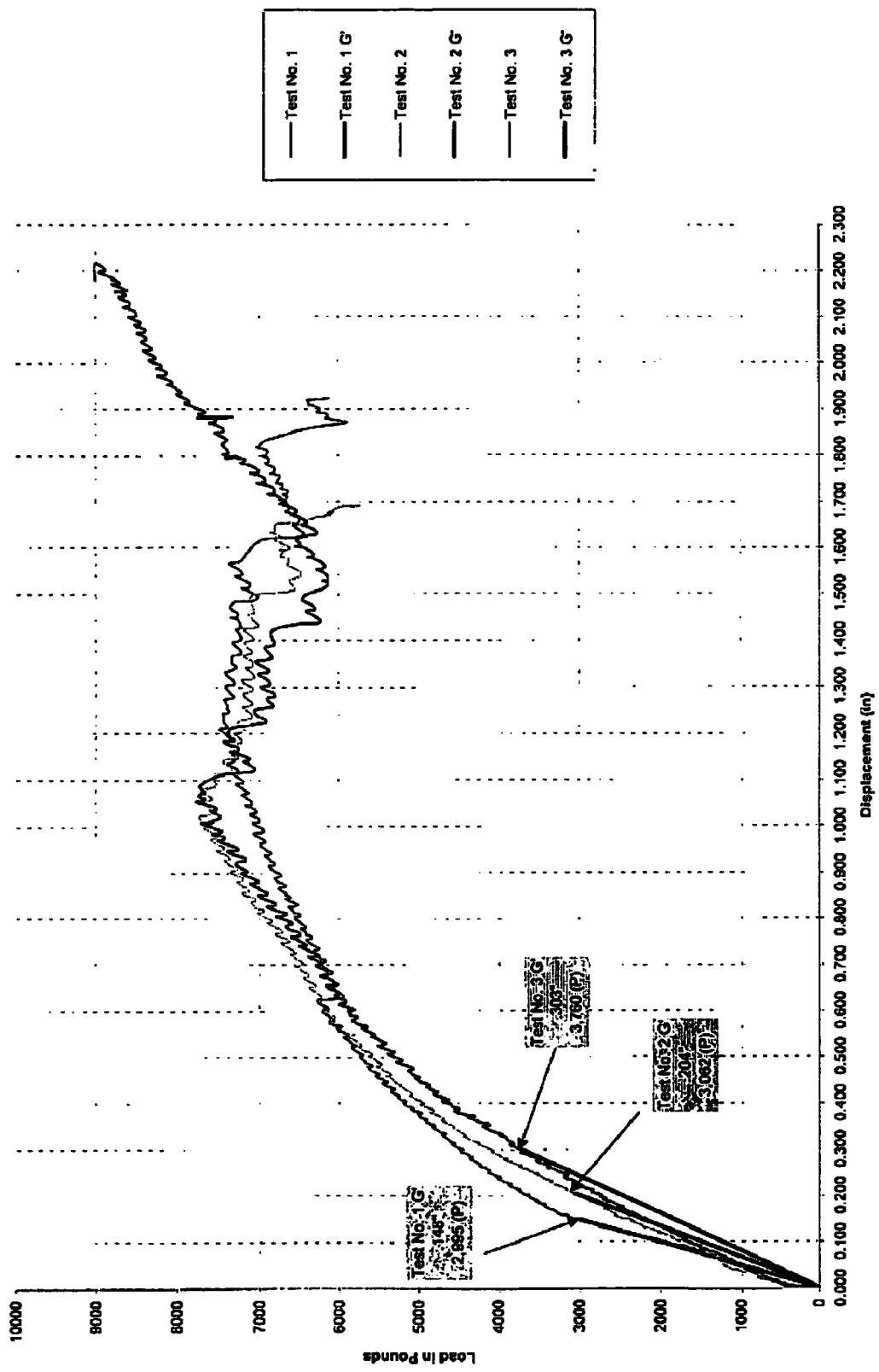
FIG. 27 shows data from AISI TS-7 Cantilever Floor Diaphragm test using ¾ inch SCP panel with a 4 inch-12 inch fastening schedule.
Figure 28:
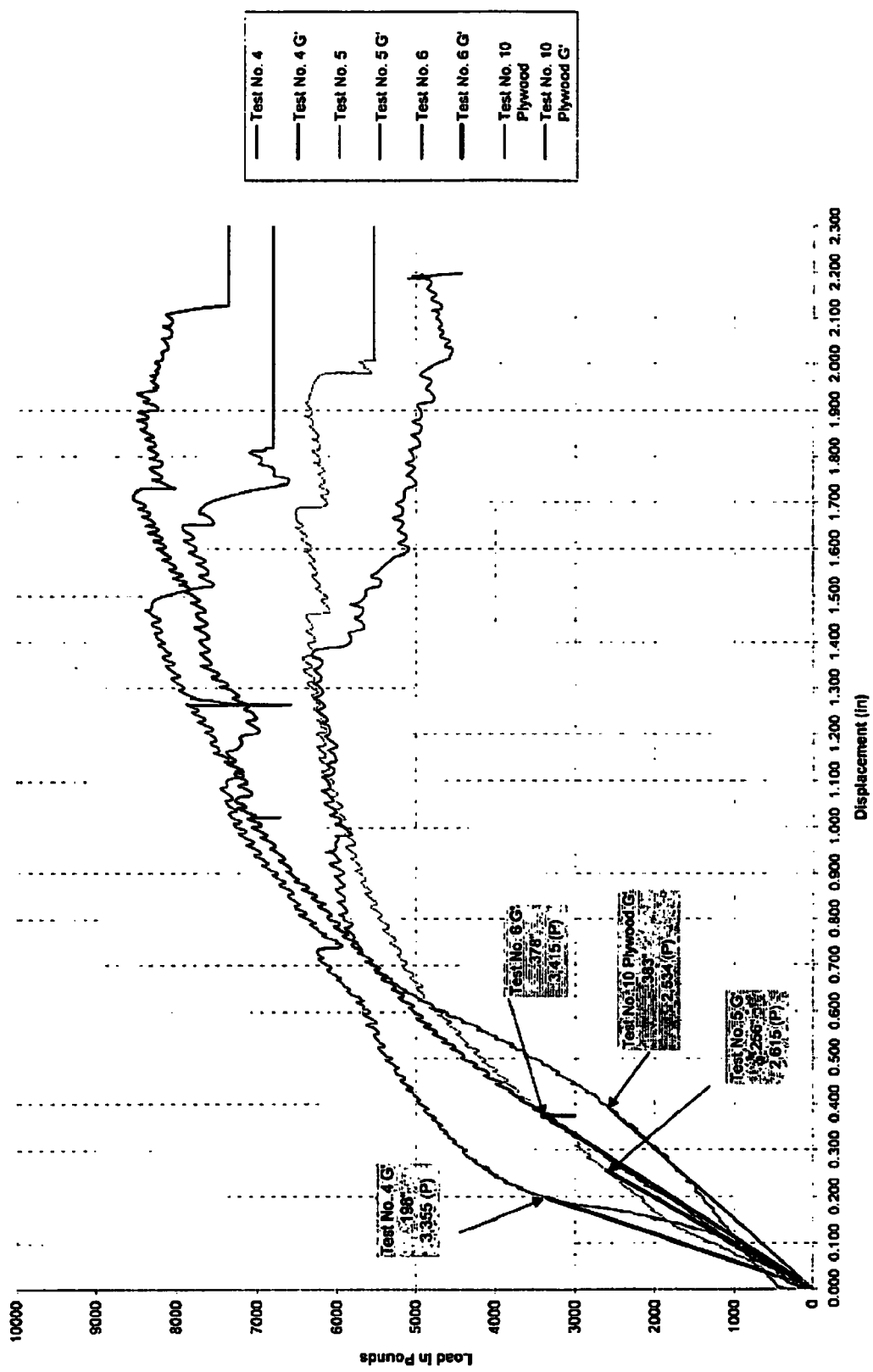
FIG. 28 shows data from AISI TS-7 Cantilever Floor Diaphragm test using ¾ inch SCP panel compared to ¾ inch plywood with a 6 inch-12 inch fastening schedule.
Figure 29:
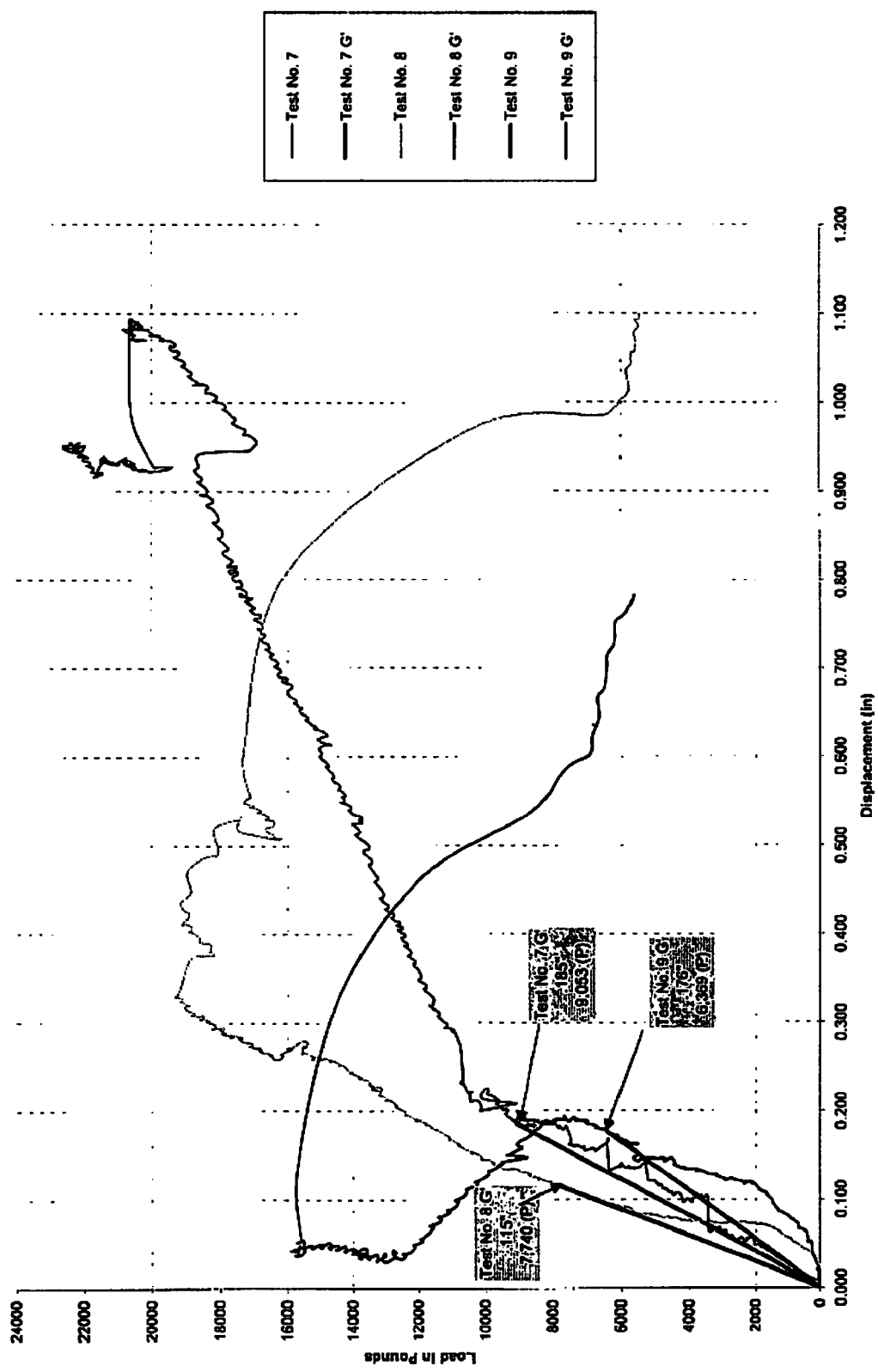
FIG. 29 shows data from AISI TS-7 Cantilever Floor Diaphragm test using ¾ inch SCP panel with adhesive.

FIGS. 27-29 show Load in Pounds v. Displacement data used to generate the values in TABLE 43. In particular, FIG. 27 shows data from AISI TS-7 Cantilever Floor Diaphragm test using ¾ inch SCP panel with a 4 inch-12 inch fastening schedule. FIG. 28 shows data from AISI TS-7 Cantilever Floor Diaphragm test using ¾ inch SCP panel compared to ¾ inch plywood with a 6 inch-12 inch fastening schedule. FIG. 29 shows data from AISI TS-7 Cantilever Floor Diaphragm test using ¾ inch SCP panel with adhesive.

TABLES 38-47 show in table form the data of FIGS. 24, 25 and 26 for Test LP 804-3-0.001 inch increments.

TABLE 38

Test No. 1: Specimen: ¾" SCP (T&G) fastened to 16 ga. Steel Joists, set 24" o.c., with #8 × 1⅝" screws spaced 4" o.c. around the perimeter and 12" o.c. in the field.
Test Conditions: 70° F.; 41% Relative Humidity
Diaphragm Width 143 inches; Diaphragm Length 144 inches;
Load Time (min:sec): 7:46

| Load in Pounds | Deflection in Inches-Indicator Number | | | | Net Shear |
|---|---|---|---|---|---|
| (lbf) | 1 | 2 | 3 | 4 | Deflection |
| 0 | 0.000 | 0.000 | 0.000 | 0.000 | 0.000 |
| 214 | 0.001 | −0.001 | 0.015 | 0.012 | 0.003 |
| 500 | 0.001 | −0.003 | 0.041 | 0.032 | 0.012 |
| 723 | 0.002 | −0.004 | 0.061 | 0.043 | 0.019 |
| 982 | 0.004 | −0.006 | 0.089 | 0.046 | 0.045 |
| 1205 | 0.005 | −0.006 | 0.109 | 0.049 | 0.061 |
| 1481 | 0.007 | −0.007 | 0.132 | 0.052 | 0.080 |
| 1704 | 0.008 | −0.007 | 0.147 | 0.055 | 0.091 |
| 1945 | 0.009 | −0.006 | 0.159 | 0.057 | 0.099 |

TABLE 38-continued

Test No. 1: Specimen: ¾" SCP (T&G) fastened to 16 ga. Steel Joists, set 24" o.c., with #8 × 1⅝" screws spaced 4" o.c. around the perimeter and 12" o.c. in the field.
Test Conditions: 70° F.; 41% Relative Humidity
Diaphragm Width 143 inches; Diaphragm Length 144 inches;
Load Time (min:sec): 7:46

| Load in Pounds | Deflection in Inches-Indicator Number | | | | Net Shear |
|---|---|---|---|---|---|
| (lbf) | 1 | 2 | 3 | 4 | Deflection |
| 2204 | 0.011 | −0.004 | 0.180 | 0.061 | 0.113 |
| 2489 | 0.012 | −0.003 | 0.194 | 0.063 | 0.122 |
| 2739 | 0.013 | 0.000 | 0.211 | 0.066 | 0.131 |
| 2980 | 0.015 | 0.004 | 0.237 | 0.070 | 0.148 |
| 3230 | 0.017 | 0.008 | 0.259 | 0.074 | 0.160 |
| 3498 | 0.018 | 0.013 | 0.295 | 0.079 | 0.185 |
| 3739 | 0.020 | 0.016 | 0.328 | 0.083 | 0.210 |
| 3997 | 0.022 | 0.020 | 0.365 | 0.087 | 0.237 |
| 4229 | 0.023 | 0.023 | 0.407 | 0.093 | 0.269 |
| 4488 | 0.025 | 0.025 | 0.445 | 0.096 | 0.299 |
| 4729 | 0.027 | 0.029 | 0.493 | 0.100 | 0.338 |
| 4961 | 0.028 | 0.033 | 0.531 | 0.104 | 0.367 |
| 5247 | 0.030 | 0.044 | 0.600 | 0.109 | 0.418 |
| 5461 | 0.031 | 0.050 | 0.645 | 0.112 | 0.452 |
| 5746 | 0.033 | 0.054 | 0.710 | 0.115 | 0.509 |
| 5987 | 0.035 | 0.059 | 0.768 | 0.119 | 0.556 |
| 2,995 (P) | 0.015 | 0.004 | 0.237 | 0.070 | 0.148 |

Ultimate Load (Pn) = 7,486 lbs.;
P = 0.4(Pn) = 2,995 lbs.
Shear Strength (Sn) = 623.9;
Shear Stiffness (G') = 241,328 plf Failure: SCP failure on row #2 on the compression side around the screws. Both T&G edges shifted due to screw shear and rotation into the SCP (typically limited to the fasteners at or within 12" of the T&G). SCP corner break on row #1 on the tension side at the T&G location. Corner Break on all, but two, of row number 2 panels. Row #3 corner break at compression side T and G location

TABLE 39

Test No. 2: Specimen: ¾" SCP (T&G) fastened to 16 ga. Steel Joists, set 24" o.c., with #8 × 1⅝" screws spaced 4" o.c. around the perimeter and 12" o.c. in the field.
Test Conditions: 67° F.; 45% Relative Humidity
Diaphragm Width 143 inches; Diaphragm Length 144 inches;
Load Time (min:sec): 10:11

| Load in Pounds | Deflection in Inches-Indicator Number | | | | |
|---|---|---|---|---|---|
| (lbf) | 1 | 2 | 3 | 4 | Net Shear Deflection |
| 0 | .000 | .000 | .000 | .000 | 0.000 |
| 232 | .002 | .003 | .051 | .047 | −0.001 |
| 500 | .003 | .009 | .134 | .114 | 0.009 |
| 732 | .005 | .012 | .171 | .129 | 0.027 |
| 991 | .006 | .015 | .187 | .132 | 0.036 |
| 1196 | .007 | .019 | .212 | .136 | 0.051 |
| 1472 | .008 | .025 | .253 | .138 | 0.083 |
| 1722 | .009 | .032 | .284 | .142 | 0.103 |
| 1981 | .010 | .039 | .312 | .145 | 0.119 |
| 2222 | .012 | .046 | .342 | .150 | 0.136 |
| 2480 | .013 | .053 | .370 | .153 | 0.152 |
| 2739 | .015 | .061 | .410 | .157 | 0.179 |
| 2989 | .016 | .067 | .446 | .161 | 0.203 |
| 3167 | .016 | .073 | .469 | .163 | 0.217 |
| 3471 | .018 | .080 | .506 | .167 | 0.242 |
| 3702 | .019 | .084 | .530 | .170 | 0.258 |
| 3988 | .021 | .090 | .572 | .175 | 0.289 |
| 4238 | .022 | .094 | .604 | .177 | 0.312 |
| 4479 | .023 | .099 | .639 | .179 | 0.340 |
| 4684 | .024 | .103 | .668 | .182 | 0.361 |
| 4987 | .026 | .109 | .725 | .184 | 0.407 |
| 5219 | .027 | .113 | .761 | .188 | 0.435 |
| 5478 | .028 | .118 | .812 | .191 | 0.476 |
| 5745 | .029 | .122 | .870 | .197 | 0.523 |

TABLE 39-continued

Test No. 2: Specimen: ¾" SCP (T&G) fastened to 16 ga. Steel
Joists, set 24" o.c., with #8 × 1⅝" screws spaced
4" o.c. around the perimeter and 12" o.c. in the field.
Test Conditions: 67° F.; 45% Relative Humidity
Diaphragm Width 143 inches; Diaphragm Length 144 inches;
Load Time (min:sec): 10:11

| Load in Pounds | Deflection in Inches-Indicator Number | | | | Net Shear Deflection |
|---|---|---|---|---|---|
| (lbf) | 1 | 2 | 3 | 4 | |
| 5950 | .031 | .127 | .928 | .201 | 0.570 |
| 3,062 (P) | .016 | .069 | .450 | .162 | 0.204 |

Ultimate Load (Pn) = 7,655 lbs.;
P = 0.4(Pn) = 3,062 lbs.
Shear Strength (Sn) = 637.9;
Shear Stiffness (G') = 178,433 plf
Failure: SCP failure on row #2 on the compression side around the screws. Both T&G edges shifted due to screw shear and rotation into the SCP (typically limited to the fasteners at or within 12" of the T&G). SCP corner break on row #1 on the tension side at the T&G location. Corner Break on row #2 and Row #3 at the compression side T & G location.

TABLE 40

Test No. 3: Specimen: ¾" SCP (T&G) fastened to 16 ga. Steel Joists,
set 24" o.c., with #8 × 1⅝" screws spaced 4" o.c. around
the perimeter and 12" o.c. in the field.
Test Conditions: 67° F.; 45% Relative Humidity
Diaphragm Width 143 inches; Diaphragm Length 144 inches;
Load Time (min:sec): 7:58

| Load in Pounds (lbf) | Deflection in Inches-Indicator Number | | | | Net Shear Deflection |
|---|---|---|---|---|---|
| | 1 | 2 | 3 | 4 | |
| 0 | .000 | .000 | .000 | .000 | .000 |
| 232 | .001 | .007 | .069 | .059 | .002 |
| 499 | .003 | .012 | .115 | .090 | .010 |
| 749 | .005 | .018 | .152 | .096 | .033 |
| 972 | .005 | .023 | .174 | .100 | .047 |
| 1240 | .007 | .030 | .210 | .104 | .070 |
| 1489 | .009 | .038 | .238 | .106 | .086 |
| 1703 | .010 | .044 | .270 | .108 | .109 |
| 1980 | .011 | .052 | .302 | .109 | .131 |
| 2194 | .012 | .058 | .331 | .111 | .151 |
| 2471 | .013 | .064 | .365 | .112 | .177 |
| 2729 | .014 | .068 | .391 | .113 | .196 |
| 2979 | .016 | .074 | .425 | .114 | .223 |
| 3247 | .017 | .080 | .464 | .116 | .252 |
| 3416 | .019 | .083 | .486 | .117 | .268 |
| 3737 | .020 | .089 | .531 | .119 | .303 |
| 3960 | .021 | .092 | .562 | .121 | .330 |
| 4228 | .024 | .096 | .601 | .123 | .359 |
| 4442 | .025 | .100 | .628 | .127 | .378 |
| 4728 | .026 | .106 | .675 | .130 | .415 |
| 4968 | .027 | .108 | .711 | .131 | .446 |
| 5236 | .029 | .111 | .773 | .137 | .497 |
| 5495 | .030 | .115 | .821 | .139 | .538 |
| 5655 | .031 | .118 | .856 | .140 | .568 |
| 5932 | .033 | .119 | .902 | .143 | .608 |
| 3,760 (P) | .020 | .089 | .531 | .119 | .303 |

Ultimate Load (Pn) = 9,399 lbs.;
P = 0.4(Pn) = 3,760 lbs.
Shear Strength (Sn) = 783.9;
Shear Stiffness (G') = 147,670 plf
Failure: SCP failure on row #2 on the compression side around the screws. Both T&G edges shifted due to screw shear and rotation into the SCP (typically limited to the fasteners at or within 12" of the T&G). SCP corner break on row #1 on the tension side at the T&G location. Butt-Joint separation on row #2 with SCP failure around the fasteners.

TABLE 41

Test No. 4: Specimen: ¾" SCP (T&G) fastened to 16 ga. Steel Joists,
set 24" o.c., with #8 × 1⅝" screws spaced 6" o.c. around
the perimeter and 12" o.c. in the field.
Test Conditions: 70° F.; 41% Relative Humidity
Diaphragm Width 143 inches; Diaphragm Length 144 inches;
Load Time (min:sec): 7:12

| Load in Pounds (lbf) | Deflection in Inches-Indicator Number | | | | Net Shear Deflection |
|---|---|---|---|---|---|
| | 1 | 2 | 3 | 4 | |
| 0 | .000 | .000 | .000 | .000 | .000 |
| 232 | .000 | .003 | .038 | .016 | .019 |
| 473 | .001 | .006 | .075 | .023 | .046 |
| 714 | .002 | .008 | .111 | .028 | .073 |
| 982 | .004 | .011 | .146 | .032 | .098 |
| 1231 | .005 | .015 | .174 | .036 | .118 |
| 1499 | .007 | .018 | .196 | .041 | .131 |
| 1749 | .008 | .022 | .217 | .045 | .144 |
| 1981 | .009 | .025 | .234 | .050 | .151 |
| 2249 | .012 | .032 | .261 | .057 | .162 |
| 2481 | .012 | .035 | .277 | .059 | .171 |
| 2668 | .013 | .040 | .294 | .064 | .177 |
| 2998 | .015 | .047 | .313 | .066 | .184 |
| 3230 | .016 | .051 | .328 | .070 | .191 |
| 3498 | .017 | .056 | .348 | .070 | .205 |
| 3730 | .019 | .061 | .377 | .073 | .224 |
| 3980 | .020 | .067 | .411 | .076 | .248 |
| 4229 | .022 | .072 | .444 | .079 | .272 |
| 4488 | .023 | .079 | .498 | .083 | .314 |
| 4747 | .023 | .083 | .553 | .085 | .364 |
| 4997 | .025 | .088 | .617 | .088 | .417 |
| 5238 | .026 | .092 | .672 | .090 | .465 |
| 5470 | .028 | .095 | .751 | .093 | .536 |
| 5720 | .029 | .100 | .858 | .097 | .633 |
| 5987 | .030 | .104 | .900 | .098 | .669 |
| 3,355 (P) | .017 | .053 | .337 | .070 | .198 |

Ultimate Load (Pn) = 8,387 lbs.;
P = 0.4(Pn) = 3,355 lbs.
Shear Strength (Sn) = 699.0;
Shear Stiffness (G') = 202,407 plf
Failure: All butt-joints separated with SCP failure around the fasteners. Fastener shear and rotation into the SCP along both T&G edges (typically limited to the fasteners at or within 12" of the T&G). SCP failure around fasteners on Row #2 at the compression side. SCP corner breaks along both T&G edges.

TABLE 42

Test No. 5: Specimen: ¾" SCP (T&G) fastened to 16 ga. Steel Joists,
set 24" o.c., with #8 × 1⅝" screws spaced 6" o.c. around
the perimeter and 12" o.c. in the field.
Test Conditions: 70° F.; 38% Relative Humidity
Diaphragm Width 143 inches; Diaphragm Length 144 inches;
Load Time (min:sec): 5:28

| Load in Pounds (lbf) | Deflection in Inches-Indicator Number | | | | Net Shear Deflection |
|---|---|---|---|---|---|
| | 1 | 2 | 3 | 4 | |
| 0 | .000 | .000 | .000 | .000 | .000 |
| 249 | .001 | .001 | .016 | .001 | .013 |
| 490 | .001 | .001 | .039 | .005 | .032 |
| 748 | .002 | .000 | .067 | .011 | .054 |
| 980 | .004 | .000 | .093 | .016 | .073 |
| 1239 | .006 | .000 | .127 | .023 | .098 |
| 1471 | .008 | .000 | .148 | .028 | .113 |
| 1721 | .009 | .000 | .173 | .032 | .134 |
| 1997 | .011 | −.001 | .212 | .036 | .167 |
| 2184 | .012 | −.001 | .250 | .042 | .199 |
| 2416 | .012 | −.001 | .278 | .044 | .225 |
| 2746 | .014 | −.001 | .336 | .047 | .276 |
| 2961 | .015 | −.002 | .378 | .049 | .316 |
| 3237 | .015 | −.002 | .420 | .052 | .354 |
| 3487 | .017 | −.002 | .463 | .056 | .391 |

TABLE 42-continued

Test No. 5: Specimen: ¾" SCP (T&G) fastened to 16 ga. Steel Joists, set 24" o.c., with #8 × 1⅝" screws spaced 6" o.c. around the perimeter and 12" o.c. in the field.
Test Conditions: 70° F.; 38% Relative Humidity
Diaphragm Width 143 inches; Diaphragm Length 144 inches;
Load Time (min:sec): 5:28

| Load in | Deflection in Inches-Indicator Number | | | | Net Shear |
|---|---|---|---|---|---|
| Pounds (lbf) | 1 | 2 | 3 | 4 | Deflection |
| 3746 | .019 | −.003 | .508 | .060 | .433 |
| 3978 | .021 | −.004 | .553 | .063 | .474 |
| 4209 | .022 | −.004 | .587 | .065 | .505 |
| 4477 | .022 | −.004 | .640 | .070 | .553 |
| 4718 | .025 | −.005 | .681 | .072 | .590 |
| 4977 | .026 | .001 | .767 | .078 | .622 |
| 5209 | .027 | .007 | .850 | .081 | .736 |
| 5494 | .029 | .012 | .928 | .084 | .804 |
| 2,615 (P) | .013 | −.001 | .314 | .045 | .256 |

Ultimate Load (Pn) = 6,538 lbs.;
P = 0.4(Pn) = 2,615 lbs.
Shear Strength (Sn) = 544.8 plf;
Shear Stiffness (G') = 121,526 plf
Failure: Row #3 butt-joint separation with SCP failure around the fasteners. Fastener shear and rotation into the SCP along Row #1-2 T&G edge (typically limited to the fasteners at or within 12" of the T&G). SCP failure around fasteners on Row #2 at the compression side. SCP corner breaks along both T&G edges.

TABLE 43

Test No. 6 Specimen: ¾" SCP (T&G) fastened to 16 ga. Steel Joists, set 24" o.c., with #8 × 1⅝" screws spaced 6" o.c. around the perimeter and 12" o.c. in the field.
Test Conditions: 70° F.; 38% Relative Humidity
Diaphragm Width 143 inches; Diaphragm Length 144 inches;
Load Time (min:sec): 6:02

| Load in | Deflection in Inches-Indicator Number | | | | Net Shear |
|---|---|---|---|---|---|
| Pounds (lbf) | 1 | 2 | 3 | 4 | Deflection |
| 0 | .000 | .000 | .000 | .000 | .000 |
| 223 | .001 | .003 | .023 | .011 | .008 |
| 482 | .003 | .011 | .066 | .011 | .042 |
| 749 | .003 | .020 | .099 | .011 | .066 |
| 999 | .004 | .027 | .135 | .011 | .094 |
| 1240 | .005 | .037 | .180 | .011 | .128 |
| 1499 | .007 | .045 | .220 | .011 | .157 |
| 1749 | .009 | .053 | .263 | .011 | .190 |
| 1972 | .010 | .062 | .298 | .011 | .216 |
| 2239 | .012 | .072 | .339 | .011 | .244 |
| 2480 | .013 | .079 | .375 | .011 | .272 |
| 2748 | .014 | .087 | .411 | .011 | .299 |
| 2988 | .017 | .096 | .453 | .011 | .330 |
| 3203 | .018 | .103 | .489 | .011 | .357 |
| 3479 | .019 | .111 | .532 | .011 | .391 |
| 3702 | .021 | .117 | .563 | .011 | .414 |
| 3997 | .022 | .125 | .608 | .011 | .451 |
| 4237 | .023 | .131 | .650 | .011 | .486 |
| 4469 | .025 | .135 | .685 | .011 | .514 |
| 4701 | .026 | .142 | .724 | .011 | .546 |
| 4951 | .027 | .148 | .778 | .011 | .593 |
| 5236 | .029 | .154 | .837 | .011 | .643 |
| 5477 | .030 | .158 | .885 | .011 | .687 |
| 5700 | .032 | .164 | .941 | .011 | .735 |

TABLE 43-continued

Test No. 6 Specimen: ¾" SCP (T&G) fastened to 16 ga. Steel Joists, set 24" o.c., with #8 × 1⅝" screws spaced 6" o.c. around the perimeter and 12" o.c. in the field.
Test Conditions: 70° F.; 38% Relative Humidity
Diaphragm Width 143 inches; Diaphragm Length 144 inches;
Load Time (min:sec): 6:02

| Load in | Deflection in Inches-Indicator Number | | | | Net Shear |
|---|---|---|---|---|---|
| Pounds (lbf) | 1 | 2 | 3 | 4 | Deflection |
| 5941 | .033 | .167 | .985 | .011 | .775 |
| 3,415 (P) | .019 | .108 | .515 | .011 | .378 |

Ultimate Load (Pn) = 8,537 lbs.;
P = 0.4(Pn) = 3,415 lbs.
Shear Strength (Sn) = 711.4 plf;
Shear Stiffness (G') = 107,653 plf
Failure: Row #2&3 butt-joint separation with SCP failure around the fasteners. Fastener shear and rotation into the SCP along Row #2-3 T&G edge 8' in from compression and the remaining 4' shifted along Row #1-2 T&G edge (typically limited to the fasteners at or within 12" of the T&G). SCP failure around fasteners on Row #2&3 at the compression side. SCP corner breaks along both T&G edges.

TABLE 44

Test No. 7: Specimen: ¾" SCP (T&G) fastened to 16 ga. Steel Joists, set 24" o.c., with #8 × 1⅝" screws spaced 4" o.c. around the perimeter and 12" o.c. in the field.
Test Conditions: 69° F.; 44% Relative Humidity
Diaphragm Width 143 inches; Diaphragm Length 144 inches;
Load Time (min:sec): 10:14

| Load in | Deflection in Inches-Indicator Number | | | | Net Shear |
|---|---|---|---|---|---|
| Pounds (lbf) | 1 | 2 | 3 | 4 | Deflection |
| 0 | .000 | .000 | .000 | .000 | .000 |
| 446 | .000 | .004 | .028 | .010 | .014 |
| 981 | −.001 | .008 | .049 | .016 | .026 |
| 1472 | −.002 | .014 | .068 | .019 | .037 |
| 1980 | −.004 | .019 | .086 | .022 | .049 |
| 2480 | −.002 | .025 | .103 | .024 | .057 |
| 2962 | −.001 | .028 | .119 | .027 | .065 |
| 3497 | .001 | .032 | .169 | .030 | .106 |
| 3987 | .004 | .040 | .178 | .035 | .100 |
| 4478 | .005 | .046 | .196 | .040 | .105 |
| 4978 | .008 | .052 | .226 | .046 | .119 |
| 5459 | .011 | .060 | .259 | .052 | .137 |
| 5995 | .013 | .066 | .276 | .056 | .141 |
| 6414 | .015 | .071 | .314 | .063 | .165 |
| 6985 | .018 | .077 | .322 | .070 | .158 |
| 7466 | .021 | .083 | .342 | .076 | .163 |
| 7957 | .025 | .088 | .383 | .085 | .187 |
| 8483 | .027 | .094 | .403 | .093 | .190 |
| 8956 | .040 | .109 | .506 | .172 | .186 |
| 9483 | .044 | .113 | .544 | .185 | .204 |
| 9920 | .053 | .158 | .597 | .185 | .203 |
| 10401 | .057 | .160 | .623 | .185 | .224 |
| 10919 | .063 | .164 | .702 | .185 | .293 |
| 11400 | .068 | .169 | .734 | .185 | .314 |
| 11909 | .073 | .172 | .774 | .185 | .346 |
| 9,053 (P) | .040 | .109 | .507 | .174 | .185 |

Ultimate Load (Pn) = 22,631 lbs.;
P = 0.4(Pn) = 9,053 lbs.
Shear Strength (Sn) = 1,886.0 plf;
Shear Stiffness (G') = 581,716 plf
Failure: Adhesion failure to SCP along bearing side of the floor (Row #3) near the tension side. Fastener pull-through along the same edge. The tension joist was severely deformed around the Simpson Strong-Tie connection.

TABLE 45

Test No. 8: Specimen: ¾" SCP (T&G) fastened to 16 ga. Steel Joists, set 24" o.c., with #8 × 1⅝" screws spaced 6" o.c. around the perimeter and 12" in the field.
Test Conditions: 73° F.; 45% Relative Humidity
Diaphragm Width 143 inches; Diaphragm Length 144 inches;
Load Time (min:sec): 5:45

| Load in Pounds (lbf) | Deflection in Inches-Indicator Number | | | | Net Shear Deflection |
|---|---|---|---|---|---|
| | 1 | 2 | 3 | 4 | |
| 0 | .000 | .000 | .000 | .000 | .000 |
| 421 | .010 | .013 | .074 | .008 | .043 |
| 992 | .016 | .025 | .118 | .020 | .057 |
| 1483 | .024 | .040 | .156 | .024 | .068 |
| 1964 | .029 | .054 | .179 | .023 | .073 |
| 2446 | .033 | .064 | .192 | .021 | .074 |
| 2892 | .038 | .074 | .205 | .020 | .073 |
| 3463 | .042 | .085 | .220 | .019 | .074 |
| 3963 | .046 | .092 | .232 | .019 | .075 |
| 4444 | .050 | .101 | .251 | .019 | .080 |
| 4962 | .056 | .111 | .269 | .020 | .083 |
| 5452 | .061 | .121 | .286 | .020 | .085 |
| 5916 | .067 | .130 | .310 | .021 | .093 |
| 6478 | .072 | .141 | .333 | .021 | .099 |
| 6978 | .076 | .149 | .350 | .021 | .104 |
| 7477 | .081 | .157 | .371 | .021 | .113 |
| 7879 | .085 | .164 | .386 | .021 | .116 |
| 8485 | .091 | .173 | .411 | .021 | .126 |
| 8985 | .095 | .181 | .429 | .021 | .133 |
| 9413 | .100 | .191 | .447 | .021 | .135 |
| 9913 | .106 | .201 | .472 | .021 | .146 |
| 10394 | .111 | .210 | .496 | .021 | .155 |
| 10903 | .115 | .218 | .519 | .021 | .166 |
| 11438 | .119 | .227 | .544 | .021 | .178 |
| 11946 | .126 | .242 | .578 | .021 | .191 |
| 7,740 (P) | .084 | .161 | .380 | .021 | .115 |

Ultimate Load (Pn) = 19,351 lbs.;
P = 0.4(Pn) = 7,740 lbs.
Shear Strength (Sn) = 1,612.5 plf;
Shear Stiffness (G') = 803,716 plf
Failure: Adhesion failure to SCP along bearing side of the floor (Row #3) near the tension side. Fastener pull-through and SCP failure around the fasteners along the same edge. The tension joist was severely deformed around the Simpson Strong-Tie connection.

TABLE 46

Test No. 9: Specimen: ¾" SCP (T&G) fastened to 16 ga. Steel Joists, set 24" o.c., with #8 × ⅝" screws spaced 12" o.c. around the perimeter and 12" o.c. in the field.
Test Conditions: 73° F.; 45% Relative Humidity
Diaphragm Width 143 inches; Diaphragm Length 144 inches;
Load Time (min:sec): 4:19

| Load in Pounds (lbf) | Deflection in Inches-Indicator Number | | | | Net Shear Deflection |
|---|---|---|---|---|---|
| | 1 | 2 | 3 | 4 | |
| 0 | .000 | .000 | .000 | .000 | .000 |
| 170 | .002 | .002 | .035 | -.002 | .033 |
| 455 | .007 | .006 | .068 | -.008 | .063 |
| 750 | .013 | .009 | .084 | -.011 | .074 |
| 901 | .017 | .015 | .097 | -.013 | .078 |
| 1214 | .024 | .022 | .116 | -.017 | .086 |
| 1499 | .035 | .032 | .145 | -.021 | .099 |
| 1722 | .041 | .038 | .166 | -.023 | .109 |
| 1972 | .051 | .050 | .191 | -.024 | .115 |
| 2159 | .056 | .056 | .209 | -.023 | .119 |
| 2471 | .065 | .065 | .231 | -.020 | .121 |
| 2685 | .071 | .071 | .248 | -.018 | .123 |
| 2953 | .077 | .081 | .267 | -.014 | .124 |

TABLE 46-continued

Test No. 9: Specimen: ¾" SCP (T&G) fastened to 16 ga. Steel Joists, set 24" o.c., with #8 × ⅝" screws spaced 12" o.c. around the perimeter and 12" o.c. in the field.
Test Conditions: 73° F.; 45% Relative Humidity
Diaphragm Width 143 inches; Diaphragm Length 144 inches;
Load Time (min:sec): 4:19

| Load in Pounds (lbf) | Deflection in Inches-Indicator Number | | | | Net Shear Deflection |
|---|---|---|---|---|---|
| | 1 | 2 | 3 | 4 | |
| 3212 | .081 | .087 | .286 | -.010 | .129 |
| 3497 | .084 | .093 | .298 | -.008 | .130 |
| 3729 | .088 | .099 | .317 | -.003 | .134 |
| 3934 | .090 | .105 | .330 | .000 | .135 |
| 4113 | .091 | .109 | .337 | .002 | .136 |
| 4416 | .095 | .117 | .361 | .009 | .142 |
| 4719 | .098 | .124 | .380 | .014 | .145 |
| 4925 | .100 | .129 | .393 | .018 | .147 |
| 5246 | .103 | .136 | .409 | .024 | .147 |
| 5495 | .106 | .145 | .425 | .031 | .145 |
| 5736 | .110 | .150 | .460 | .036 | .165 |
| 5995 | .113 | .156 | .477 | .041 | .169 |
| 6,369 (P) | .116 | .161 | .496 | .045 | .176 |

Ultimate Load (Pn) = 15,924 lbs.;
P = 0.4(Pn) = 6,369 lbs.
Shear Strength (Sn) = 1,327.0 plf;
Shear Stiffness (G') = 432,444 plf
Failure: Adhesion failure to SCP along bearing side of the floor (Row #3). Fastener pull-through and shear along the same edge. The tension joist was severely deformed around the Simpson Strong-Tie connection. The fastener shear near the compression side of the floor.

TABLE 47

Test No. 10 Specimen: ¾" Plywood (T&G) fastened to 16 ga. Steel Joists, set 24" o.c., with #8 × 1⅝" screws spaced 6" o.c. around the perimeter and 12" o.c. in the field.
Test Conditions: 68° F.; 43% Relative Humidity
Diaphragm Width 143 inches; Diaphragm Length 144 inches;
Load Time (min:sec): 6:43

| Load in Pounds (lbf) | Deflection in Inches-Indicator Number | | | | Net Shear Deflection |
|---|---|---|---|---|---|
| | 1 | 2 | 3 | 4 | |
| 0 | .000 | .000 | .000 | .000 | .000 |
| 223 | .008 | -.003 | .058 | .061 | -.008 |
| 491 | .010 | .003 | .109 | .081 | .016 |
| 723 | .011 | .007 | .152 | .083 | .051 |
| 973 | .012 | .013 | .219 | .087 | .107 |
| 1222 | .013 | .017 | .276 | .089 | .158 |
| 1481 | .015 | .023 | .335 | .092 | .206 |
| 1722 | .016 | .027 | .392 | .095 | .255 |
| 1990 | .018 | .034 | .455 | .098 | .307 |
| 2231 | .020 | .039 | .498 | .100 | .340 |
| 2489 | .021 | .046 | .552 | .104 | .383 |
| 2713 | .023 | .052 | .593 | .106 | .413 |
| 2971 | .025 | .058 | .634 | .110 | .442 |
| 3203 | .026 | .063 | .669 | .112 | .470 |
| 3498 | .027 | .069 | .709 | .115 | .498 |
| 3748 | .028 | .074 | .737 | .117 | .519 |
| 3971 | .030 | .079 | .769 | .120 | .542 |
| 4238 | .031 | .086 | .810 | .124 | .569 |
| 4444 | .033 | .091 | .836 | .127 | .586 |
| 4658 | .033 | .095 | .860 | .130 | .602 |
| 4988 | .035 | .102 | .903 | .134 | .633 |
| 5220 | .035 | .107 | .933 | .137 | .655 |
| 5479 | .038 | .112 | .971 | .139 | .683 |
| 5711 | .038 | .116 | 1.018 | .143 | .722 |

TABLE 47-continued

Test No. 10 Specimen: ¾" Plywood (T&G) fastened to 16 ga.
Steel Joists, set 24" o.c., with #8 × 1⅝" screws
spaced 6" o.c. around the perimeter and 12" o.c. in the field.
Test Conditions: 68° F.; 43% Relative Humidity
Diaphragm Width 143 inches; Diaphragm Length 144 inches;
Load Time (min:sec): 6:43

| Load in | Deflection in Inches-Indicator Number | | | | Net Shear |
|---|---|---|---|---|---|
| Pounds (lbf) | 1 | 2 | 3 | 4 | Deflection |
| 5960 | .039 | .121 | 1.156 | .146 | .850 |
| 2,534 (P) | .021 | .046 | .552 | .104 | .383 |

Ultimate Load (Pn) = 6,335 lbs.;
P = 0.4(Pn) = 2,534 lbs.
Shear Strength (Sn) = 527.9 plf;
Shear Stiffness (G') = 78,880 plf
Failure: Fastener shear and rotation into the Plywood along Row #1-2 T&G edge, on row #2 side 6 feet in from compression and the remaining 6 feet shifted on Row #1 T&G edge (typically limited to the fasteners at or within 12" of the T&G). Plywood failure around fasteners on Row #2 at the compression side.

While a particular embodiment of the system employing a horizontal diaphragm of fiber-reinforced structural cement panels on a metal frame has been shown and described, it will be appreciated by those skilled in the art that changes and modifications may be made thereto without departing from the invention in its broader aspects and as set forth in the following claims.

What is claimed is:

1. A non-combustible shear wall system for construction comprising:
   metal screw fasteners with winged drillers wherein the winged drillers are located above the point and below the first thread of the screw and protrude laterally from a shaft of the screw;
   light gauge cold rolled metal frame;
   a vertical shear diaphragm fastened by the fasteners to the light gauge cold rolled metal frame, the vertical shear diaphragm comprising a reinforced, lightweight, dimensionally stable cementitious panel and the frame comprising metal studs;
   the panel having a density of 65 to 90 pounds per cubic foot and capable of resisting shear loads when fastened to framing and comprising a continuous phase resulting from the curing of an aqueous mixture comprising, on a dry basis,
   49 to 68 weight % of a blend of reactive powders,
   23 to 35 weight % uniformly distributed lightweight filler, and
   5 to 20 weight % alkali-resistant glass fibers, and
   optional superplasticizer;
   the continuous phase being uniformly reinforced with glass fibers and uniformly containing the lightweight filler particles,
   the lightweight filler particles comprising ceramic microspheres and optionally, at least one member selected from the group consisting of glass microspheres, fly ash cenospheres and perlite, the lightweight filler particles having a particle specific gravity of from 0.02 to 1.00 and an average particle size of about 10 to 500 microns (micrometers),
   wherein the reactive powders comprise, on a dry basis,
   45 to 75 wt % calcium sulfate alpha hemihydrates,
   20 to 40 wt % Portland cement,
   0.2 to 3.5 wt % lime and
   5 to 25 wt % of an active pozzolan comprising silica fume,
   wherein the panels are ⅜-¾ inch (9-19 mm) thick, and the system having the ⅜-¾ inch (9-19 mm) thick panels fastened to laterally braced said light gauge cold rolled metal frame when tested according to ASTM E-72-05, effective 2005, has a nominal wall shear capacity of 400 to 1200 pounds per linear foot,
   wherein the panels fastened to said light gauge cold rolled metal frame when tested according to ASTM D-1761-88, effective 1988 (reapproved 2000), has a dry lateral screw resistance of 350 to 550 pounds,
   wherein the shear wall system further comprises a layer of Type X fire rated gypsum wallboard attached to a side of the metal framing opposed to said shear diaphragm panel to form a second diaphragm, and
   wherein Type X fire rated gypsum wallboard are only on the one side of the frame opposed to the shear diaphragm,
   wherein the shear wall system fastened to the metal frame meets the performance of the 2 hour fire resistance test rating under ASTM E-119, effective 2003.

2. The system of claim 1, wherein the aqueous mixture consists of, on a dry basis:
   58 to 68 wt % reactive powders,
   23 to 35 weight % lightweight filler particles consisting of uniformly distributed ceramic microspheres,
   5 to 20 wt. % alkali-resistant glass fibers, and
   optional plasticizer;
   the reactive powders consisting of, on a dry basis,
   65 to 75 wt. % calcium sulfate alpha hemihydrate,
   20 to 25 wt. % Portland cement,
   0.75 to 1.25 wt. % lime, and
   10 to 15 wt. % of silica fume active pozzolan.

3. The system of claim 2, wherein the ceramic microspheres have at least one feature selected from the group consisting of a mean particle size from 50 to 250 microns and falling within a particle size range of 10 to 500 microns.

4. The system of claim 2, wherein the panel comprises a core comprising the continuous phase resulting from the curing of the aqueous mixture, and
   further comprising at least one outer layer, each said outer layer comprising a second continuous phase resulting from the curing of a second aqueous mixture consisting of, on a dry basis,
   58 to 68 weight % of a second blend of reactive powders,
   23 to 35 weight percent uniformly distributed lightweight filler, and
   5 to 20 weight % alkali-resistant glass fibers, and
   optional superplasticizer;
   the second blend of reactive powders consisting of, on a dry basis,
   65 to 75 wt. % calcium sulfate alpha hemihydrate,
   20 to 25 wt. % Portland cement,
   0.75 to 1.25 wt. % lime, and
   10 to 15 wt. % of an active pozzolan comprising silica fume,
   the second continuous phase being uniformly reinforced with the alkali-resistant glass fibers, and the lightweight filler particles comprising ceramic microspheres having a particle specific gravity of from 0.02 to 1.00 and an average particle size of about 10 to 500 microns (micrometers),
   at least one outer layer having reduced phase density relative to the core.

5. The system of claim 4, wherein the outer layer(s) has been formed from 54 to 68 wt. % of the second blend of reactive powders, 5 to 15 wt. % of the glass fibers, up to 1.0 wt. % of glass microspheres having an average diameter of about 10 to 350 microns (micrometers), and 23 to 35 wt. % of the lightweight filler particles comprising ceramic spheres, each on a dry basis.

6. The system of claim 4, wherein the at least one outer layer has a thickness of about 1/32 to 4/32 inches (0.8 to 3.2 mm).

7. The system of claim 1, wherein the aqueous mixture comprises, on a dry basis:
54 to 68 wt. % of the reactive powders,
6 to 17 wt. % of the glass fibers, and
23 to 35 wt. % of said lightweight filler, each on a dry basis.

8. The system of claim 1, wherein the aqueous mixture comprises, on a dry basis:
56 to 68 wt. % of the reactive powders,
5 to 12 wt. % of the glass fibers, and
35 to 42 wt. % of ceramic microspheres, the ceramic microspheres having a particle density of 0.50 to 0.80 g/mL.

9. The system of claim 1, wherein the filler comprises at least one member selected from the group consisting of uniformly distributed glass microspheres and fly ash cenospheres having an average diameter of about 10 to 350 microns (micrometers).

10. The system of claim 1, wherein the aqueous mixture comprises, on a dry basis:
54 to 68 wt. % of the reactive powders,
5 to 15 wt. % of the glass fibers,
23 to 35 wt. % of ceramic spheres, and up to 1.0 wt. % of glass microspheres, each on a dry basis.

11. The system of claim 1, wherein the panel has a thickness of about 1/4 to 1 1/2 inches (6.3 to 38.11 mm).

12. The system of claim 1, wherein the panels are 3/8-3/4 inch (9-19 mm) thick, and the system having the 3/8-3/4 inch (9-19 mm) thick panels fastened to laterally braced said light gauge cold rolled metal frame when tested according to ASTM E-72-05, effective 2005, has a nominal wall shear capacity of 800 to 1200 pounds per linear foot.

13. The system of claim 1, wherein the panels are 1/2 inch (12.5 mm) thick, and the system having the 1/2 inch (12.5 mm) thick panels fastened to laterally braced said light gauge cold rolled metal frame when tested according to ASTM E-72-05, effective 2005, has a nominal wall shear capacity of 800 to 1200 pounds per linear foot.

14. The system of claim 1, wherein the glass fibers are monofilaments having a diameter of about 5 to 25 microns (micrometers) and a length of about 0.25 to 3 inches (6.3 to 76 mm).

15. The system of claim 1, wherein the flexural strength of a said panel having a dry density of 65 lb/ft$^3$ to 95 lb/ft$^3$ (1041 to 1522 kg/m$^3$) after being soaked in water for 48 hours is at least 1000 psi (7 MPa) as measured by the ASTM C 947-03 test, effective 2003.

16. The system of claim 1, wherein the flexural strength of a said panel having a dry density of 65 lb/ft$^3$ to 95 lb/ft$^3$ (1041 to 1522 kg/m$^3$) after being soaked in water for 48 hours is at least 1650 psi (11.4 MPa) as measured by the ASTM C 947-03 test, effective 2003.

17. The system of claim 1, wherein the reactive powders comprise, on a dry basis:
65 to 75 wt. % calcium sulfate hemihydrate,
20 to 25 wt. % Portland cement,
0.75 to 1.25 wt. % lime, and
10 to 15 wt. % of an active pozzolan comprising silica fume.

18. The system of claim 1, wherein the at least one said stud comprises a substantially C-shaped member fabricated from metal.

19. The system of claim 1, wherein the panels are 3/8-3/4 inch (9-19 mm) thick, and the horizontal shear diaphragm load carrying capacity of the system will not be lessened by more than 20% when exposed to water in a test wherein a 2 inch head of water is maintained over the 3/8-3/4 inch thick panels fastened on a 10 foot by 20 foot metal frame for a period of 24 hours, and the system will not absorb more than 0.7 pounds per square foot of water when exposed to water in a test wherein a 2 inch head of water is maintained over the 3/8-3/4 inch thick panels fastened on a 10 foot by 20 foot metal frame for a period of 24 hours.

20. The system of claim 1, wherein the panels are 3/8-3/4 inch (9-19 mm) thick, and a 10 foot wide by 20 foot long by 3/8-3/4 inch thick diaphragm of the panels attached to a 10 foot by 20 foot said metal frame will not swell more than 5% when exposed to a 2 inch head of water maintained over the SCP panels fastened on the metal frame for a period of 24 hours.

21. The system of claim 1, wherein every component meets ASTM G-21-96, effective 1996 (reapproved 2002), in which the system achieves approximately a 1 and meets ASTM D-3273-94, effective 1994, in which the system achieves approximately a 10.

22. The system of claim 1, wherein the panel comprises:
a core layer comprising the continuous phase, and
at least one outer layer of respectively a second continuous phase resulting from the curing of a second aqueous mixture consisting of, on a dry basis,
58 to 68 weight % of said blend of reactive powders,
23 to 35 weight percent uniformly distributed lightweight filler, and
5 to 20 weight % alkali-resistant glass fibers, and
optional superplasticizer;
the second blend of reactive powders consisting of, on a dry basis,
65 to 75 wt. % calcium sulfate alpha hemihydrate,
20 to 25 wt. % Portland cement,
0.75 to 1.25 wt. % lime, and
10 to 15 wt. % of an active pozzolan comprising silica fume,
the second continuous phase being reinforced with the glass fibers and containing the lightweight filler particles comprising ceramic microspheres, the lightweight filler particles having a particle specific gravity of from 0.02 to 1.00 and an average particle size of about 10 to 500 microns (micrometers) on each opposed side of the inner layer,
wherein the at least one outer layer has a higher percentage of glass fibers than the inner layer.

23. The system of claim 1, wherein
the aqueous mixture consists of, on a dry basis:
49 to 68 wt. % of the reactive powders,
23 to 35 wt. % of the lightweight filler ceramic microspheres, the ceramic microspheres having a particle density of 0.50 to 0.80 g/mL, and
7 to 12 wt. % of the alkali-resistant glass fibers, and
optional plasticizer;
wherein the blend of reactive powders consists of, on a dry basis:
45 to 65 wt. % calcium sulfate alpha hemihydrate,
20 to 40 wt. % Portland cement as the hydraulic cement,
0.2 to 3.5 wt. % lime, and
5 to 12 wt. % of silica fume, active pozzolan,
wherein the ceramic microspheres have at least one feature selected from the group consisting of a mean particle size from 50 to 250 microns and falling within a particle size range of 10 to 500 microns, wherein the panels are ½-¾ inch thick, and the system having the ½-¾ inch thick panels fastened to laterally braced said light gauge cold rolled metal frame when tested according to ASTM E-72-05, effective, has a nominal wall shear capacity of 800 to 1200 pounds per linear foot, wherein the alkali-resistant glass fibers are monofilaments having a diameter of about 5 to 25 microns (micrometers) and a length of about 0.25 to 3 inches (6.3 to 76 mm), wherein the flexural strength of a said panel having a dry density of 65 lb/ft³ to 95 lb/ft³ (1041 to 1522 kg/m³) after being soaked in water for 48 hours is at least 1650 psi (11.4 MPa) as measured by the ASTM C 947-03 test, effective 2003, wherein the at least one said metal stud comprises a substantially C-shaped member fabricated from metal.

24. The system of claim 1, wherein, the system is non-directional, in that the panels of the system may be placed with their long dimension parallel or perpendicular to metal joists of the frame without losing strength or load carrying characteristics, wherein the ability of the system to support dead and live loads without failure is the same regardless of the orientation of the SCP panel on the metal framing.

25. The system of claim 1, wherein the panels are ½ inch (12.5 mm) thick, and the system having the ½ inch (12.5 mm) thick panels fastened to said light gauge cold rolled metal frame when tested according to ASTM D-1761-88, effective 1988 (reapproved 2000), has a dry lateral screw resistance of 350 to 550 pounds.

26. The system of claim 1, wherein the panels are ¾ inch (19.05 mm) thick, and the system having the ¾ inch (19.05 mm) thick panels fastened to said light gauge cold rolled metal frame when tested according to ASTM D-1761-88, effective 1988 (reapproved 2000), has a dry lateral screw resistance of 400 to 500 pounds.

27. The system of claim 1, wherein the metal studs are 16 gauge steel.

28. A method of improving the fire resistance of a building, comprising:
constructing the building to include a non-combustible shear wall system comprising metal screw fasteners with winged drillers wherein the winged drillers are located above the point and below the first thread of the screw and protrude laterally from a shaft of the screw;
a light gauge cold rolled metal frame;
a vertical shear diaphragm fastened by the fasteners to the light gauge cold rolled metal frame, the vertical shear diaphragm comprising a reinforced, lightweight, dimensionally stable cementitious panel and the frame comprising metal studs;
the panel having a density of 65 to 90 pounds per cubic foot and capable of resisting shear loads when fastened to framing and comprising a continuous phase resulting from the curing of an aqueous mixture comprising, on a dry basis,
49 to 68 weight % of a blend of reactive powders, 23 to 35 weight % uniformly distributed lightweight filler, and 5 to 20 weight % alkali-resistant glass fibers, and optional superplasticizer;
the continuous phase being uniformly reinforced with glass fibers and uniformly containing the lightweight filler particles,
the lightweight filler particles comprising ceramic microspheres and optionally, at least one member selected from the group consisting of glass microspheres, fly ash cenospheres and perlite, the lightweight filler particles having a particle specific gravity of from 0.02 to 1.00 and an average particle size of about 10 to 500 microns (micrometers),
wherein the reactive powders comprise, on a dry basis,
45 to 75 wt % calcium sulfate alpha hemihydrates,
20 to 40 wt % Portland cement,
0.2 to 3.5 wt % lime and
5 to 25 wt % of an active pozzolan comprising silica fume,
wherein the panels are ⅜-¾ inch (9-19 mm) thick, and the system having the ⅜-¾ inch (9-19 mm) thick panels fastened to laterally braced said light gauge cold rolled metal frame when tested according to ASTM E-72-05, effective 2005, has a nominal wall shear capacity of 400 to 1200 pounds per linear foot,
wherein the panels fastened to said light gauge cold rolled metal frame when tested according to ASTM D-1761-88, effective 1988 (reapproved 2000), has a dry lateral screw resistance of 350 to 550 pounds,
wherein the shear wall system further comprises a layer of Type X fire rated gypsum wallboard attached to a side of the metal framing opposed to said shear diaphragm panel to form a second diaphragm, and
wherein Type X fire rated gypsum wallboard are only on the one side of the frame opposed to the shear diaphragm,
wherein the shear wall system fastened to the metal frame meets the performance of the 2 hour fire resistance test rating under ASTM E-119, effective 2003,
the non-combustible shear wall system made by a method comprising:
attaching the structural cement panels to one side of said metal studs of the building to form the vertical shear diaphragm as an outer wall of the building and
attaching the Type X fire rated gypsum wallboard on the opposed side of said metal studs of the building,
wherein the structural cement panels are mechanically fastened to the metal frame with said metal screws with winged driller.

29. The method of claim 28, wherein the metal screw fasteners with winged drillers are winged self-drilling screws.

30. The method of claim 28, wherein the metal studs are gauge steel.

31. The method of claim 28, wherein the panels are ¾ inch thick.

32. The method of claim 28,
wherein the aqueous mixture consists of, on a dry basis:
58 to 68 wt % reactive powders,
23 to 35 weight % lightweight filler particles consisting of uniformly distributed ceramic microspheres, and
5 to 20 wt. % alkali-resistant glass fibers, and
optional plasticizer;
wherein the blend of reactive powders consists of, on a dry basis,
65 to 75 wt. % calcium sulfate alpha hemihydrate,
20 to 25 wt. % Portland cement,
0.75 to 1.25 wt. % lime, and
10 to 15 wt. % of active pozzolan silica fume.

33. The method of claim 28, wherein the aqueous mixture consists of, on a dry basis:
49 to 68 wt. % of the reactive powders,
23 to 35 wt. % of the lightweight filler ceramic microspheres, the ceramic microspheres having a particle density of 0.50 to 0.80 g/mL, and
7 to 12 wt. % of the alkali-resistant glass fibers, and
optional plasticizer;
wherein the blend of reactive powders consists of, on a dry basis:

45 to 65 wt. % calcium sulfate alpha hemihydrate, 20 to 40 wt. % Portland cement as the hydraulic cement, 0.2 to 3.5 wt. % lime, and 5 to 12 wt. % of silica fume, active pozzolan, wherein the ceramic microspheres have at least one feature selected from the group consisting of a mean particle size from 50 to 250 microns and falling within a particle size range of 10 to 500 microns, wherein the panels are ½-¾ inch thick, and the system having the ½-¾ inch thick panels fastened to laterally braced said light gauge cold rolled metal frame when tested according to ASTM E-72-05, effective, has a nominal wall shear capacity of 800 to 1200 pounds per linear foot, wherein the alkali-resistant glass fibers are monofilaments having a diameter of about 5 to 25 microns (micrometers) and a length of about 0.25 to 3 inches (6.3 to 76 mm), wherein the flexural strength of a said panel having a dry density of 65 lb/ft$^3$ to 95 lb/ft$^3$ (1041 to 1522 kg/m$^3$) after being soaked in water for 48 hours is at least 1650 psi (11.4 MPa) as measured by the ASTM C 947-03 test, effective 2003, wherein the at least one said metal stud comprises a substantially C-shaped member fabricated from metal.

34. A method of making a non-combustible shear wall system, the non-combustible shear wall system comprising metal screw fasteners with winged drillers wherein the winged drillers are located above the point and below the first thread of the screw and protrude laterally from a shaft of the screw;

a light gauge cold rolled metal frame;

a vertical shear diaphragm fastened by the fasteners to the light gauge cold rolled metal frame, the vertical shear diaphragm comprising a reinforced, lightweight, dimensionally stable cementitious panel and the frame comprising metal studs;

the panel having a density of 65 to 90 pounds per cubic foot and capable of resisting shear loads when fastened to framing and comprising a continuous phase resulting from the curing of an aqueous mixture comprising, on a dry basis, 49 to 68 weight % of a blend of reactive powders, 23 to 35 weight % uniformly distributed lightweight filler, and 5 to 20 weight % alkali-resistant glass fibers, and optional superplasticizer;

the continuous phase being uniformly reinforced with glass fibers and uniformly containing the lightweight filler particles, the lightweight filler particles comprising ceramic microspheres and optionally, at least one member selected from the group consisting of glass microspheres, fly ash cenospheres and perlite, the lightweight filler particles having a particle specific gravity of from 0.02 to 1.00 and an average particle size of about 10 to 500 microns (micrometers), wherein the reactive powders comprise, on a dry basis, 45 to 75 wt % calcium sulfate alpha hemihydrates, 20 to 40 wt % Portland cement, 0.2 to 3.5 wt % lime and 5 to 25 wt % of an active pozzolan comprising silica fume, wherein the panels are ⅜-¾ inch (9-19 mm) thick, and the system having the ⅜-¾ inch (9-19 mm) thick panels fastened to laterally braced said light gauge cold rolled metal frame when tested according to ASTM E-72-05, effective 2005, has a nominal wall shear capacity of 400 to 1200 pounds per linear foot, wherein the panels fastened to said light gauge cold rolled metal frame when tested according to ASTM D-1761-88, effective 1988 (reapproved 2000), has a dry lateral screw resistance of 350 to 550 pounds, wherein the shear wall system further comprises a layer of Type X fire rated gypsum wallboard attached to a side of the metal framing opposed to said shear diaphragm panel to form a second diaphragm, and wherein Type X fire rated gypsum wallboard are only on the one side of the frame opposed to the shear diaphragm, wherein the shear wall system fastened to the metal frame meets the performance of the 2 hour fire resistance test rating under ASTM E-119, effective 2003, the method further comprising placing the panel on said metal studs, mechanically fastening the panel to the metal frame with said metal screw with winged driller, wherein the placing the panel on elements of said metal frame occurs when the ambient temperature is less than 32 degrees F. (0 degrees C.).

35. The method of claim 34, comprising placing the panel on elements of said metal frame when the ambient temperature is less than 20 degrees F. (minus 7.5 degrees C.).

36. The method of claim 34, wherein said placing step comprises placing the panel to lie horizontally on elements of said metal frame when the ambient temperature is less than 32 degrees F. (0 degrees C.) by dropping the panel on the metal framing elements such that at least one end of the panel falls at least 2 feet and afterwards reorienting the panel and metal framing elements vertically.

37. The method of claim 34, wherein said placing step comprises placing the panel to lie horizontally on elements of said metal frame when the ambient temperature is less than 32 degrees F. (0 degrees C.) by dropping the panel on the metal framing elements such that at least one end of the panel falls 3 to 4 feet and afterwards reorienting the panel and metal framing elements vertically.

38. The method of claim 34, wherein the panel is placed vertically on said metal framing elements that are vertically oriented.

39. The method of claim 34, wherein the panel is placed horizontally on said metal framing elements that are horizontally oriented and, after said placing, the panel and metal frame elements are moved to be vertically oriented.

40. The system of claim 1, wherein the metal screw fasteners with winged drillers are winged self-drilling screws.

* * * * *

UNITED STATES PATENT AND TRADEMARK OFFICE
CERTIFICATE OF CORRECTION

| | | |
|---|---|---|
| PATENT NO. | : 7,849,649 B2 | |
| APPLICATION NO. | : 11/321069 | |
| DATED | : December 14, 2010 | |
| INVENTOR(S) | : Timothy D. Tonyan et al. | |

It is certified that error appears in the above-identified patent and that said Letters Patent is hereby corrected as shown below:

Title Page, correct Item (75) Inventors, to read:

--(75) Inventors:   Timothy D. Tonyan, Wheaton, IL (US);
                           James M. Ullett, McHenry, IL (US);
                           James E. Reicherts, Cary, IL (US);
                           Ashish Dubey, Grayslake, IL (US)--.

Signed and Sealed this

Twenty-first Day of April, 2015

Michelle K. Lee
*Director of the United States Patent and Trademark Office*